US011900871B2

(12) United States Patent
Ka et al.

(10) Patent No.: US 11,900,871 B2
(45) Date of Patent: *Feb. 13, 2024

(54) DISPLAY DEVICE

(71) Applicant: Samsung Display Co., Ltd., Yongin-si (KR)

(72) Inventors: Ji Hyun Ka, Yongin-si (KR); Tae Hoon Kwon, Yongin-si (KR); Ki Myeong Eom, Yongin-si (KR); Chung Yi, Yongin-s (KR); Se Byung Chae, Yongin-si (KR); Deok Jun Choi, Yongin-si (KR); Moon Sang Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,303

(22) Filed: Feb. 17, 2023

(65) Prior Publication Data

US 2023/0206831 A1 Jun. 29, 2023

Related U.S. Application Data

(63) Continuation of application No. 17/693,025, filed on Mar. 11, 2022, now Pat. No. 11,587,505, which is a
(Continued)

(30) Foreign Application Priority Data

Nov. 2, 2017 (KR) ........................ 10-2017-0145592
Nov. 3, 2017 (KR) ........................ 10-2017-0146267

(51) Int. Cl.
*G09G 3/3275* (2016.01)
*G09G 3/3225* (2016.01)

(52) U.S. Cl.
CPC ......... *G09G 3/3225* (2013.01); *G09G 3/3275* (2013.01); *G09G 2320/0626* (2013.01)

(58) Field of Classification Search
None
See application file for complete search history.

(56) References Cited

U.S. PATENT DOCUMENTS 9,275,579 B2 3/2016 Chaji et al.
9,276,017 B2 3/2016 Lee
(Continued)

FOREIGN PATENT DOCUMENTS

CN 104637442 5/2015
CN 104749805 7/2015
(Continued)

OTHER PUBLICATIONS

Notice of Allowance dated May 4, 2020 issued in U.S. Appl. No. 16/177,779.
(Continued)

*Primary Examiner* — Parul H Gupta
(74) *Attorney, Agent, or Firm* — H.C. Park & Associates, PLC

(57) ABSTRACT

A display device including: a display region including a first pixel region, a second pixel region, and a third pixel region; a dummy region including a first dummy region disposed between the second pixel region and the third pixel region; first, second, and third pixels respectively arranged in the first pixel region, the second pixel region, and the third pixel region in a matrix of vertical lines and horizontal lines; a data converter configured to receive first image data including effective data corresponding to the display region and dummy data corresponding to the dummy region and generate second image data by converting a gray scale value of dummy data corresponding to at least one region of the first
(Continued)

dummy region in the first image data into a predetermined first gray scale value, the first gray scale value being between a lowest gray scale value and a highest gray scale value.

7 Claims, 50 Drawing Sheets

Related U.S. Application Data continuation of application No. 17/013,617, filed on Sep. 6, 2020, now abandoned, which is a continuation of application No. 16/177,779, filed on Nov. 1, 2018, now Pat. No. 10,769,991.

(56) References Cited

U.S. PATENT DOCUMENTS

| | | | | |
|---|---|---|---|---|
| 9,983,720 | B2 | 5/2018 | Shin et al. | |
| 10,152,917 | B2 | 12/2018 | Chung | |
| 10,395,581 | B2 * | 8/2019 | Kim | G09G 3/2074 |
| 2011/0025874 | A1 * | 2/2011 | Tamaoki | H04N 25/63 348/222.1 |
| 2013/0271677 | A1 * | 10/2013 | Koo | G09G 3/006 349/33 |
| 2014/0146033 | A1 * | 5/2014 | Koyama | G09G 3/3655 345/212 |
| 2014/0197428 | A1 | 7/2014 | Wang et al. | |
| 2014/0354625 | A1 | 12/2014 | Shin | |
| 2016/0019856 | A1 | 1/2016 | Tanaka et al. | |
| 2016/0155395 | A1 | 6/2016 | Park et al. | |
| 2016/0189601 | A1 | 6/2016 | Jung et al. | |
| 2016/0189617 | A1 | 6/2016 | Park | |
| 2016/0293107 | A1 | 10/2016 | Jeong | |
| 2017/0061886 | A1 | 3/2017 | Takahara et al. | |
| 2017/0110041 | A1 | 4/2017 | Watsuda et al. | |
| 2017/0249906 | A1 | 8/2017 | Noh et al. | |
| 2017/0337876 | A1 * | 11/2017 | Kim | G09G 3/3233 |
| 2018/0045983 | A1 | 2/2018 | Kim et al. | |
| 2018/0053479 | A1 | 2/2018 | Lin et al. | |
| 2018/0122283 | A1 * | 5/2018 | Kim | G09G 3/2003 |
| 2019/0073962 | A1 | 3/2019 | Aflatooni et al. | |
| 2020/0074936 | A1 * | 3/2020 | Chu | G09G 3/3291 |

FOREIGN PATENT DOCUMENTS

| | | |
|---|---|---|
| CN | 105739750 | 7/2016 |
| EP | 3451322 | 3/2019 |
| JP | 2005284056 | 10/2005 |
| JP | 2007206464 | 8/2007 |
| KR | 10-2011-0032341 | 3/2011 |
| KR | 10-2011-0066333 | 6/2011 |
| KR | 10-2016-0081793 | 7/2016 |
| KR | 10-2016-0119909 | 10/2016 |
| KR | 10-1798194 | 11/2017 |
| KR | 10-2018-0018930 | 2/2018 |
| WO | 2017/128638 | 8/2017 |

OTHER PUBLICATIONS

Communication from the Examining Division dated Feb. 24, 2021 issued to European Patent Application No. 18204021.2.

Non-Final Office Action dated Jun. 16, 2021, in U.S. Appl. No. 17/013,617.

Notice of Allowance dated Oct. 19, 2022, in U.S. Appl. No. 17/693,025.

* cited by examiner

DISPLAY DEVICE

CROSS-REFERENCE TO RELATED APPLICATIONS

This application is a continuation of U.S. patent Ser. No. 17/693,025, filed Mar. 11, 2022, which is a continuation of U.S. patent application Ser. No. 17/013,617, filed Sep. 6, 2020, now abandoned, which is a continuation of U.S. patent application Ser. No. 16/177,779, filed Nov. 1, 2018, now U.S. Pat. No. 10,769,991, which claims priority from and the benefit of Korean Patent Application Nos. 10-2017-0145592, filed on Nov. 2, 2017 and 10-2017-0146267, filed on Nov. 3, 2017, which are hereby incorporated by reference for all purposes as if fully set forth herein.

BACKGROUND

Field

Exemplary embodiments/implementations of the invention relate generally to a display device.

Discussion of the Background

Recently, display devices have been manufactured to have various shapes according to various demands of customers. For example, a display device may have a display region having a shape that is partially protruded or recessed, rather than a typical shape such as a rectangular or a square shape.

The above information disclosed in this Background section is only for understanding of the background of the inventive concepts, and, therefore, it may contain information that does not constitute prior art.

SUMMARY

Devices according to exemplary embodiments of the invention provide a display device including a plurality of pixel regions and having excellent or improved image quality.

Additional features of the inventive concepts will be set forth in the description which follows, and in part will be apparent from the description, or may be learned by practice of the inventive concepts.

According to one or more embodiments of the invention, a display device may include: a display region including: a first pixel region; and a second pixel region and a third pixel region disposed at one side of the first pixel region to be spaced apart from each other; a dummy region including a first dummy region disposed between the second pixel region and the third pixel region; first pixels, second pixels, and third pixels respectively arranged in the first pixel region, the second pixel region, and the third pixel region, the first pixels, the second pixels, and the third pixels are disposed in a matrix of vertical lines and horizontal lines; a data converter configured to: receive first image data including effective data corresponding to the display region and dummy data corresponding to the dummy region; and generate second image data by converting the first image data; and a data driver configured to: generate a data signal corresponding to the second image data; and supply the data signal to the first pixels, the second pixels, and the third pixels, wherein the data converter may be configured to convert a gray scale value of dummy data corresponding to at least one region of the first dummy region in the first image data into a predetermined first gray scale value, the first gray scale value being between a lowest gray scale value and a highest gray scale value.

The first dummy region may include a conversion region, the conversion region being a predetermined region in the first dummy region, wherein the data converter may be configured to convert a gray scale value of dummy data corresponding to the conversion region in the first image data into the first gray scale value.

The conversion region may include an Nth (N is a natural number of 2 or more) horizontal line, wherein the Nth horizontal line may be the last horizontal line of the second pixel region and the third pixel region.

The conversion region may be defined by: a first coordinate point and a second coordinate point located on an Nth (N is a natural number of 2 or more) horizontal line; and a third coordinate point and a fourth coordinate point located on a Kth (K is a natural number smaller than N) horizontal line, and wherein the Nth horizontal line may be the last horizontal line of the second pixel region and the third pixel region.

The data converter may be configured to convert all gray scale values of the dummy data of the first image data into the first gray scale value.

The dummy region may further include at least one of: a second dummy region disposed at one side of the second pixel region, the second dummy region being spaced apart from the first dummy region with the second pixel region interposed therebetween; and a third dummy region disposed at one side of the third pixel region, the third dummy region being spaced apart from the first dummy region with the third pixel region interposed therebetween.

The first image data may further include dummy data corresponding to at least one of the second dummy region and the third dummy region.

The data converter may be configured to convert a gray scale value of dummy data corresponding to at least one region of the second dummy region and the third dummy region in the first image data into the first gray scale value.

The data converter may be configured to: convert a gray scale value of dummy data corresponding to the second dummy region and the third dummy region in the first image data into a second gray scale value.

The second gray scale value of the dummy data corresponding to the second and third dummy regions may be the lowest gray scale value.

The data converter may be configured to: maintain a gray scale value of the effective data in the first image data; and generate the second image data by changing a gray scale value of the dummy data corresponding to the at least one region of the first dummy region.

The display device may further include data lines electrically coupled to the first pixels, the second pixels, and the third pixels, wherein, the data driver may be configured to: supply a data signal corresponding to the effective data to data lines electrically coupled to the second pixels and the third pixels disposed on the Kth horizontal line during a Kth horizontal period corresponding to a Kth (K is a natural number) horizontal line of the second pixel region and the third pixel region; and supply a data signal corresponding to the first gray scale value to at least one of the data lines other than the data lines electrically coupled to the second pixels and the third pixels.

The first gray scale value may be set as one of: a gray scale value of a data signal having an average voltage value of a voltage value of a data signal corresponding to the lowest gray scale value and a voltage value of a data signal corresponding to the highest gray scale value; and a gray scale value of a data signal having a voltage value closest to the average voltage value among a plurality of intermediate gray scale values between the lowest gray scale value and the highest gray scale value.

The data converter may be configured to convert a gray scale value of dummy data corresponding to the first dummy region in Nth (N is a natural number of 2 or more) line data corresponding to the Nth horizontal line into the first gray scale value, the Nth horizontal line is the last horizontal line of the second pixel region and the third pixel region.

At least a portion of the first dummy region may be implemented with a concave part or an opening.

According to one or more embodiments of the invention, a display device may include: a display region including: a first pixel region; and a second pixel region and a third pixel region disposed at one side of the first pixel region to be spaced apart from each other; a dummy region including a first dummy region disposed between the second pixel region and the third pixel region; a conversion region set as at least one region of the first dummy region, the conversion region including a plurality of sub-regions; first pixels, second pixels, and third pixels respectively arranged in the first pixel region, the second pixel region, and the third pixel region; a data converter configured to: receive first image data including effective data corresponding to the display region and dummy data corresponding to the dummy region; and generate second image data by converting the first image data; and a data driver configured to: generate a data signal corresponding to the second image data; and supply the data signal to the first pixels, the second pixels, and the third pixels, wherein the data converter may be configured to generate the second image data by converting the first image data such that gray scale values of dummy data corresponding to two adjacent sub-regions among the plurality of sub-regions are different from each other.

The data converter may be configured to convert the first image data such that a gray scale value of dummy data corresponding to the conversion region is gradually increased or decreased as it becomes closer to the first pixel region.

The conversion region may include a region between second and third pixels disposed on an Nth (N is a natural number of 2 or more) horizontal line of the second pixel region and the third pixel region, and wherein the Nth horizontal line may be the last horizontal line of the second pixel region and the third pixel region.

The conversion region may be defined by: a first coordinate point and a second coordinate point located on the Nth horizontal line; and a third coordinate point and a fourth coordinate point located on a Kth (K is a natural number smaller than N) horizontal line.

The display device may further include data lines electrically coupled to the first pixels, the second pixels, and the third pixels, wherein, the data driver may be configured to: supply a data signal corresponding to the effective data to data lines electrically coupled to the second pixels and the third pixels disposed on the Kth to Nth horizontal lines of the second pixel region and the third pixel region during Kth to Nth horizontal periods corresponding to the Kth to Nth horizontal lines; and supply a data signal having a gray scale gradually changed for every at least one horizontal period to at least one of remaining data lines during the Kth to Nth horizontal periods.

The conversion region may be set as the entirety of the first dummy region.

The data converter may be configured to maintain a gray scale value of the effective data in the first image data, and generate the second image data by changing a gray scale value of dummy data corresponding to the conversion region.

The dummy region may further include at least one of: a second dummy region disposed at one side of the second pixel region, the second dummy region being spaced apart from the first dummy region with the second pixel region interposed therebetween; and a third dummy region disposed at one side of the third pixel region, the third dummy region being spaced apart from the first dummy region with the third pixel region interposed therebetween.

The first image data may further include dummy data corresponding to at least one of the second and third dummy regions, wherein the data converter may be configured to gradually change a gray scale value of the dummy data corresponding to the at least one of the second dummy region and the third dummy region.

The first image data may further include dummy data corresponding to at least one of the second dummy region and the third dummy region, wherein the data converter may be configured to maintain a gray scale value of dummy data corresponding to the second and third dummy regions in the first image data, and change a gray scale value of dummy data corresponding to the conversion region.

At least a portion of the first dummy region may be implemented with a concave part or an opening.

According to one or more embodiments of the invention, a display device may include: a display region including: a first pixel region; and a second pixel region and a third pixel region disposed at one side of the first pixel region to be spaced apart from each other; a dummy region including a first dummy region disposed between the second pixel region and the third pixel region; a predetermined conversion region set as at least one region of the first dummy region; first pixels, second pixels, and third pixels respectively arranged in the first pixel region, the second pixel region, and the third pixel region; a data converter configured to: receive first image data including effective data corresponding to the display region and dummy data corresponding to the dummy region; and generate second image data by converting the first image data; and a data driver configured to: generate a data signal corresponding to the second image data; and supply the data signal to the first pixels, the second pixels, and the third pixels, wherein the data converter may be configured to convert a gray scale value of the dummy data corresponding to the conversion region, using at least a portion of the effective data.

The display device may further include a reference region set as one region of the display region, wherein the data converter may be configured to set the gray scale value of the dummy data corresponding to the conversion region as a gray scale value of effective data corresponding to the reference region.

The reference region may be a region of the first pixel region defined by a region corresponding to the conversion region on the last horizontal line of the first pixel region.

The conversion region may include a region between the second pixels and the third pixels disposed on first to Nth (N is a natural number of 2 or more) horizontal lines of the second and third pixel regions, and wherein the Nth horizontal line may be the last horizontal line of the second pixel region and the third pixel region.

The display device may further include data lines electrically coupled to the first pixels, the second pixels, and the third pixels, wherein the data driver may be configured to: supply a data signal corresponding to the effective data to data lines electrically coupled to the second pixels and the third pixels disposed on the first to Nth horizontal lines during first to Nth horizontal periods corresponding to the first to Nth horizontal lines of the second pixel region and the third pixel region; and maintain the value of a data signal applied during the last horizontal period of a frame immediately previous to a current frame for at least some of the data lines during the first to Nth horizontal periods.

The conversion region may include a region between second and third pixels disposed on the Nth (N is a natural number of 2 or more) horizontal line of the second pixel region and the third pixel region, and wherein the Nth horizontal line may be the last horizontal line of the second pixel region and the third pixel region.

The reference region may be set as a region of the first pixel region defined by a region corresponding to the conversion region on a first horizontal line of the first pixel region.

The data converter may be configured to generate a gray scale value of the conversion region, using gray scale values of the reference region in effective data of a frame immediately previous to a current frame.

The data converter may be configured to calculate an average gray scale value of the gray scale values of the reference region, and set the average gray scale value as the gray scale value of the conversion region.

The display device may further include data lines electrically coupled to the first pixels, the second pixels, and the third pixels, wherein the data driver may be configured to: supply a data signal corresponding to the effective data to data lines electrically coupled to the second and third pixels disposed on the Nth horizontal line during an Nth horizontal period of the current frame corresponding to the Nth horizontal line of the second pixel region and the third pixel region; and supply a data signal corresponding to the average gray scale value of a data signal applied to the reference region during an (N+1)th horizontal period of the frame immediately previous to the current frame to at least one of the data lines other than the data lines electrically coupled to the second pixels and the third pixels during the Nth horizontal period of the current frame.

The data converter may be configured to convert a gray scale value of dummy data of the conversion region of Nth line data of the first image data into a value equal to a gray scale value of any one effective data in effective data of the second pixel region, which is included in the Nth line data.

The data converter may be configured to set a gray scale value of last effective data in the effective data of the second pixel region, which is included in the Nth line data, as the gray scale value of the conversion region.

The display device may further include data lines electrically coupled to the first pixels, the second pixels, and the third pixels, wherein the data driver may be configured to: supply a data signal corresponding to the effective data to data lines electrically coupled to the second pixels and the third pixels disposed on the Nth horizontal line, during an Nth horizontal period corresponding to the Nth horizontal line of the second pixel region and the third pixel region; and supply a data signal equal to that applied to any one second pixel among the second pixels disposed on the Nth horizontal line to at least one of the data lines other than the data lines electrically coupled to the second pixels and the third pixels during the Nth horizontal period.

The conversion region may be defined by: a first coordinate point and a second coordinate point located on the Nth (N is a natural number of 2 or more) horizontal line; and a third coordinate point and a fourth coordinate point located on a Kth (K is a natural number smaller than N) horizontal line.

The data converter may be configured to maintain a gray scale value of at least the effective data in the first image data, and generate the second image data by changing a gray scale value of dummy data corresponding to the conversion region.

According to one or more embodiments of the invention, a display device may include: a display region including: a first pixel region; and a second pixel region and a third pixel region disposed at one side of the first pixel region to be spaced apart from each other; a first dummy region disposed between the second and third pixel regions; a predetermined conversion region set as at least one region of the first dummy region; a data converter configured to: receive third image data including image pickup information on an image displayed in the display region, in addition to first image data including effective data corresponding to the display region and dummy data corresponding to the first dummy region; and generate second image data by converting the first image data; and a data driver configured to generate a data signal corresponding to the second image data and supply the data signal to the first, second, and third pixels, wherein the data converter may be configured to: correct a gray scale value of the effective data by applying a first offset value corresponding to the third image data; and generate the second image data by changing gray scale values of dummy data corresponding to the conversion region, using a predetermined second offset value.

The second offset value may be set to comprehensively increase or decrease the gray scale values of the dummy data corresponding to the conversion region in the dummy data included in the first image data.

The display device may further include: first pixels, second pixels, and third pixels respectively arranged in the first pixel region, second pixel region, and third pixel region, the first pixels, the second pixels, and the third pixels are disposed in a matrix of vertical lines and horizontal lines; and data lines electrically coupled to the first pixels, second pixels, and third pixels, wherein, during an Nth (N is a natural number) horizontal period corresponding to an Nth horizontal line of the second and third pixel regions, a data signal corresponding to the effective data and the first offset value may be supplied to data lines electrically coupled to second and third pixels disposed on the Nth horizontal line, and a data signal corresponding to the second offset value is supplied to at least some of the other data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

In the drawing figures, dimensions may be exaggerated for clarity of illustration. It will be understood that when an element is referred to as being “between” two elements, it can be the only element between the two elements, or one or more intervening elements may also be present. Like reference numerals refer to like elements throughout.

DETAILED DESCRIPTION

Figure 1:
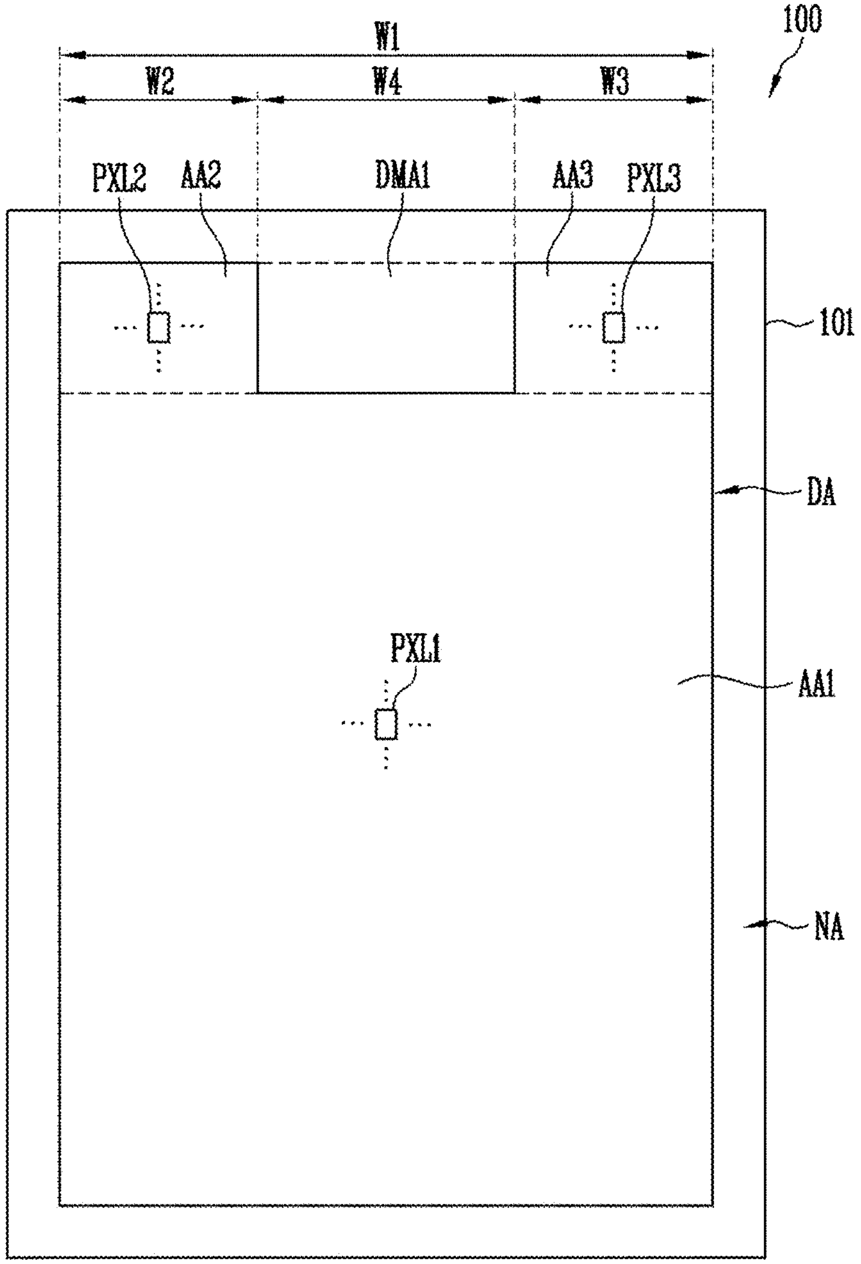
FIGS. 1, 2, 3, 4, 5, 6, 7, 8, 9, 10, 11, and 12 each illustrates a display panel according to exemplary embodiments.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Meanwhile, in the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

FIGS. 1, 2, 3, 4, 5, 6, 7, 8, 9, 10, 11, and 12 each illustrates a display panel according to exemplary embodiments. Specifically, FIGS. 1, 2, 3, 4, 5, 6, 7, 8, 9, 10, 11, and 12 illustrate different embodiments of a display panel provided in a display device according to the exemplary embodiments.

First, referring to FIG. 1, the display panel 100 according to the exemplary embodiment may include a display region DA including a plurality of pixel regions AA1, AA2, and AA3, and a first dummy region DMA1 and a peripheral region NA, which are disposed at the periphery of the display region DA.

According to exemplary embodiments, the display region DA may include a first pixel region AA1, a second pixel region AA2, and a third pixel region AA3, which are disposed at one side of the first pixel region AA1 to be spaced apart from each other. For example, the second pixel region AA2 may be disposed at a left upper end of the first pixel region AA1, and the third pixel region AA3 may be disposed at a right upper end of the first pixel region AA1.

At least two pixel regions among the first, second, and third pixel regions AA1, AA2, and AA3 may have different widths and/or different areas. For example, the first pixel region AA1 may occupy the widest area in the display region DA while having a first width W1, and the second pixel region AA2 and the third pixel region AA3 may have an area smaller than that of the first pixel region AA1 while respectively having a second width W2 and a third width W3, which are narrower than the first width W1. In addition, the second pixel region AA2 and the third pixel region AA3 may have the same width and/or the same area, or have different widths and/or different areas.

First pixels PXL1, second pixels PXL2, and third pixels PXL3 may be disposed in the first pixel region AA1, the second pixel region AA2, and the third pixel region AA3, respectively. The first, second, and third pixels PXL1, PXL2, and PXL3 may have the same structure, or at least some of the first, second, and third pixels PXL1, PXL2, and PXL3 may have different structures. That is, in the present disclosure, the structure of the first, second, and third pixels PXL1, PXL2, and PXL3 is not particularly limited. According to exemplary embodiments, each of the first, second, and third pixels PXL1, PXL2, and PXL3 may be a self-luminescent pixel including an organic light emitting diode, but the present disclosure is not limited thereto.

The first, second, and third pixels PXL1, PXL2, and PXL3 are provided on a substrate 101 on which the first, second, and third pixel regions AA1, AA2, and AA3 are defined. For example, the first, second, and third pixels PXL1, PXL2, and PXL3 may be formed on one surface of the substrate 101.

The first dummy region DMA1 may be disposed between the second pixel region AA2 and the third pixel region AA3. For example, the first dummy region DMA1 may be disposed at a concave part (e.g., a notch region) defined by the second pixel region AA2 and the third pixel region AA3. As an example, when the second pixel region AA2 has a shape protruding from the left upper end of the first pixel region AA1 and the third pixel region AA3 has a shape protruding from the right upper end of the first pixel region AA1, the first dummy region DMA1 may be located at an upper center of the first pixel region AA1, i.e., between the second and third pixel regions AA2 and AA3. In this case, the first dummy region DMA1 may be located among the first, second, and third pixel regions AA1, AA2, and AA3 to be in contact with the first, second, and third pixel regions AA1, AA2, and AA3.

Also, the first dummy region DMA1 may have a fourth width W4, and the fourth width W4 may be determined according to the first width W1, the second width W2, and/or the third width W3. For example, the fourth width W4 may have a value obtained by subtracting the second and third widths W2 and W3 from the first width W1.

No pixel is disposed in the first dummy region DMA1. That is, the first dummy region DMA1 may be a non-display region that does not include any pixel. In addition, driving lines such as scan lines and/or data lines may not be disposed in the first dummy region DMA1.

Meanwhile, in the exemplary embodiment, the first dummy region DMA1 may comprehensively refer to an actual region between the second and third pixel regions AA2 and AA3 or a virtual region between the second and third pixel regions AA2 and AA3. For example, the first dummy region DMA1 may be an actual region that actually exists on the substrate 101. In another example, when a concave part (e.g., a groove) or an opening is formed between the second and third pixel regions AA2 and AA3, at least a part of the first dummy region DMA1 may be a virtual region that does not actually exist on the substrate 101 (e.g., a region implemented with a concave part, an opening, or the like).

The peripheral region NA is disposed at the periphery of the display region DA and the first dummy region DMA1. For example, the peripheral region NA may be disposed to surround the display region DA and at least a partial region of the first dummy region DMA1.

The substrate 101 is a base substrate of the display panel 100. The substrate 101 may be a substrate made of a glass or plastic material, but the present disclosure is not limited thereto. For example, the substrate 101 may be a flexible substrate including at least one of polyethersulfone (PES), polyacrylate (PA), polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). Also the substrate 101 may be a rigid substrate including one of glass or tempered glass. Also, the substrate 101 may be a substrate made of a transparent material, i.e., a light transmitting substrate, but the present disclosure is not limited thereto. Also, the substrate 101 may be configured to have different materials and/or different structures according to regions, so that different characteristics are exhibited for the respective regions. Also, the substrate 101 may have a single or multi layered structure, and the structure of the substrate 101 is not particularly limited thereto.

The substrate 101 may have various shapes in which at least the first, second, and third pixel regions AA1, AA2, and AA3 can be set. For example, the substrate 101 may be a rectangular or square substrate that can include not only the first, second, and third pixel regions AA1, AA2, and AA3 and the first dummy region DMA1 but also the peripheral region NA surrounding them. However, the shape of the substrate 101 is not limited thereto, and may be variously modified.

Figure 2:
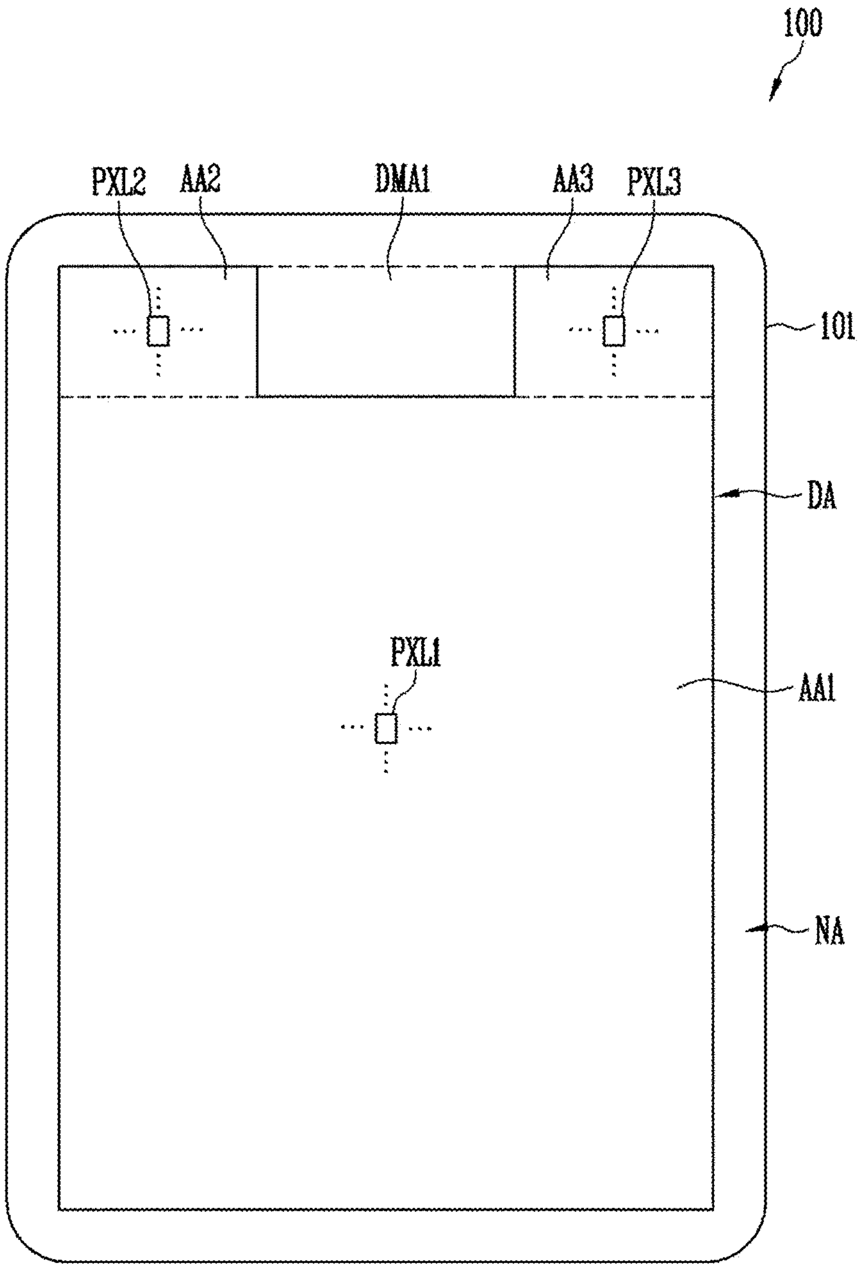

In an exemplary embodiment, at least one corner portion of the substrate 101 may have a curved shape. Referring to FIG. 2, all four corner portions of the substrate 101 may have curved shapes. FIG. 2 illustrates that the corner portions of the substrate 101 may have a curved shape, but at least one region (e.g., at least one corner portion) of the display region DA may also have a curved shape, in addition to the substrate 101. For example, four corner portions of the display region DA may have a curved shape.

Figure 3:
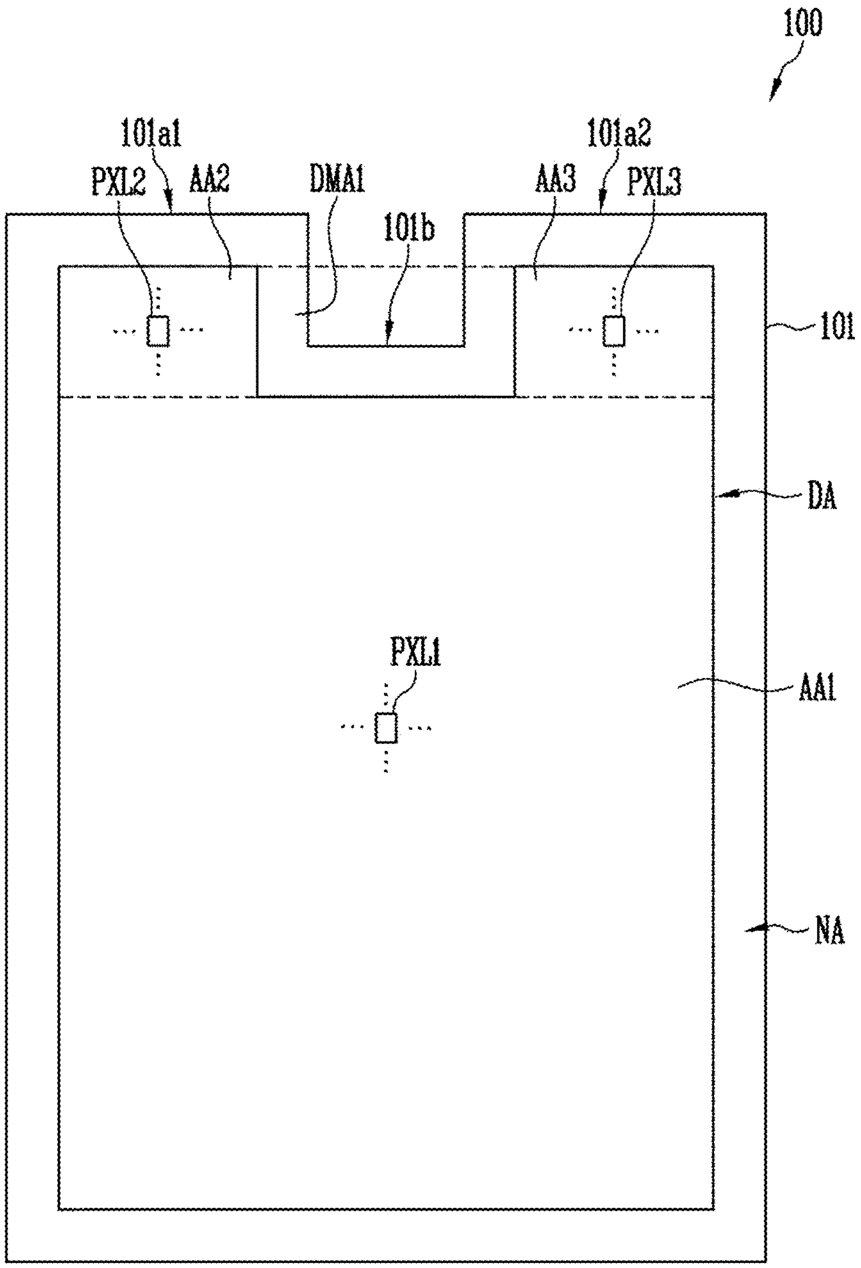

According to exemplary embodiments, the substrate 101 may have at least one protrusion part and/or at least one concave part (or opening). For example, as shown in FIG. 3, the substrate 101 may include first and second protrusion parts **101*a*1 and 101*a*2 respectively corresponding to the second and third pixel regions AA2 and AA3, and a concave part (or opening) 101*b* between the first and second protrusion parts 101*a*1 and 101*a*2**.

That is, according to exemplary embodiments, the substrate 101 may have a shape corresponding to that of the display region DA. In this case, at least a partial region of the first dummy region DMA1 may be a virtual region that does not actually exist on the substrate 101, and be implemented with the concave part **101*b*, the opening, or the like. If the substrate 101 has the concave part 101*b*, the internal space of the display device can be more efficiently used as a speaker, a receiving speaker, or the like disposed at the concave part 101*b***.

Figure 4:
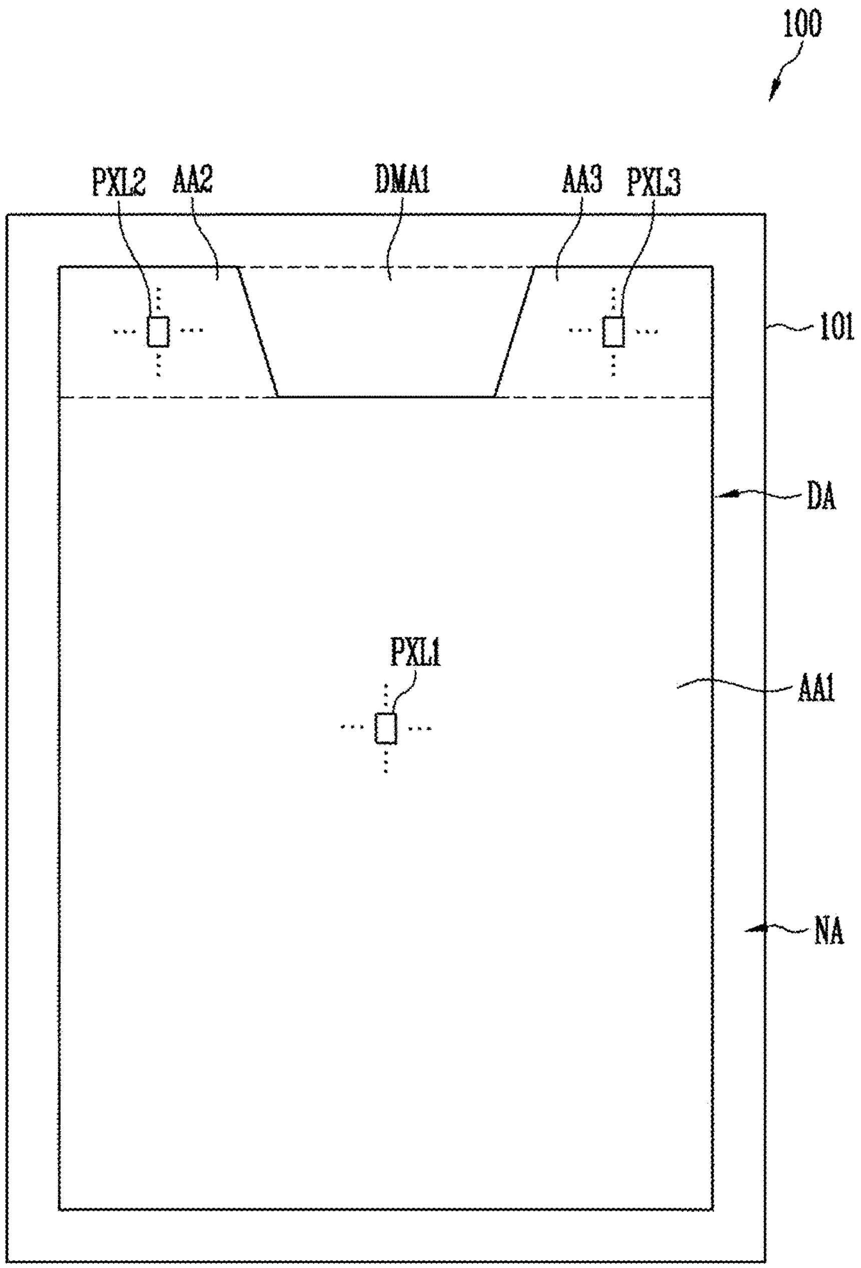
Figure 5:
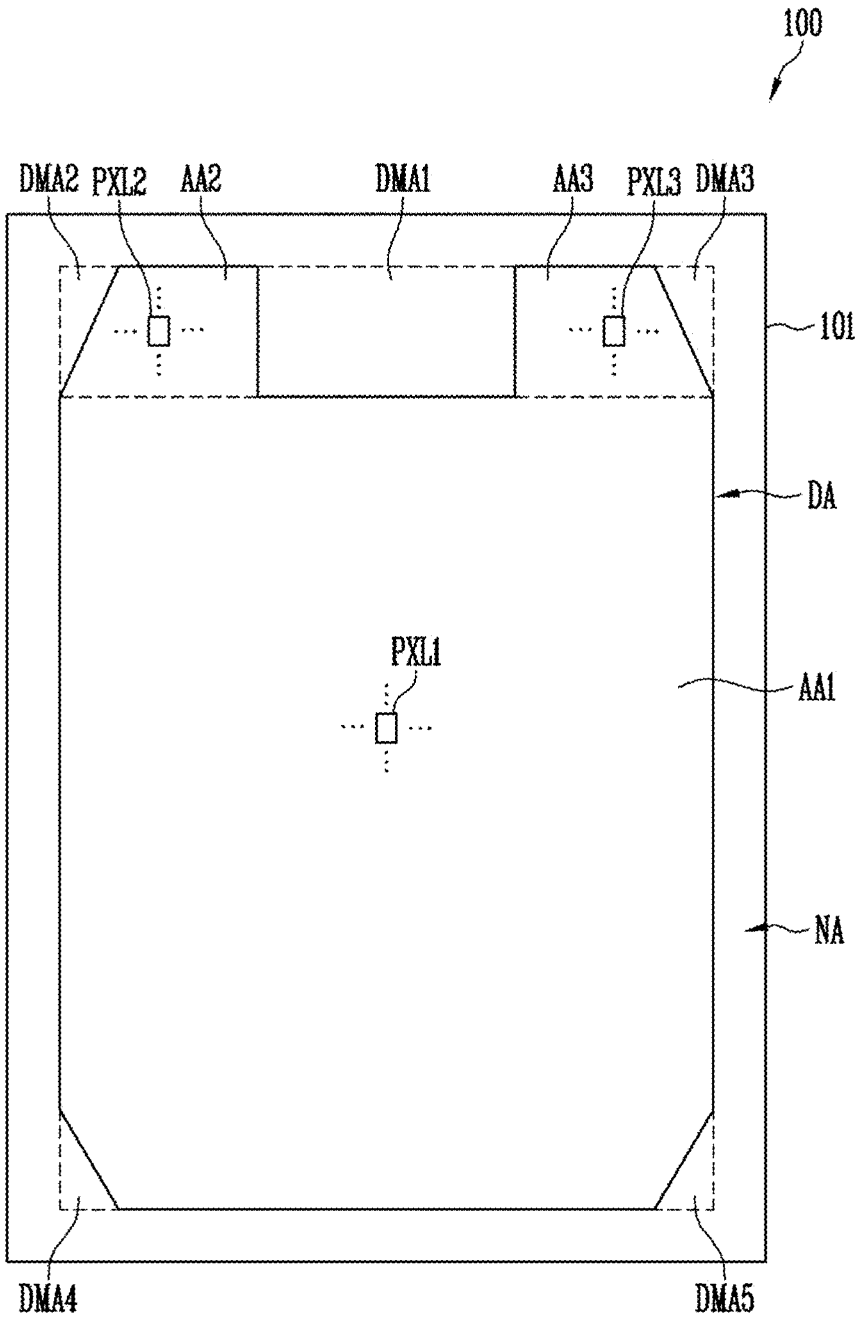
Figure 6:
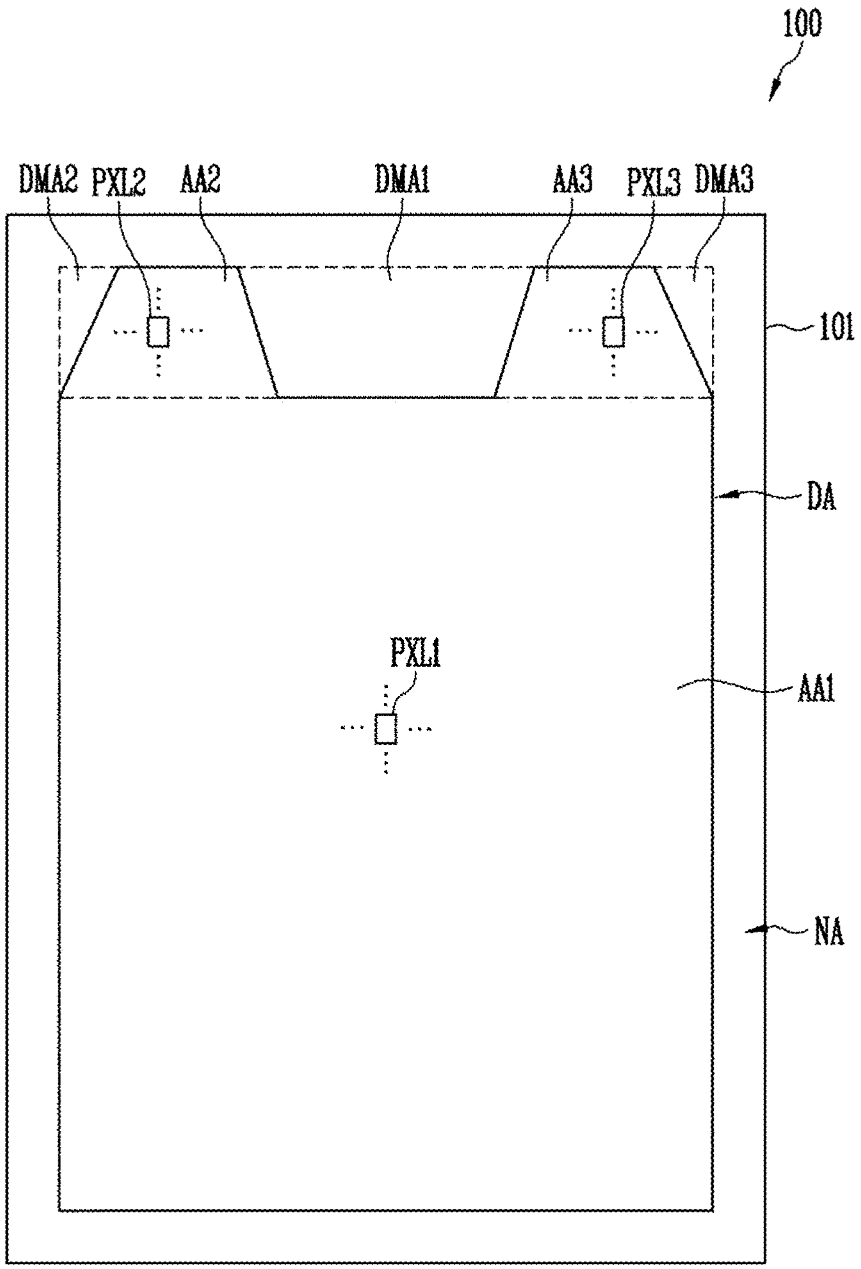
Figure 7:
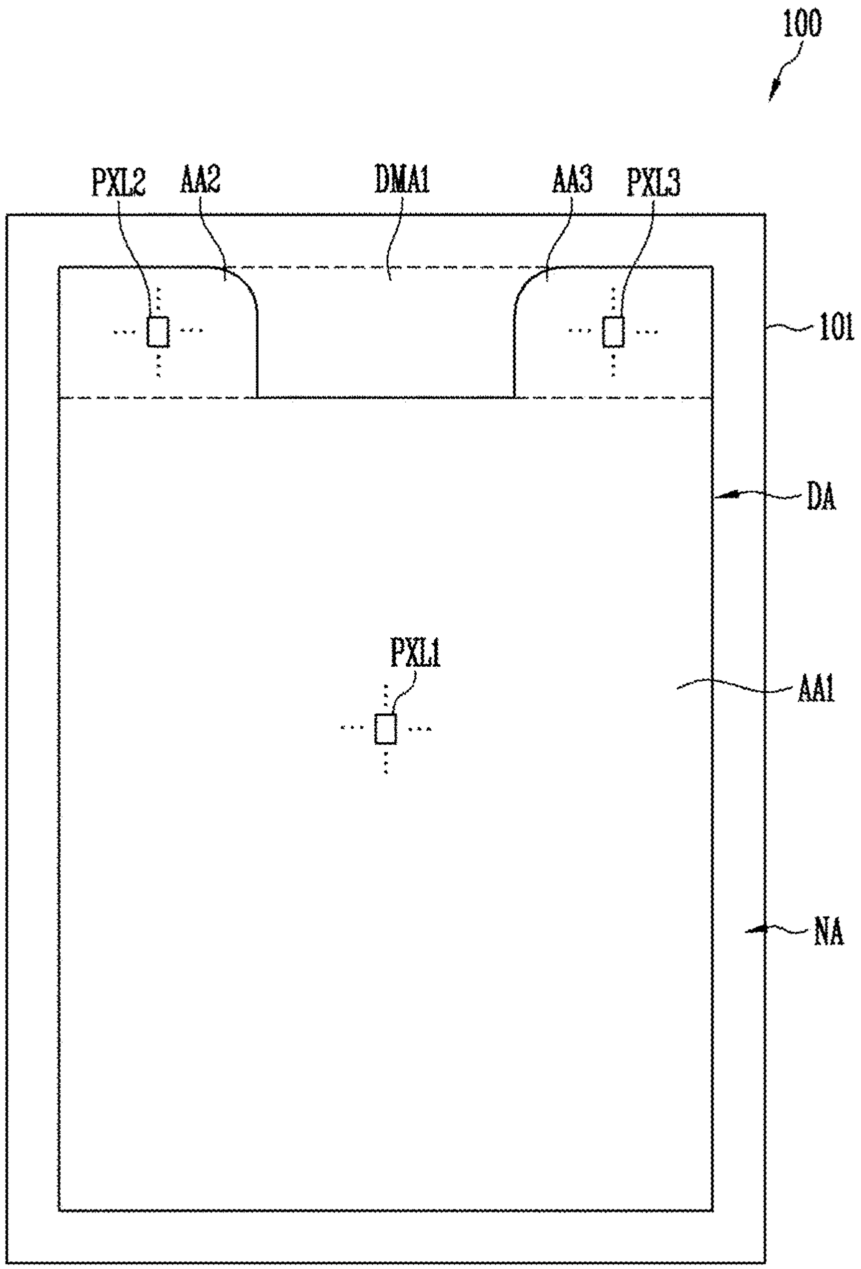
Figure 8:
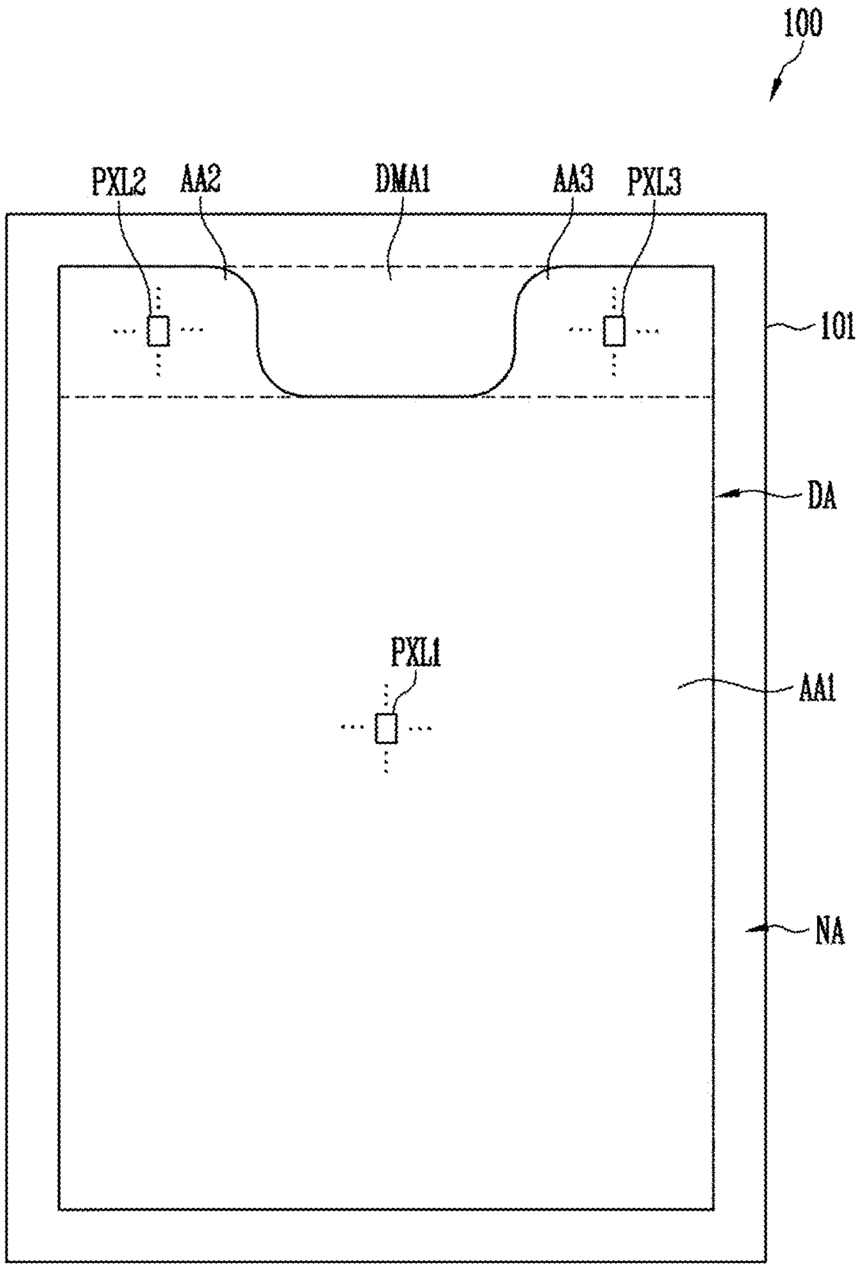

Meanwhile, according to the exemplary embodiments, the shapes of the first pixel region AA1, the second pixel region AA2, the third pixel region AA3, and/or the first dummy region DMA1 may also be variously modified. Referring to FIGS. 4, 5, and 6, at least one region of the first pixel region AA1, the second pixel region AA2, the third pixel region AA3, and/or the first dummy region DMA1 may have an inclined shape (or step shape). For example, at least one region of the first pixel region AA1, the second pixel region AA2, the third pixel region AA3, and/or the first dummy region DMA1 may have a shape in which its width is gradually changed in at least one region.

In addition, the display panel 100 may further include at least one of a second dummy region DMA2 disposed at one side of the second pixel region AA2 and a third dummy region DMA3 disposed at one side of the third pixel region AA3. Referring to FIGS. 5 and 6, when outer corner portions of the second and third pixel regions AA2 and AA3 have an inclined shape, the display panel 100 may further include at least one of a second dummy region DMA2 spaced apart from the first dummy region DMA1 with the is second pixel region AA2 interposed therebetween and a third dummy region DMA3 spaced apart from the first dummy region DMA1 with the third pixel region AA3 interposed therebetween.

In addition, as shown in FIG. 5, when outer corner portions, e.g., lower end corner portions of the first pixel region AA1, have an inclined shape, the display panel 100 may further include fourth dummy region DMA4 and fifth dummy region DMA5 respectively disposed at the two outer corner portions of the first pixel region AA1. According to the exemplary embodiments, the second, third, fourth, and fifth dummy regions DMA2, DMA3, DMA4, and DMA5 may comprehensively refer to actual regions on the substrate 101 or virtual regions implemented with a concave part (e.g., a groove), an opening, or the like.

In addition, as shown in FIGS. 7, 8, 9, and 10, at least one of the first pixel region AA1, the second pixel region AA2, the third pixel region AA3, and the first dummy region DMA1 may have a curved shape in at least one partial edge region (e.g., at least one partial corner portion). For example, the first pixel region AA1, the second pixel region AA2, the third pixel region AA3, and/or the first dummy region DMA1 may have a polygonal shape, a circular shape, an elliptical shape, or a combined shape thereof. In this case, the first pixel region AA1, the second pixel region AA2, the third pixel region AA3, and/or the first dummy region DMA1 may have a boundary line having a linear or curved shape or a boundary line having a combined shape of a line and a curve.

Figure 9:
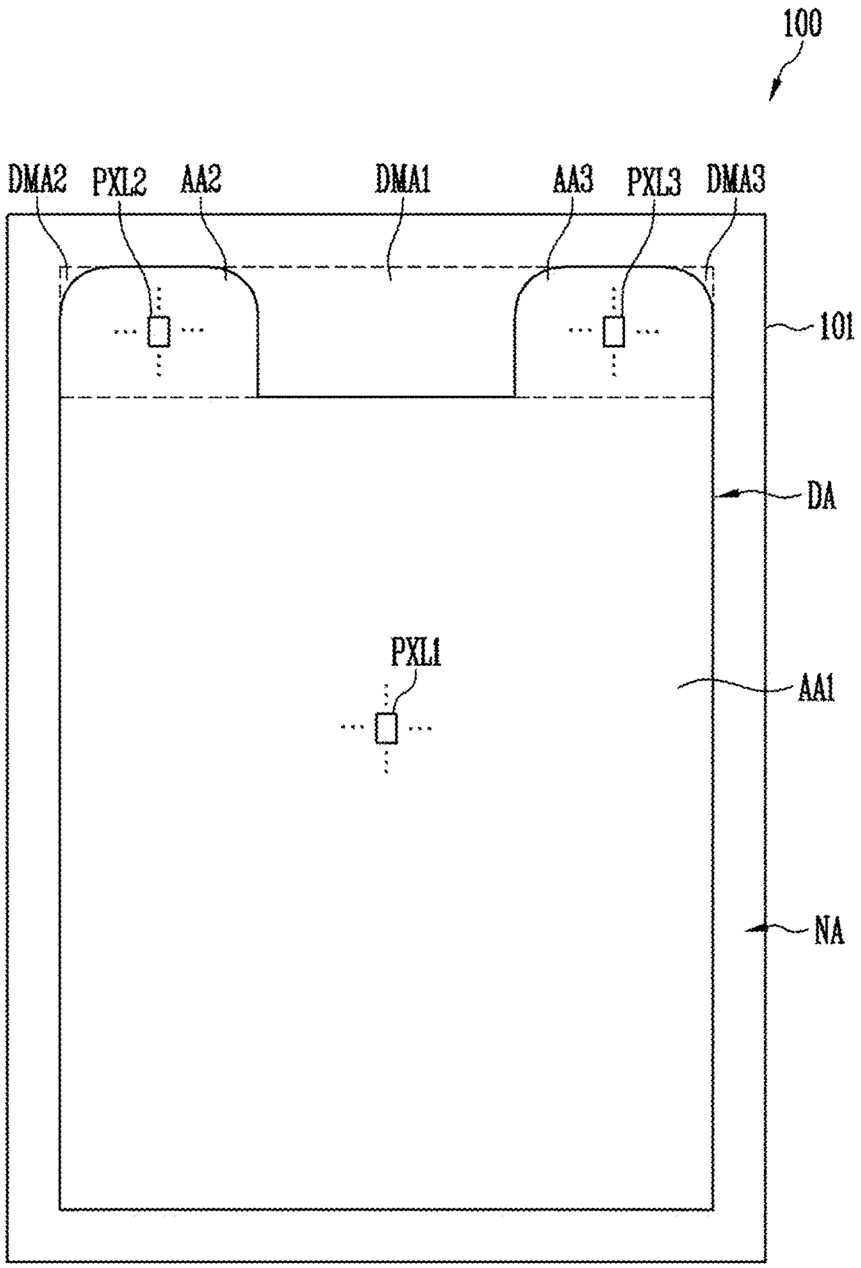
Figure 10:
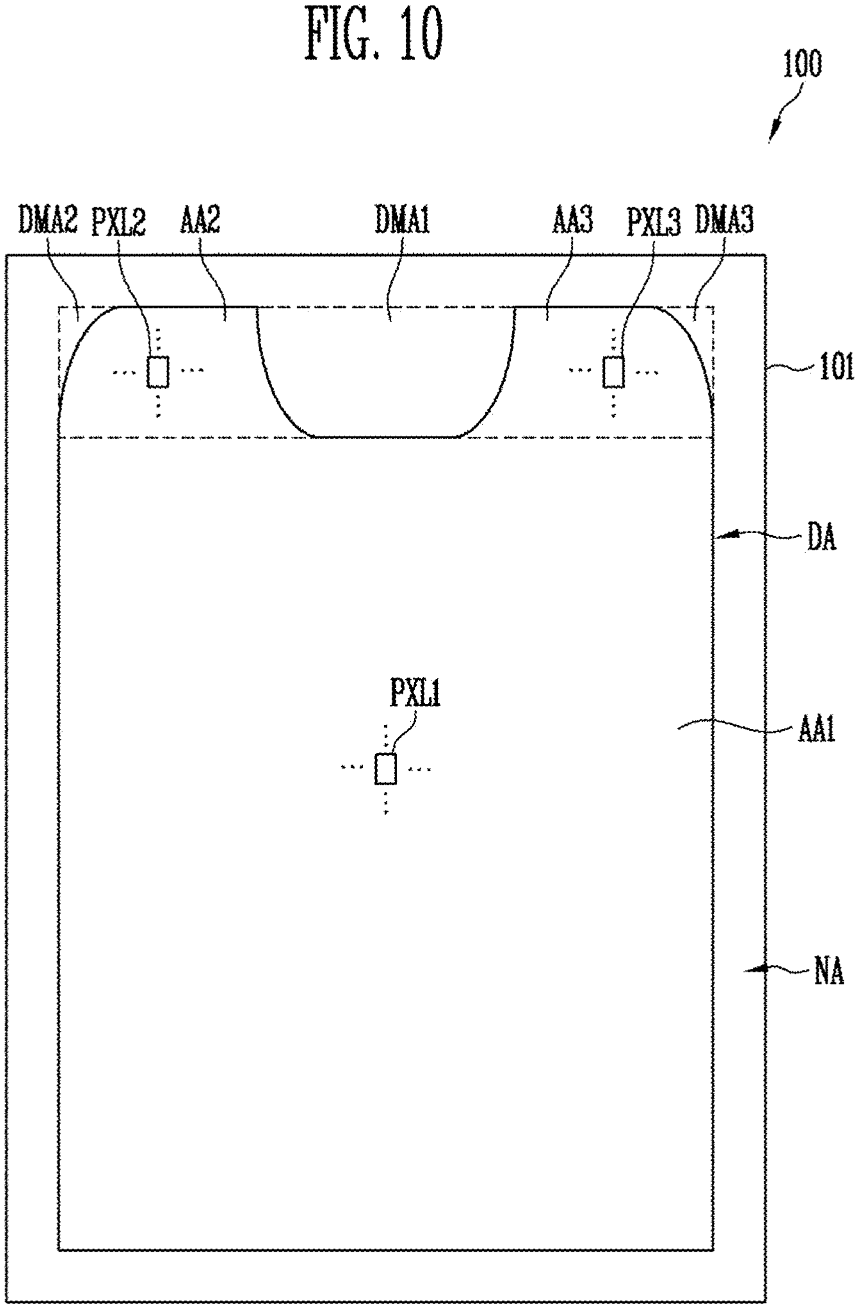
Figure 11:
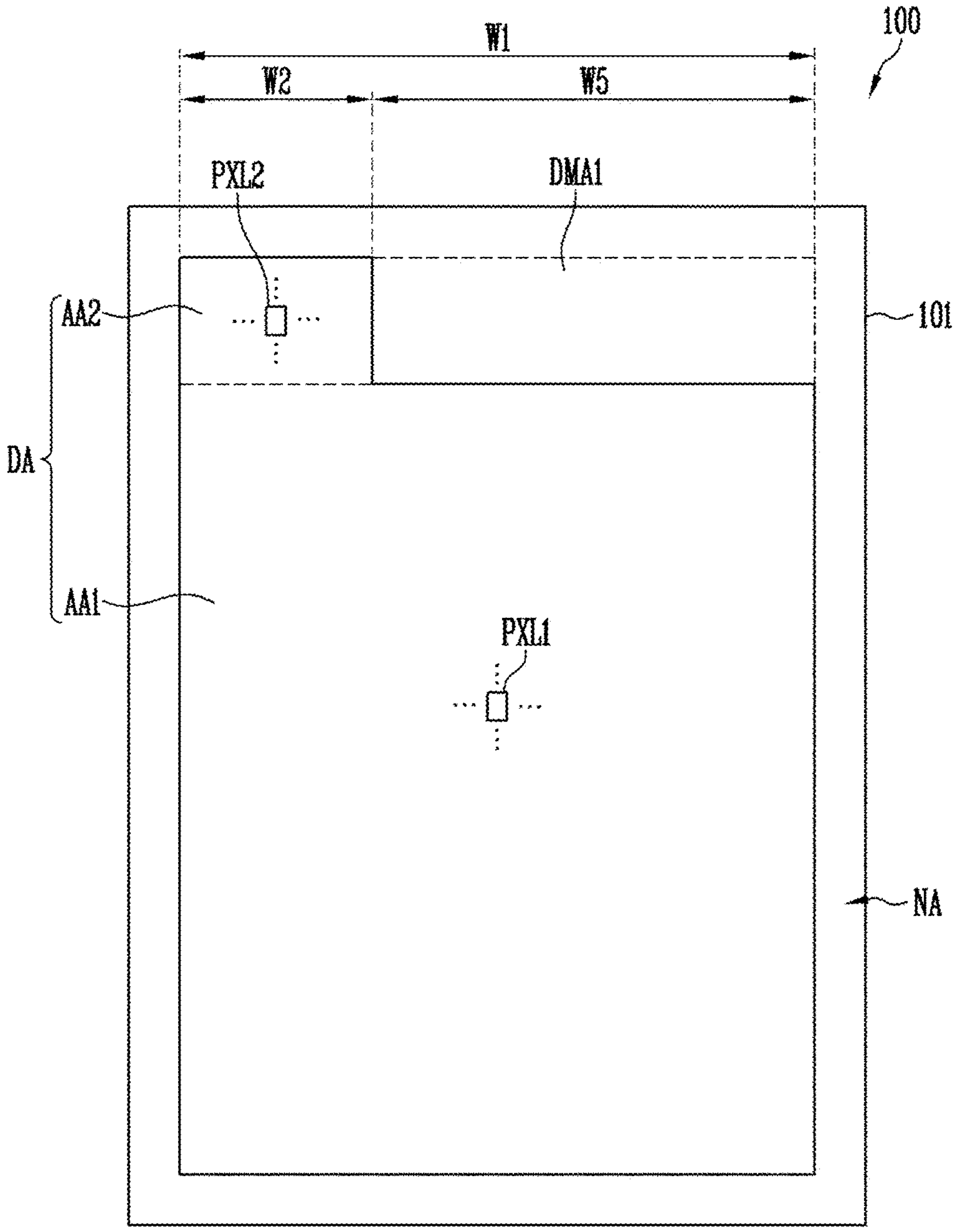
Figure 12:
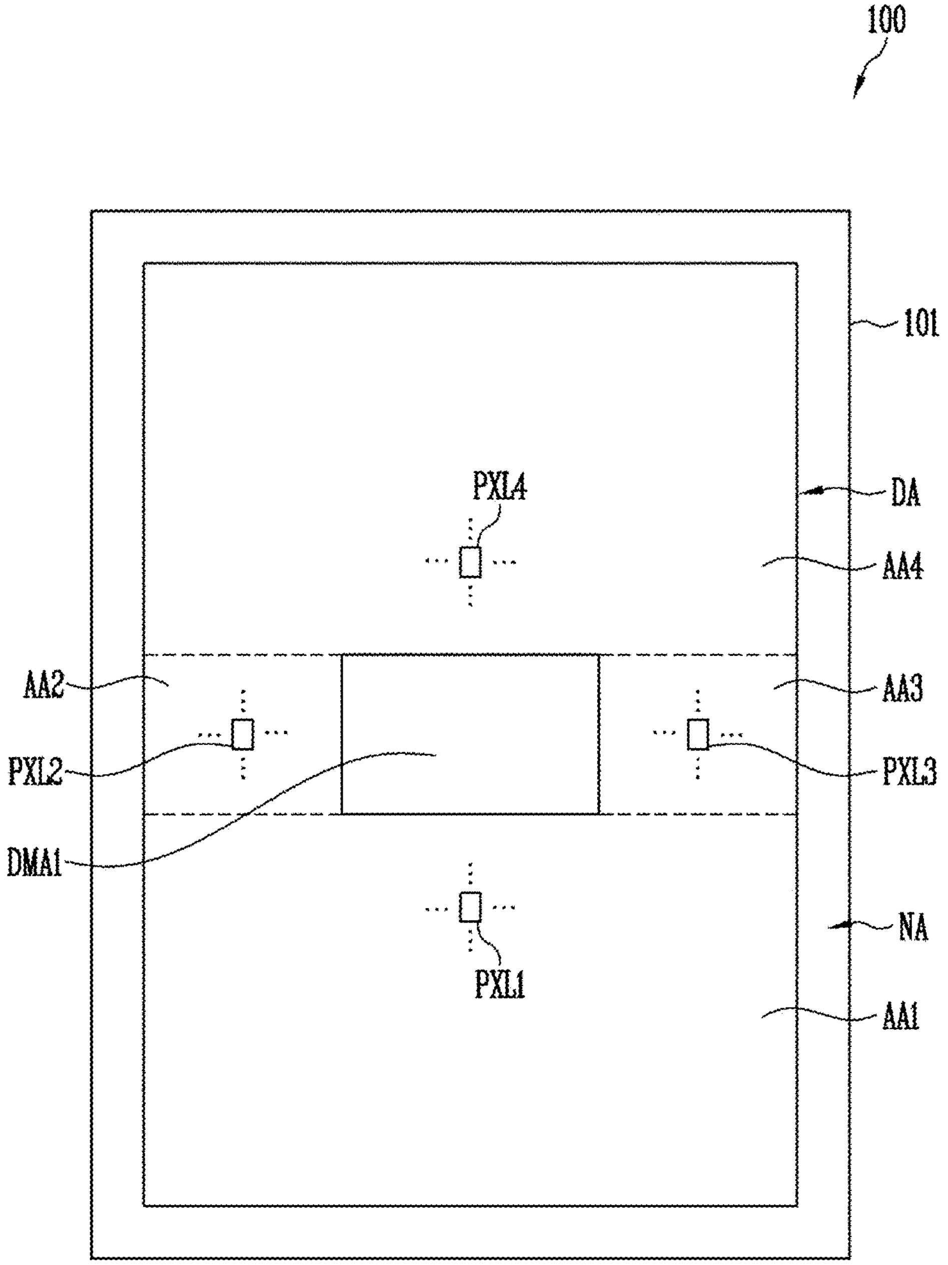

Referring to FIGS. 9 and 10, when outer corner portions of the second and third pixel regions AA2 and AA3 have a curved shape, the display panel 100 may further include at least one of a second dummy region DMA2 spaced apart from the first dummy region DMA1 with the second pixel region AA2 interposed therebetween and a third dummy region DMA3 spaced apart from the first dummy region DMA1 with the third pixel region AA3 interposed therebetween.

According to the exemplary embodiments, the display region DA includes three pixel regions, i.e., the first, second, and third pixel regions AA1, AA2, and AA3, but the exemplary embodiments are not limited thereto. For example, referring to FIG. 11, the display region DA may include two pixel regions. The display region DA may include the first and second pixel regions AA1 and AA2. In this case, the first dummy region DMA1 may be disposed in parallel to the second pixel region AA2 at one side (e.g., an upper end) of the first pixel region AA1. For example, the first dummy region DMA1 may be disposed at a concave part 101*b* formed by the second pixel region AA2 having a width (i.e., a second width W2) narrower than that of the first pixel region AA1 to be in contact with the first and second pixel regions AA1 and AA2. In this case, the first dummy region DMA1 may have a fifth width W5 determined according to the first and second width W1 and W2. For example, the fifth width W5 may have a value obtained by subtracting the second width W2 from the first width W1.

In addition, the display region DA may be divided into at least four pixel regions. For example, referring to FIG. 12, the display region DA may further include a fourth pixel region AA4 in which fourth pixels PXL4 are arranged. According to exemplary embodiments, the fourth pixel region AA4 may be disposed opposite to the first pixel region AA1 with respect to the second and third pixel regions AA2 and AA3 and the first dummy region DMA1, which are interposed between the first pixel region AA1 and the fourth pixel region AA4. In this case, the first dummy region DMA1 may be disposed at a central portion of the display region DA, surrounded by a plurality of pixel regions, e.g., the first, second, third, and fourth pixel regions AA1, AA2, AA3, and AA4.

Figure 13:
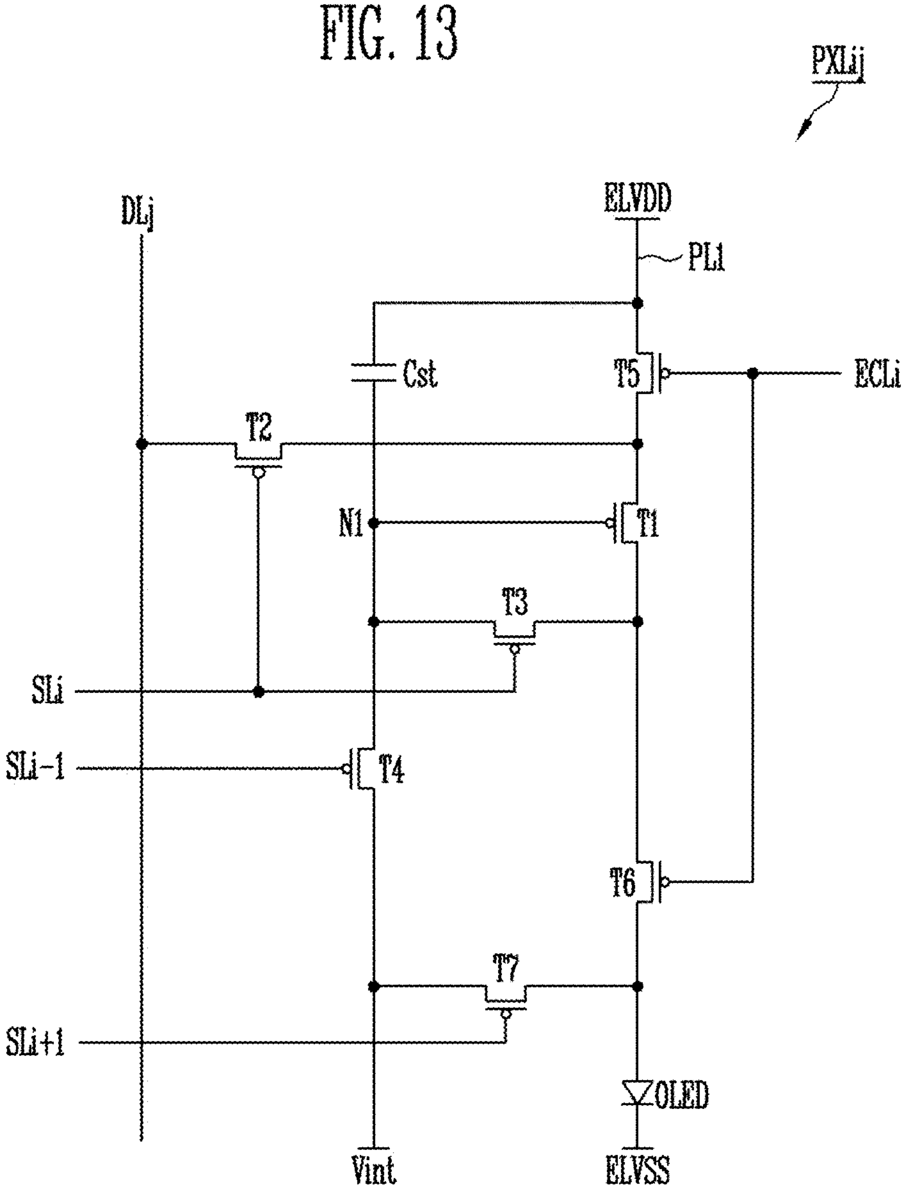
FIG. 13 illustrates a circuit diagram of a pixel according to an exemplary embodiment.

FIG. 13 illustrates a circuit diagram of a pixel according to an exemplary embodiment. For convenience purpose only, an exemplary pixel PXLij disposed on an ith (i is a natural number) horizontal line (horizontal pixel row) and a jth (j is a natural number) vertical line (vertical pixel column) of the display region DA is illustrated in FIG. 13. In other words, the pixel PXLij shown in FIG. 13 may be any one pixel among the above-described first, second, and third pixels PXL1, PXL2, and PXL3.

Referring to FIG. 13, the pixel PXLij according to the exemplary embodiment may include an organic light emitting diode OLED, first to seventh transistors T1 to T7, and a storage capacitor Cst.

An anode electrode of the organic light emitting diode OLED may be electrically coupled to the first transistor T1 via the sixth transistor T6, and a cathode electrode of the organic light emitting diode OLED may be electrically coupled to a second power source ELVSS. The organic light emitting diode OLED generates light with a luminance corresponding to an amount of current supplied through the first transistor T1.

The seventh transistor T7 may be electrically coupled between an initialization power source Vint and the anode electrode of the organic light emitting diode OLED. A gate electrode of the seventh transistor T7 may be electrically coupled to an (i+1)th scan line SLi+1. The seventh transistor T7 may be turned on in response to receiving a scan signal supplied through the (i+1)th scan line SLi+1, and supply the voltage of the initialization power source Vint to the anode electrode of the organic light emitting diode OLED. Here, the voltage of the initialization power source Vint may be set to a voltage equal to or lower than that of a data signal. That is, the voltage of the initialization power source Vint may be set to a voltage equal to or lower than the lowest voltage of the data signal. According to this exemplary embodiment, the anode initialization control line electrically coupled to the gate electrode of the seventh transistor T7 is the (i+1)th scan line SLi+1, but the exemplary embodiments are not limited thereto. For example, in another exemplary embodiment, the gate electrode of the seventh transistor T7 may be electrically coupled to an ith scan line (i.e., a current scan line) SLi. In this case, the voltage of the initialization power source Vint may be supplied to the anode electrode of the organic light emitting diode OLED via the seventh transistor T7 in response to receiving a scan signal supplied through the ith scan line SLi.

The sixth transistor T6 may be electrically coupled between the first transistor T1 and the organic light emitting diode OLED. A gate electrode of the sixth transistor T6 may be electrically coupled to an ith emission control line ECLi. The sixth transistor T6 may be turned off in response to receiving an emission control signal (e.g., a high-level gate-off voltage at which the fifth and sixth transistors T5 and T6 can be turned off) supplied through the ith emission control line ECLi, and be turned on otherwise.

The fifth transistor T5 may be electrically coupled between a first power line PL1 and the first transistor T1, and a gate electrode of the fifth transistor T5 may be electrically coupled to the ith emission control line ECLi. The fifth transistor T5 may be turned off in response to receiving the emission control signal supplied through the ith emission control line ECLi, and be turned on otherwise.

A first power source ELVDD having a voltage level higher than that of the second power source ELVSS may be supplied to the first power line PL1. That is, the first power source ELVDD may be set as a high-potential pixel power source, and the second power source ELVSS may be set as a low-potential pixel power source.

A first electrode of the first transistor (driving transistor) T1 may be electrically coupled to the first power line PL1 via the fifth transistor T5, and a second electrode of the first transistor T1 may be electrically coupled to the anode electrode of the organic light emitting diode OLED via the sixth transistor T6. A gate electrode of the first transistor T1 may be electrically coupled to a first node N1. The first transistor T1 may control an amount of current flowing from the first power source ELVDD to the second power source ELVSS via the organic light emitting diode OLED, corresponding to a voltage of the first node N1.

The third transistor T3 may be electrically coupled between the second electrode of the first transistor T1 and the first node N1. A gate electrode of the third transistor T3 may be electrically coupled to the ith scan line SLi. The third transistor T3 may be turned on in response to receiving the scan signal supplied through the ith scan line SLi, and electrically couple the second electrode of the first transistor T1 and the first node N1 to each other. Therefore, when the third transistor T3 is turned on, the first transistor T1 may be diode-coupled.

The fourth transistor T4 may be electrically coupled between the first node N1 and the initialization power source Vint. A gate electrode of the fourth transistor T4 may be electrically coupled to an (i−1)th scan line SLi−1. The fourth transistor T4 may be turned on in response to receiving a scan signal supplied through the (i−1)th scan line SLi−1, and supply the voltage of the initialization power source Vint to the first node N1. According to this exemplary embodiment, the (i−1)th scan line SLi−1 may be used as an initialization control line for initializing a gate node of the first transistor T1, i.e., the first node N1. However, the exemplary embodiments are not limited thereto. For example, in another exemplary embodiment, another control line such as an (i−2)th scan line SLi−2 may be used as the initialization control line for initializing the gate node of the first transistor T1.

The second transistor T2 may be electrically coupled between a jth data line DLj and the first electrode of the first transistor T1. A gate electrode of the second transistor T2 may be electrically coupled to the ith scan line SLi. The second transistor T2 may be turned on in response to receiving the scan signal supplied through the ith scan line SLi, and electrically couple the jth data line Dj and the first electrode of the first transistor T1 to each other. Thus, if the second transistor T2 is turned on by the scan signal supplied through the current scan line, i.e., the ith scan line SLi of the corresponding pixel PXLij, the data signal is transferred into the pixel PXLij through the jth data line DLj that is a data line of the pixel PXLij.

The storage capacitor Cst may be electrically coupled between the first power source ELVDD and the first node N1. The storage capacitor Cst may store a voltage corresponding to the data signal and the threshold voltage of the first transistor T1.

According to the exemplary embodiments, the structure of the pixel PXLij is not limited to the exemplary embodiment shown in FIG. 13. For example, the pixel PXLij may be implemented with a pixel having various structures current known in the art.

Figure 14:
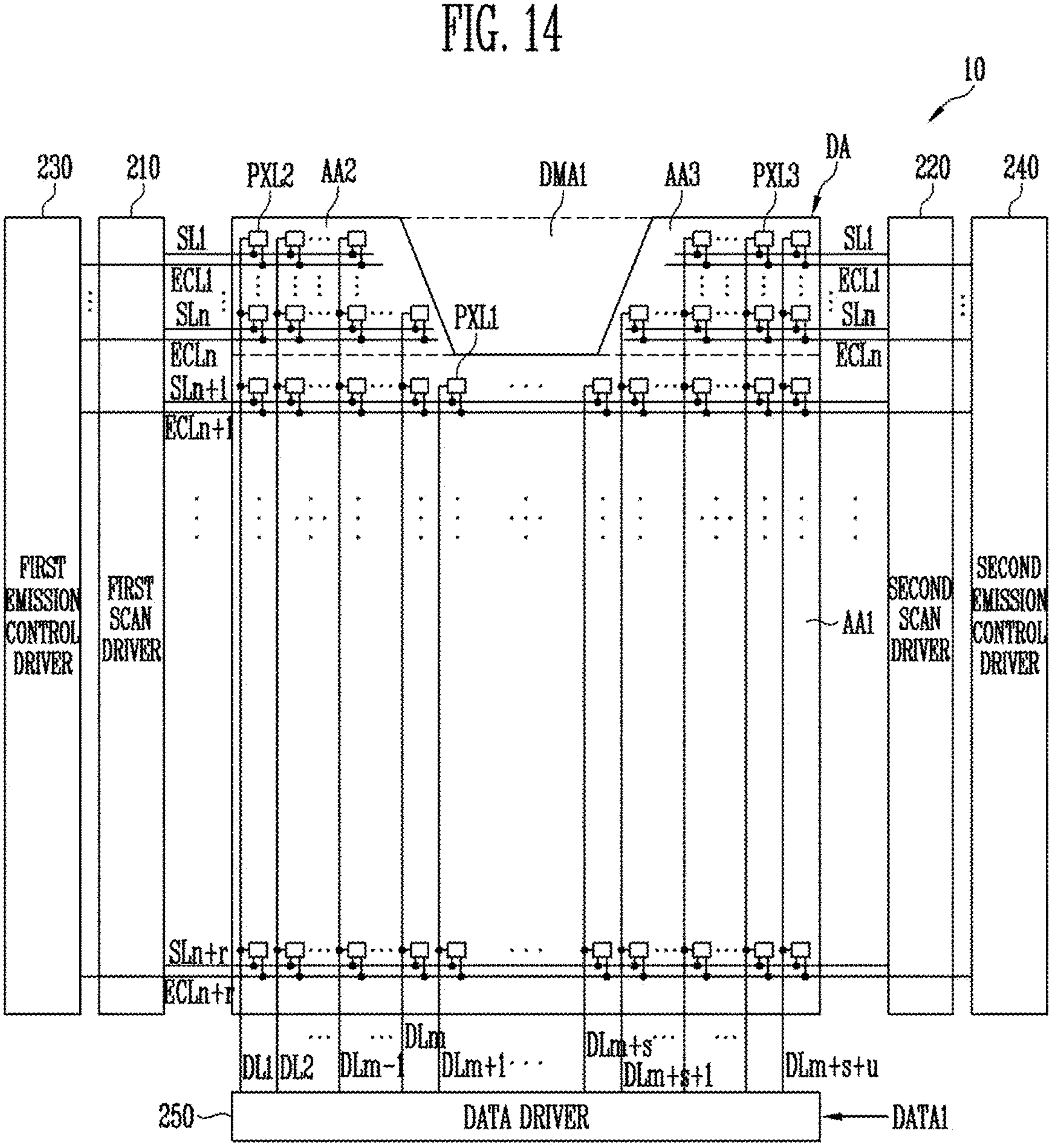
FIG. 14 illustrates a display device according to an exemplary embodiment.

FIG. 14 illustrates a display device according to an exemplary embodiment. For convenience, the above-described display region DA illustrated in FIG. 14 has a shape identical to that of the exemplary embodiment of FIG. 4. However the exemplary embodiments are not limited thereto, and the shape of the display region DA may be variously modified.

Referring to FIG. 14, the display device 10 according to the exemplary embodiment includes a display region DA, first, second, and third pixels PXL1, PXL2, and PXL3 arranged in the display region DA, scan lines SL1 to SLn+r and data lines DL1 to DLm+s+u, which are electrically coupled to the first, second, and third pixels PXL1, PXL2, and PXL3, at least one scan driver 210 and 220 for driving the scan lines SL1 to SLn+r, and a data driver 250 for driving the data lines DL1 to DLm+s+u. According to exemplary embodiments, the display device 10 may further include emission control lines ECL1 to ECLn+r electrically coupled to the first, second, and third pixels PXL1, PXL2, and PXL3 and at least one emission control driver 230 and 240 for driving the emission control lines ECL1 to ECLn+r.

First, second, and/or third pixels PXL1, PXL2 and/or PXL3 may be disposed on each horizontal line. For example, referring to FIG. 14, the second and third pixel regions AA2 and AA3 each includes n (n is a natural number of 2 or more) horizontal lines and the first pixel region AA1 includes r (r is a natural number of 2 or more) horizontal lines, and at least one second pixel PXL2 and at least one third pixel PXL3 may be disposed on each of first to nth horizontal lines (hereinafter, also referred to as Nth horizontal line). The first pixels PXL1 may be disposed on each of (n+1)th (hereinafter, also referred to as (N+1)th) to (n+r)th (hereinafter, also referred to as (N+R)th) horizontal lines of the display region DA.

Referring to FIG. 14, no pixel or driving line is disposed in the first dummy region DMA1. For example, the scan lines SL1 to SLn and emission control lines ECL1 to ECLn, which correspond to the second and third pixel regions AA2 and AA3, may be cut off in the first dummy region DMA1. In this case, first and second scan drivers 210 and 220 are respectively disposed at both sides of the display region DA, and first and second emission control drivers 230 and 240 are respectively disposed at each side of the display region DA, so that a scan signal and an emission control signal can be supplied to the second and third pixel regions AA2 and AA3.

The data lines DL1 to DLm+s+u are disposed on the respective vertical lines of the display region DA. The data lines DL1 to DLm+s+u may extend along the vertical direction in the display region DA to intersect the scan lines SL1 to SLn+r and the emission control lines ECL1 to ECLn+r. According to exemplary embodiments, the data lines DL1 to DLm+s+u may have different lengths. For example, data lines (e.g., DLm+1 to DLm+s) electrically coupled to only first pixels PXL1 at a lower end of the first dummy region DMA1 may be shorter than data lines (e.g., DL1 to DLm and DLm+s+1 to DLm+s+u) extending up to the second and third pixel regions AA2 and AA3 and electrically coupled to the second and third pixels PXL2 and PXL3 of the second and third pixel regions AA2 and AA3.

The first and second scan drivers 210 and 220 supply a scan signal to the scan lines SL1 to SLn+r during each frame period. For example, the first and second scan drivers 210 and 220 supply a scan signal to any one of the scan lines SL1 to SLn+r during each horizontal period, and the data signal can be supplied to first, second, and/or third pixels PXL1, PXL2, and/or PXL3 on a horizontal line selected by the scan signal.

The first and second emission control drivers 230 and 240 supply an emission control signal to the emission control lines ECL1 to ECLn+r during each frame period. For example, the first and second emission control drivers 230 and 240 may transmit an emission control signal to the first, second, and/or third pixels PXL1, PXL2, and/or PXL3 so that the pixels selected by the scan signal do not emit light during each horizontal period.

The data driver 250 is supplied with input image data (hereinafter, referred to as "first image data DATA1") through a host processor and/or a timing controller, and generates a data signal corresponding to the first image data DATA1. For example, the data driver 250 may generate a data signal, corresponding to each line data included in the first image data DATA1, and output the generated data signal to the data lines DL1 to DLm+s+u during each horizontal period. According to exemplary embodiments, the first image data DATA1 may be digital data, and the data driver 250 may convert the first image data DATA1 into a data signal in the form of an analog voltage by applying a predetermined gamma value (gamma voltage).

The first, second, and third pixels PXL1, PXL2, and PXL3 are driven by the first and second scan drivers 210 and 220, the first and second emission control drivers 230 and 240, and the data driver 250. Accordingly, an image corresponding to the first image data DATA1 is displayed in the display region DA.

Specifically, first, second, and third pixels PXL1, PXL2, and PXL3 may be selected by the scan signal supplied from a corresponding scan line (any one of SL1 to SLn+r) during a corresponding horizontal period in each frame period, to be supplied with the data signal from the data lines DL1 to DLm+s+u. For example, the first, second, and third pixels PXL1, PXL2, and PXL3 may be sequentially selected for each horizontal line during one frame period 1F, to be supplied with the data signal. Also, the first, second, and third pixels PXL1, PXL2, and PXL3 may be supplied with voltages of the first power source ELVDD and the second power source ELVSS. According to exemplary embodiments, the first, second, and third pixels PXL1, PXL2, and PXL3 may be further supplied with a voltage of the initialization power source Vint. The first, second, and third pixels PXL1, PXL2, and PXL3 emit light with a luminance corresponding to the data signal for every frame period (or do not emit light when a data signal corresponding to a black gray scale value is supplied). Accordingly, a predetermined image can be displayed in the display region DA.

Figure 15A:
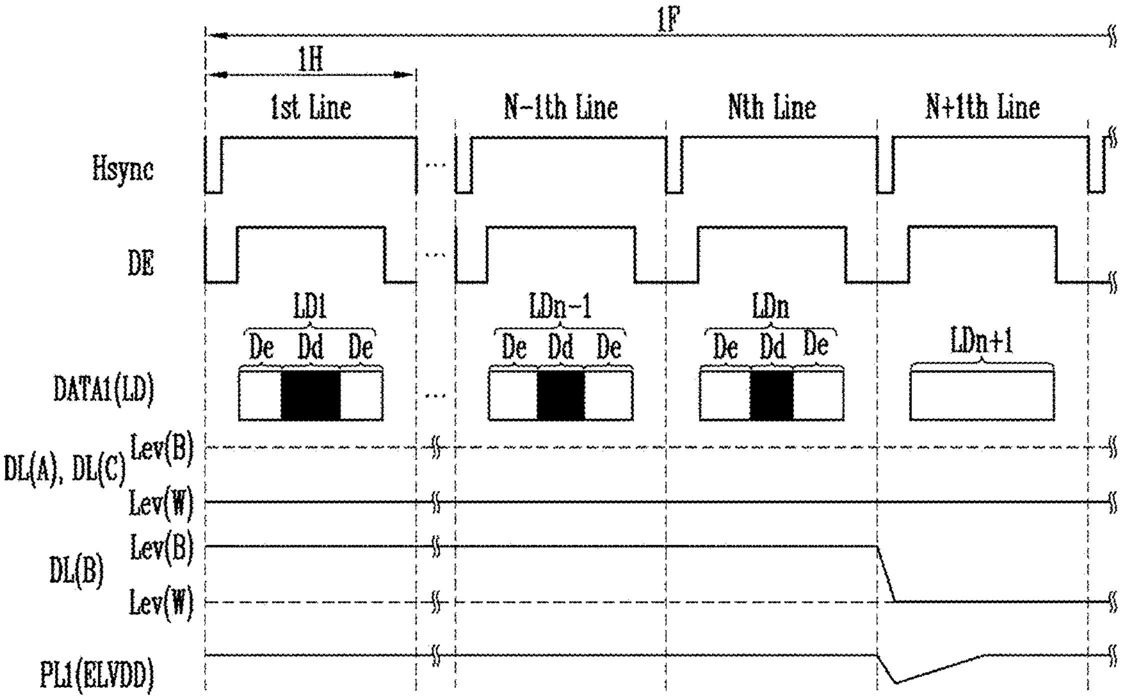
FIGS. 15A, 15B, and 15C illustrate a driving method of the display device according to an exemplary embodiment.
Figure 15B:
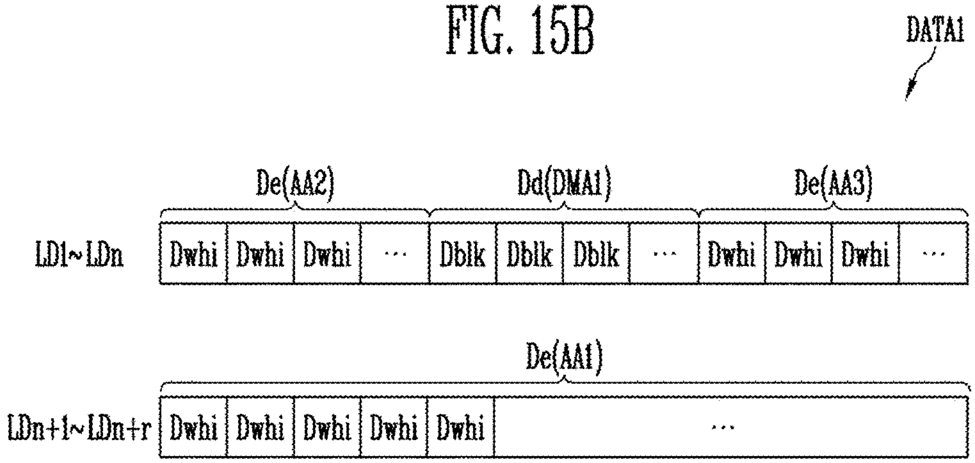
Figure 15C:
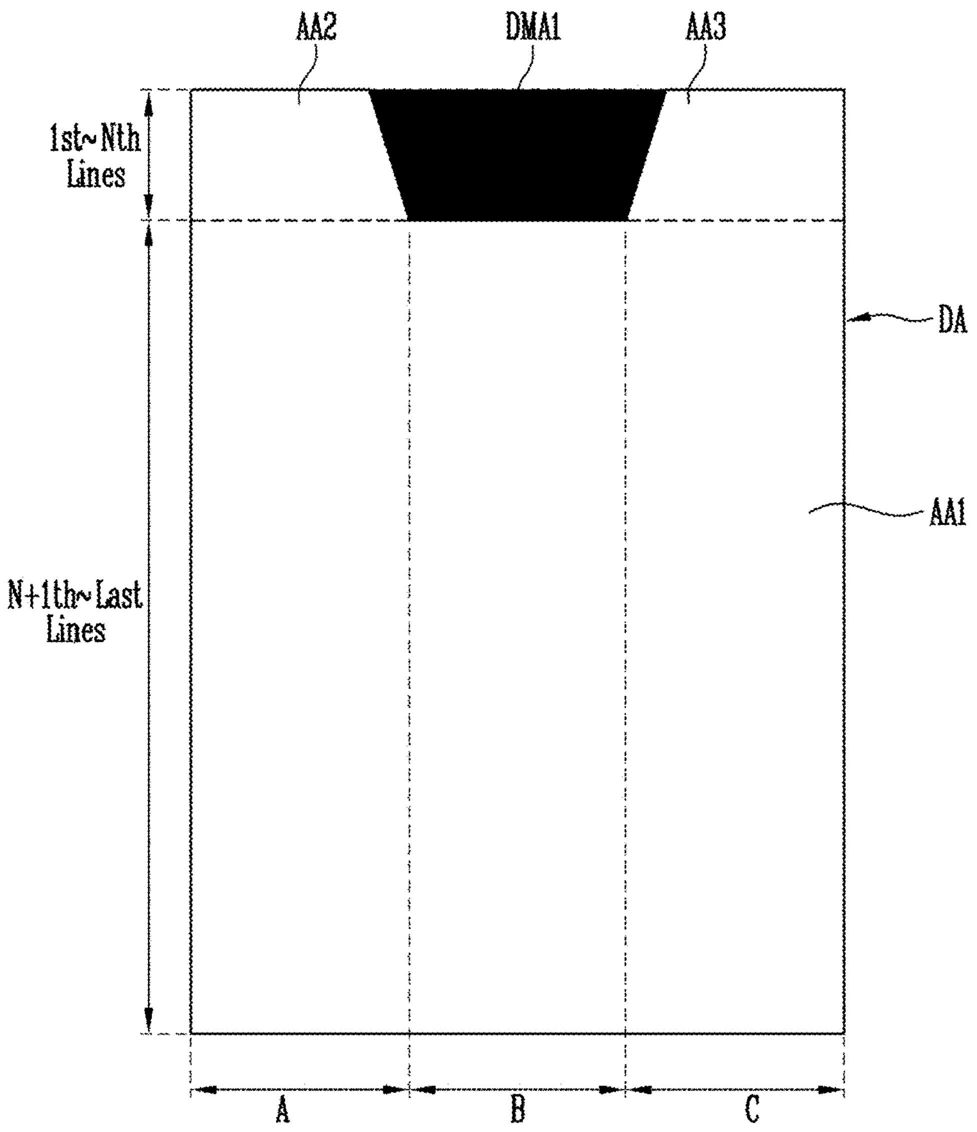

FIGS. 15A, 15B, and 15C illustrate a driving method of the display device according to an exemplary embodiment. Referring to FIGS. 15A, 15B, and 15C, an exemplary driving method of the display region DA to display a full-white screen (image) is illustrated for convenience. No image is displayed in the first dummy region DMA1 in which no pixel is disposed. Referring to FIG. 15C, a virtual image (e.g., an image of black) corresponding to a gray scale value of dummy data is illustrated on the first dummy region DMA1 so as to express the gray scale value of the dummy data.

Referring to FIGS. 15A, 15B, and 15C, a horizontal synchronization signal Hsync, a data enable signal DE, and first image data DATA1 are supplied to the data driver 250 during each frame period 1F. Then, the data driver 250 generates a data signal corresponding to each line data LD, which is included in the first image data DATA1, and supplies the data signal to data lines DL during each horizontal period 1H.

The first image data DATA1 may include effective data De corresponding to the display region DA and dummy data Dd corresponding to the first dummy region DMA1. Hereinafter, for convenience of description, it is assumed that the second and third pixels PXL2 and PXL3 are disposed on first to Nth (N is a natural number of 2 or more) horizontal lines of the display region DA and the first pixels PXL1 are disposed on an (N+1)th to last (N+R)th (R is a natural number of 2 or more) horizontal lines of the display region DA.

In this case, as shown in FIG. 15B, each of line data LD1 to LDn (hereinafter, also referred to as the first to Nth line data LD1 to LDn) respectively corresponding to the first to Nth horizontal lines in the first image data DATA1 may include effective data De(AA2) and De(AA3) corresponding to each horizontal line of the second pixel region AA2 and each horizontal line of the third pixel region AA3, respectively, and dummy data Dd(DMA1) corresponding to each horizontal line of the first dummy region DMA1. In addition, each of line data LDn+1 to LDn+r respectively corresponding to the (N+1)th to last (N+R)th horizontal lines in the first image data DATA1 may include effective data De(AA1) corresponding to each horizontal line of the first pixel region AA1.

According to exemplary embodiments, when a full-white image is displayed in the display region DA during a corresponding frame period 1F, effective data De corresponding to the respective first, second, and third pixels PXL1, PXL2, and PXL3 may all have a white gray scale value (i.e., the highest gray scale value) Dwhi corresponding to a white gray scale. The gray scale value of the effective data De may be changed depending on an image to be displayed, and accordingly, the gray scale value of the effective data De may have various gray scale values in addition to the white gray scale value Dwhi.

According to exemplary embodiments, the dummy data Dd may have a predetermined gray scale value belonging to a low gray scale range that is relatively dark. For example, the dummy data Dd may all have a black gray scale value (i.e., the lowest gray scale value) Dblk corresponding to a black gray scale. For example, when 256 luminance (brightness) levels are expressed by controlling emission of each of the first, second, and third pixels PXL1, PXL2, and PXL3 in the display device 10, different luminance may be expressed by providing gray scale values of "0" to "255" to the respective luminance levels from the darknest luminance (e.g., a luminance for expressing black) level to the brightest luminance (e.g., a luminance for expressing white) level. Accordingly, when a full-white image is to be displayed in the display region DA, effective data De corresponding to the respective first, second, and third pixels PXL1, PXL2, and PXL3 may all have a gray scale value of "255." The dummy data Dd corresponding to the other region except the display region DA (e.g., the first dummy region DMA1 in which any image is not actually displayed) may all have a gray scale value of "0" or a low gray scale range.

The data driver 250 supplied with first image data DATA1 generates a data signal corresponding to the first image data DATA1, and supplies a data signal of each horizontal period 1H to the data lines DL during the corresponding horizontal period 1H. Therefore, during first to Nth horizontal periods in which the second and third pixels PXL2 and PXL3 are selected, data lines DL(A) and DL(C) disposed in a region A and a region C may be charged to a voltage level Lev(W) corresponding to, for example, the white gray scale, and data lines DL(B) disposed in a region B may be charged to a voltage level Lev(B) corresponding to, for example, the black gray scale. Here, the regions A, B, and C schematically indicate regions in which data lines DL electrically coupled to the second and third pixels PXL2 and PXL3 are arranged and a region in which the other data lines DL are arranged. For example, the data lines DL(B) disposed in the region B may be (m+1)th to (m+s)th data lines DLm+1 to DLm+s at a lower end of the first dummy region DMA1.

During an (N+1)th horizontal period, a data signal corresponding to the white gray scale is supplied to all data lines DL(A), DL(B), and DL(C) of the display region DA. Accordingly, the voltage level of the data lines DL(B) disposed in the region B may be changed relatively widely or drastically from a voltage level Lev(B) corresponding to a low gray scale (e.g., the black gray scale) to a voltage level Lev(W) corresponding to a high gray scale (e.g., the white gray scale). For example, FIG. 15A illustrates that the voltage level of the data line DL(B) between the Nth Line and the N+1th Line drops sharply from the voltage level Lev(B) to the voltage level Lev(W).

Meanwhile, as shown in FIG. 13, the first power line PL1 is electrically coupled to each of the pixels of the display region DA, i.e., the first, second, and third pixels PXL1, PXL2, and PXL3. To connect the first power line PL1 to all the first, second, and third pixels PXL1, PXL2, and PXL3, the first power line PL1 may be branched off into several sub-lines disposed in the vicinity of the data lines DL. Therefore, when the voltage level of the data lines DL(B) disposed in the region B is changed relatively widely or drastically, a relatively large coupling effect occurs between the data lines DL(B) in the region B and the first power line PL1, and a voltage change (e.g., a voltage drop) in the first power line PL1 is induced from the crosstalk due to the relatively large coupling effect. Due to the voltage change of the first power line PL1, the amount of driving current flowing in first pixels PXL1 on the (N+1)th horizontal line is decreased. Therefore, as the luminance of the first pixels PXL1 on the (N+1)th horizontal line is decreased, a dark line in the form of a lateral line may be generated in a boundary region between the first pixel region AA1 and the second and third pixel regions AA2 and AA3, e.g., the (N+1)th horizontal line.

Figure 16A:
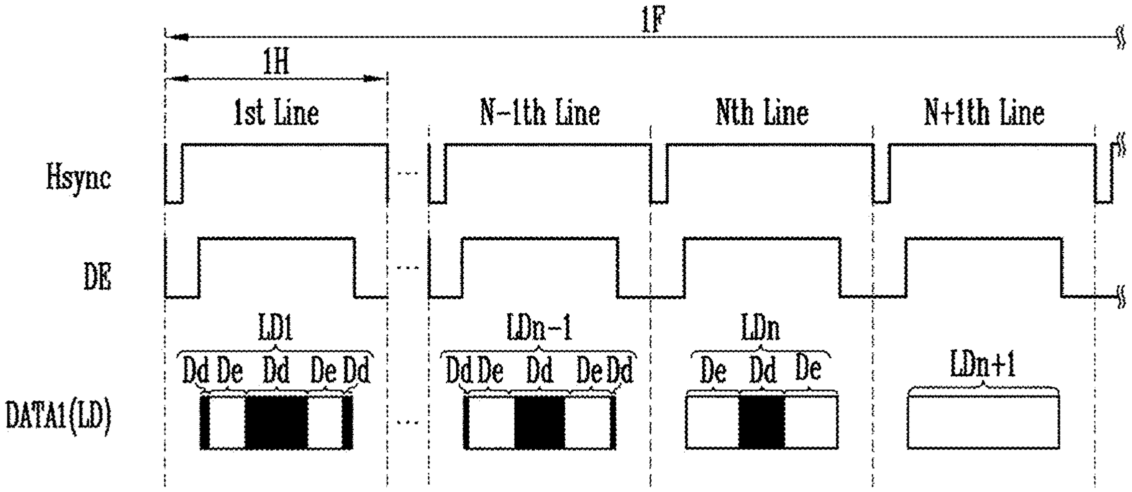
FIGS. 16A and 16B illustrate a driving method of the display device according to an exemplary embodiment.
Figure 16B:
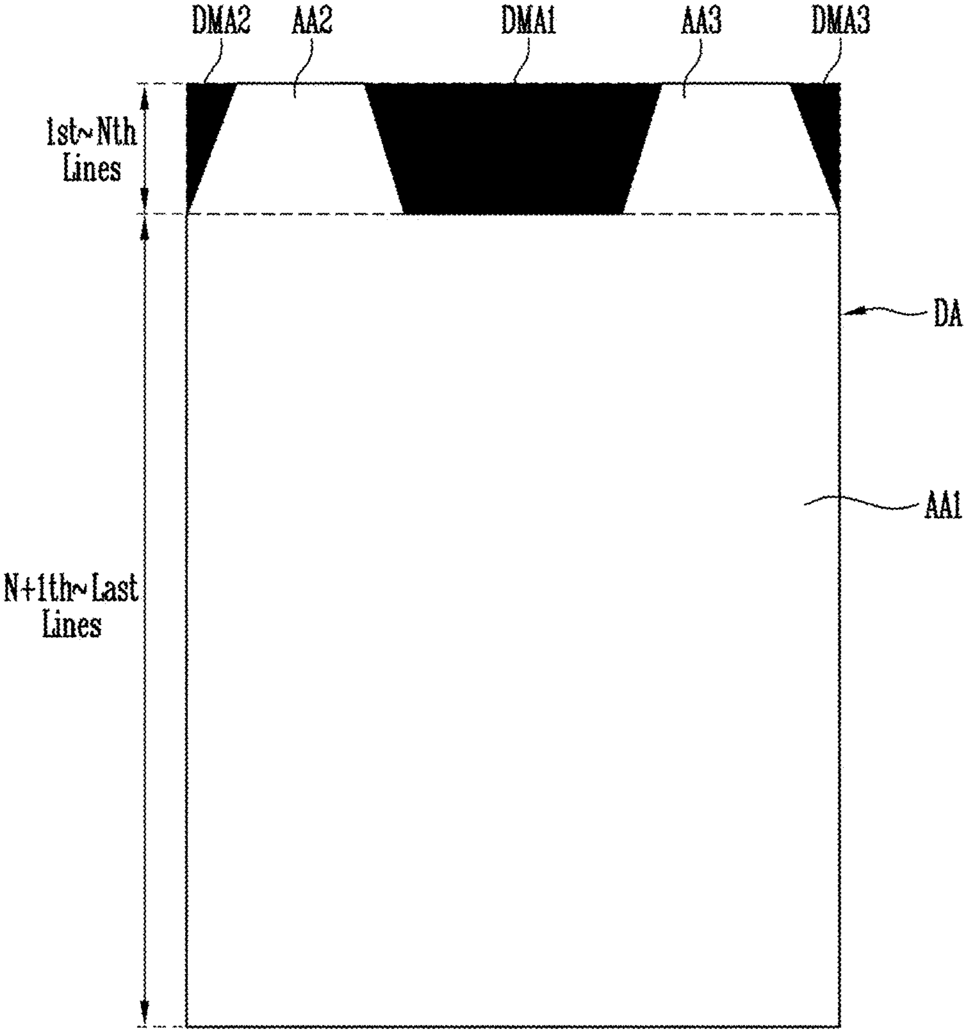

FIGS. 16A and 16B illustrate a driving method of the display device according to an exemplary embodiment. In FIGS. 16A and 16B, detailed descriptions of components similar or identical to those of the above-described embodiment will be omitted.

Referring to FIGS. 16A and 16B, the second dummy region DMA2 and/or the third dummy region DMA3 may be further disposed at one side of the display region DA, and the first image data DATA1 may further include dummy data Dd corresponding to the second dummy region DMA2 and the third dummy region DMA3. According to exemplary embodiments, the dummy data Dd may have the same black gray scale value Dblk as the dummy data Dd corresponding to the first dummy region DMA1.

Figure 17:
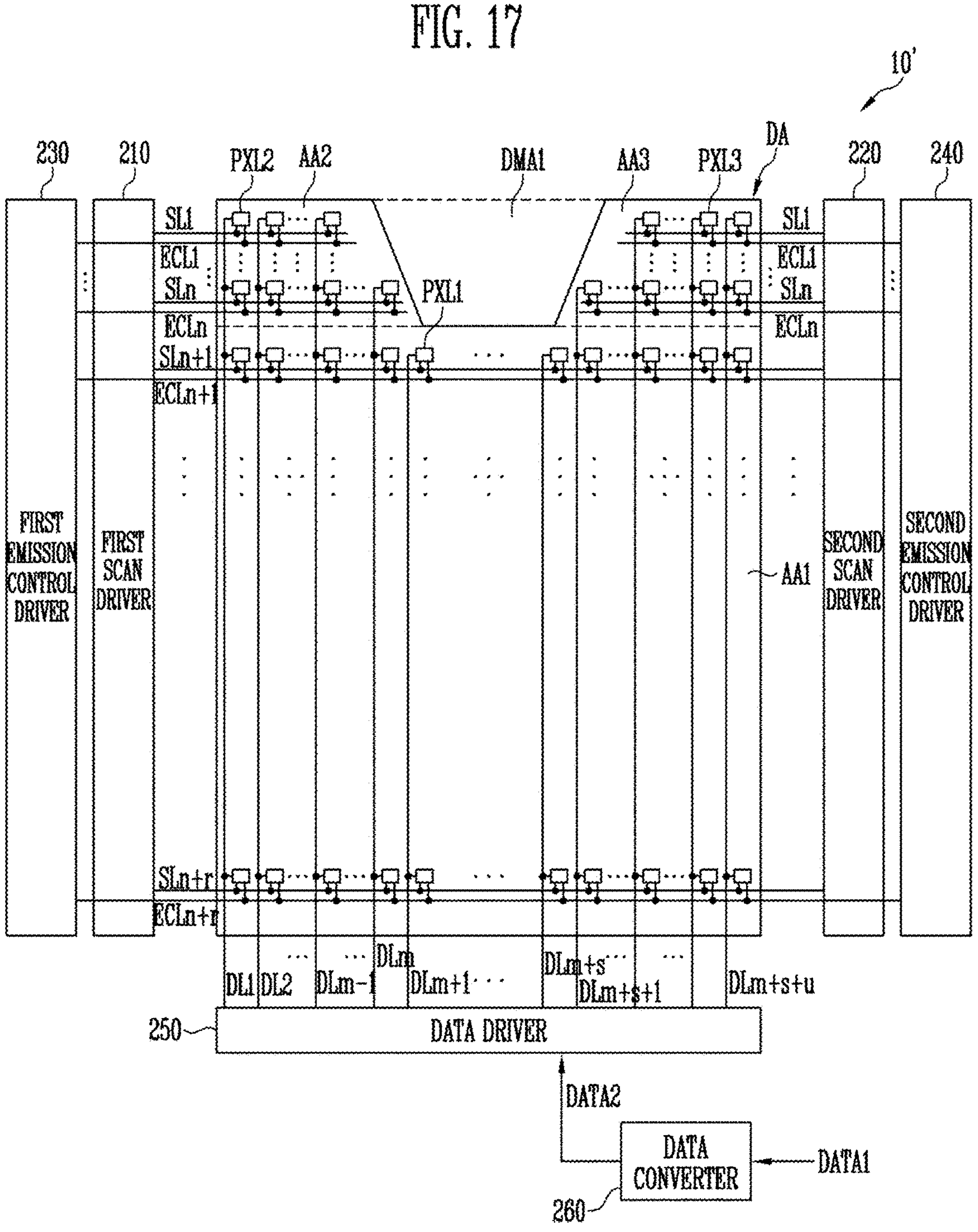
FIG. 17 illustrates a display device according to an exemplary embodiment.

FIG. 17 illustrates a display device according to an exemplary embodiment. In FIG. 17, components similar or identical to those of the above-described embodiment (e.g., the exemplary embodiment of FIG. 14) are designated by like reference numerals, and their detailed descriptions will be omitted.

Referring to FIG. 17, the display device 10' according to the exemplary embodiment further includes a data converter 260. The data converter 260 receives first image data DATA1 from the host processor and/or the timing controller, and generates second image data DATA2 by converting the first image data DATA1. According to exemplary embodiments, the data converter 260 converts dummy data Dd corresponding to one region of the first dummy region DMA1 in the first image data DATA1.

In an exemplary embodiment, the data converter 260 may convert the lowest gray scale value (e.g., the black gray scale value Dblk) of dummy data Dd corresponding to at least one region of the first dummy region DMA1 in the dummy data Dd included in the first image data DATA1 into a predetermined first gray scale value between the lowest gray scale value and the highest gray scale value (e.g., the white gray scale value Dwhi). For example, when the whole or a partial region of the first dummy region DMA1 is set as a predetermined conversion region to be data-converted, the data converter 260 may generate the second image data DATA2 by comprehensively changing gray scale values of dummy data Dd corresponding to the conversion region in the first image data DATA1.

According to the exemplary embodiments, the data converter 260 may gradually change a gray scale value (e.g., the black gray scale value Dblk) of dummy data Dd corresponding to at least one region of the first dummy region DMA1 in the dummy data Dd included in the first image data DATA1, thereby changing the gray scale value of the dummy data Dd in a gradation form. For example, the data converter 260 may generate the second image data DATA2 by gradually changing a gray scale value of dummy data Dd corresponding to a predetermined conversion region in the first image data DATA1 in a unit of at least one horizontal line (e.g., a unit of at least one line data LD). Here, the conversion region may include a plurality of sub-regions each including at least one horizontal line. In addition, the data converter 260 may generate the second image data DATA2 by converting a gray scale value of the dummy data Dd for the respective sub-regions into different values. For example, the data converter 260 may convert a gray scale value of dummy data Dd on two adjacent sub-regions into different values.

According to the exemplary embodiments, the data converter 260 may also change a gray scale value of dummy data Dd corresponding to the conversion region, using at least a portion of effective data De corresponding to the display region DA. For example, the data converter 260 may generate the second image data DATA2 by changing a gray scale value of at least a portion of the dummy data Dd included in the first image data DATA1, using a gray scale value of effective data De corresponding to a predetermined reference region in first image data DATA1 and/or second image data DATA2 of a just previous frame (e.g., a frame immediately previous to the current frame). For example, the data converter 260 may set the gray scale value of the dummy data Dd corresponding to the conversion region to be equal to the gray scale value of the effective data De corresponding to the reference region in the effective data De included in the first image data DATA1 and/or the second image data DATA2.

According to exemplary embodiments, the conversion region may be a fixed region that is previously set. For example, information on a conversion region may be stored in a nonvolatile memory provided in the data converter 260, the timing controller, and/or the host processor, and the data converter 260 may generate the second image data DATA2 by changing a gray scale value of dummy data Dd corresponding to the conversion region with reference to the memory. According to another exemplary embodiment, the conversion region may be set to be changed by the data converter 260, the timing controller, and/or the host processor depending on a predetermined condition or rule.

According to exemplary embodiments, the conversion region may include a region between the second and third pixels PXL2 and PXL3 disposed on the last Nth horizontal line of the second and third pixel regions AA2 and AA3. For example, the conversion region may include at least a partial region of the region between the second and third pixels PXL2 and PXL3 disposed on the Nth horizontal line, and be set as a portion or the whole of the first dummy region DMA1.

The data converter 260 may allow effective data De corresponding to the first, second, and third pixel regions AA1, AA2, and AA3 in the first image data DATA1 to maintain the original gray scale value. Accordingly, the gray scale value of the effective data De can be maintained as the same gray scale value as the first image data DATA1.

That is, according to exemplary embodiments, the data converter 260 may generate the second image data DATA2 by maintaining a gray scale value of effective data De in the first image data DATA1 and changing a gray scale value of dummy data Dd corresponding to at least one region of the first dummy region DMA1 (e.g., a predetermined conversion region set as the whole or a partial region of the first dummy region DMA1).

Thus, the display device 10' according to the exemplary embodiment of FIG. 17 displays an image corresponding to the first image data DATA1, regardless of whether the dummy data Dd has been converted. That is, the display device 10' according to the exemplary embodiment of FIG. 17 can display the substantially same image as the display device 10 according to the exemplary embodiment of FIG. 14.

However, in the display device 10' according to this embodiment, the data converter 260 changes a gray scale value of dummy data Dd corresponding to a predetermined conversion region set as at least a partial region of the first dummy region DMA1, particularly, a boundary between pixel regions (e.g., a boundary between the first pixel region AA1 and the second and third pixel regions AA2 and AA3) or at least a partial region adjacent to the first dummy region DMA1. For example, the data converter 260 may convert the gray scale value (e.g., the black gray scale value Dblk) of the dummy data Dd corresponding to the conversion region into a predetermined first gray scale value set as any one of gray scale values between the lowest gray scale value (e.g., the black gray scale value) and the highest gray scale value (e.g., the white gray scale value). Accordingly, it is possible to prevent or reduce manifestation of a dark line in the form of a lateral line in, for example, the (N+1)th horizontal line.

Referring to FIG. 17, the data driver 250 and the data converter 260 are separated from each other, but the exemplary embodiments are not limited thereto. For example, the data converter 260 may be configured in the data driver 250, or be integrated together with the data driver 250 and/or the timing controller in a display driver. For example, the data converter 260 may be configured in the timing controller or the host processor.

For example, in an exemplary embodiment, the first image data DATA1 supplied from the host processor may be converted into the second image data DATA2 in the display driver, and the data signal corresponding to the second image data DATA2 may be output to the data lines DL1 to DLm+s+u. In another exemplary embodiment, after the host processor converts the first image data DATA1, which is generated corresponding to the image to be displayed, into the second image data DATA2, the second image data DATA2 may be supplied to the display driver. Then, the display driver may output the data signal corresponding to the second image data DATA2 to the data lines DL1 to DLm+s+u. That is, according to the exemplary embodiments, the position of the data converter 260 is not particularly limited, and may be variously modified and implemented.

Figure 18A:
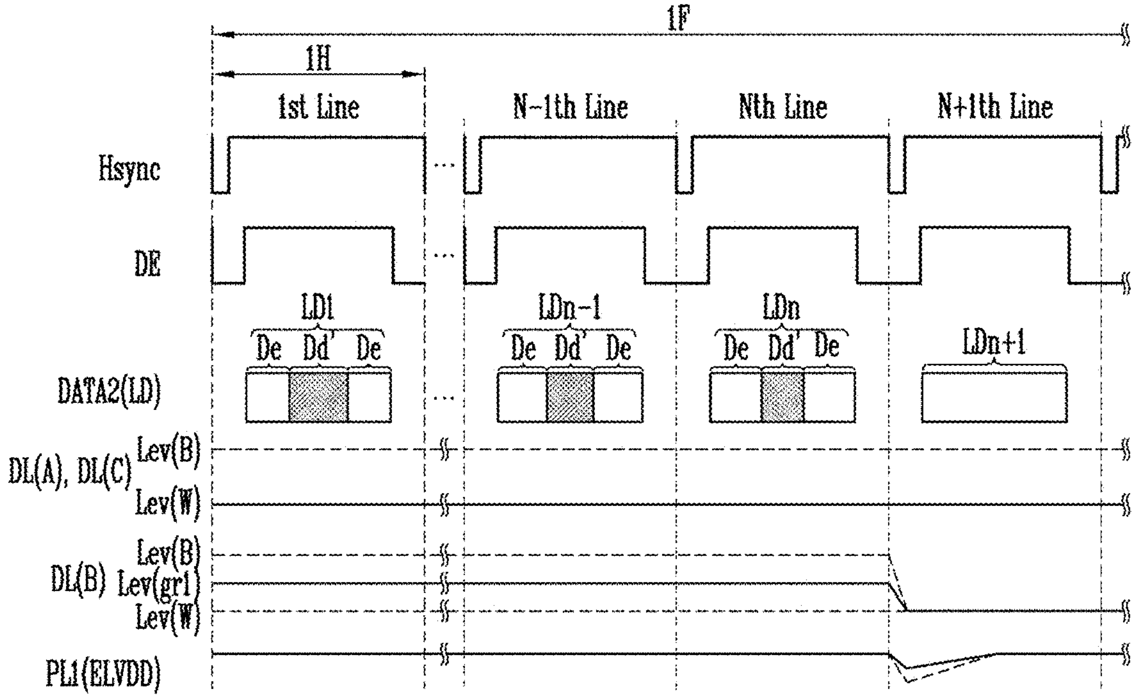
FIGS. 18A, 18B, and 18C illustrate a driving method of the display device according to an exemplary embodiment.
Figure 18B:
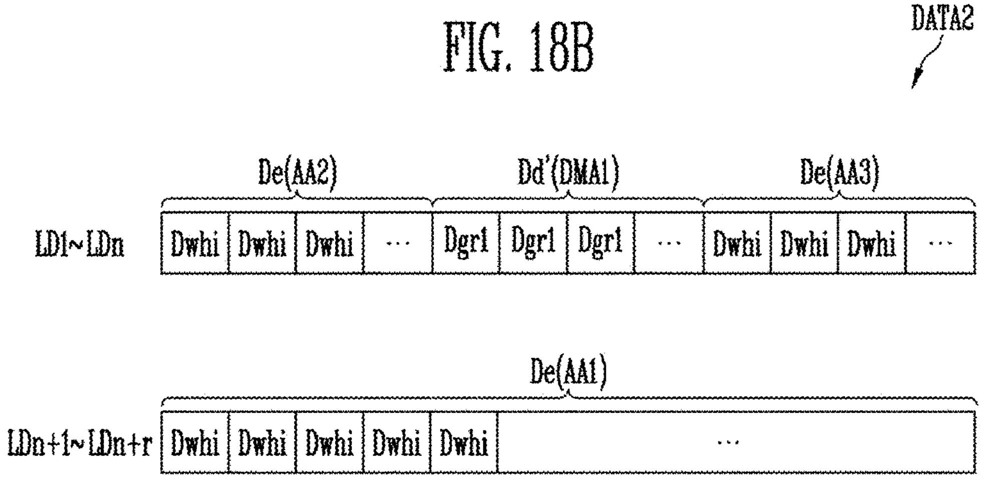
Figure 18C:
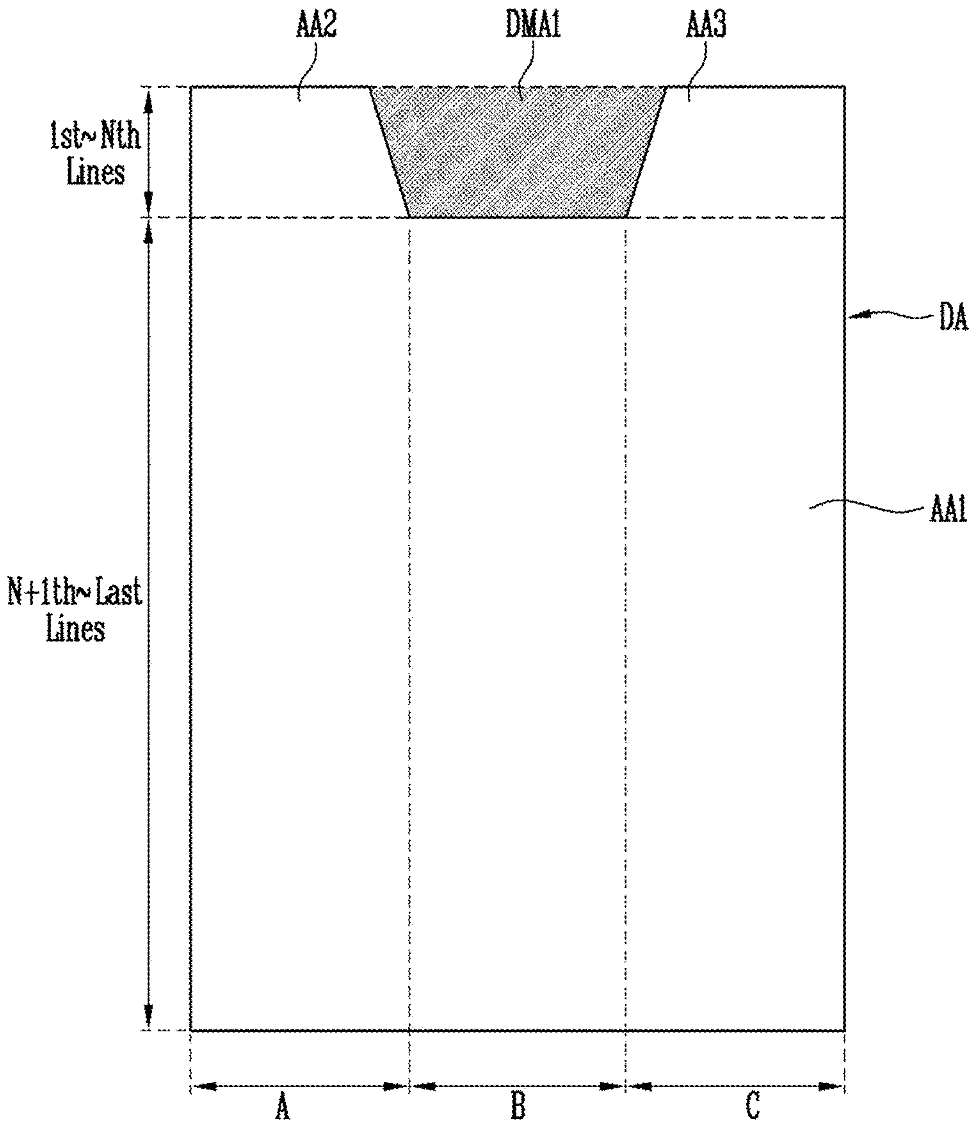

FIGS. 18A, 18B, and 18C illustrate a driving method of the display device according to an exemplary embodiment. Specifically, FIGS. 18A, 18B, and 18C illustrate an exemplary driving method of the display device 10' shown in FIG. 17, which includes the data converter 260. Referring to FIGS. 18A, 18B, and 18C, detailed descriptions of components similar or identical to those of the above-described embodiment (e.g., the exemplary embodiment of FIGS. 15A, 15B, and 15C) will be omitted.

Referring to FIGS. 18A, 18B, and 18C, a horizontal synchronization signal Hsync, a data enable signal DE, and second image data DATA2 are supplied to the data driver 250 during each frame period 1F. Then, the data driver 250 generates a data signal corresponding to each line data LD, which is included in the second image data DATA2, and supplies the data signal to data lines DL during each horizontal period 1H.

According to exemplary embodiments, the second image data DATA2 may be data converted by the data converter 260. For example, the data converter 260 may generate the second image data DATA2 by comprehensively converting all gray scale values of dummy data Dd corresponding to the whole of the first dummy region DMA1 in the first image data DATA1 into a predetermined first gray scale value Dgr1.

Accordingly, each of the line data LD1 to LDn corresponding to the first to Nth horizontal lines in the second image data DATA2 may include effective data De(AA2) corresponding to each horizontal line of the second pixel region AA2, effective data De(AA3) corresponding to each horizontal line of the third pixel region AA3, and converted dummy data Dd' (DMA1) corresponding to each horizontal line of the first dummy region DMA1. Here, each of the converted dummy data Dd' (DMA1) may have a first gray scale value Dgr1. Meanwhile, each of the line data LDn+1 to LDn+r corresponding to the (N+1)th to last horizontal lines in the second image data DATA2 may include effective data De(AA1) corresponding to each horizontal line of the first pixel region AA1.

That is, according to exemplary embodiments, the data converter 260 may convert a gray scale value of at least a portion (e.g., all) of dummy data Dd(DMA1) corresponding to the first dummy region DMA1 into the first gray scale value Dgr1 with respect to each of the line data LD1 to LDn corresponding to each horizontal line of the second and third pixel regions AA2 and AA3 in the line data LD included in the first image data DATA1, and maintain the gray scale value of the first image data DATA1 with respect to the gray scale value of the other data (e.g., at least effective data De).

According to exemplary embodiments, the first gray scale value Dgr1 may be set as a gray scale value between the lowest gray scale value (e.g., the black gray scale value) and the highest gray scale value (e.g., the white gray scale value). Also, the first gray scale value Dgr1 may be set as the gray scale value of a data signal that has an average voltage value of the voltage value of a data signal corresponding to the lowest gray scale value and the voltage value of a data signal corresponding to the highest gray scale value. The first gray scale value Dgr1 may be set as the gray scale value of a data signal that has a voltage value closest to the average voltage value among a plurality of intermediate gray scale values between the lowest grays scale value and the highest gray scale value. That is, the first gray scale value Dgr1 may be set as a gray scale value corresponding to any one data voltage that has an intermediate voltage or average voltage among data voltages corresponding to the respective gray scales. According to exemplary embodiments, when a gray scale value corresponding to at least a portion of dummy data Dd included in the first image data DATA1 is converted into the first gray scale value Dgr1, the data converter 260 may convert the gray scale value of the dummy data Dd into a predetermined first gray scale value Dgr1 set for each sub-pixel data. For example, the first gray scale value Dgr1 may be set to have a predetermined value for each of red, green, and blue sub-pixel data.

As described in the above embodiment, if a gray scale value of dummy data Dd corresponding to the whole of the first dummy region DMA1 is converted into the first gray scale value Dgr1, during a Kth (K is a natural number of N or less) horizontal period corresponding to a Kth horizontal line of the second and third pixel regions AA2 to AA3, a data signal corresponding to the effective data De(AA2) and De(AA3) of corresponding line data LD is supplied to the data lines DL(A) and DL(C) electrically coupled to second and third pixels PXL2 and PXL3 of the Kth horizontal line, and a data signal corresponding to the first gray scale value Dgr1 is supplied to the other data lines DL(B). Here, the other data lines DL(B) are data lines corresponding to the first dummy region DMA1, and may be the other data lines that are not electrically coupled to selected pixels (the second and third pixels PXL2 and PXL3 on the Kth horizontal line), based on, for example, the Kth horizontal line.

That is, during the first to Nth horizontal periods in which the second and third pixels PXL2 and PXL3 are selected, the data lines DL(A) and DL(C) disposed in the region A and region C are charged to a voltage level Lev(W) corresponding to, for example, the white gray scale value Dwhi. The data lines DL(B) disposed in the region B are charged to an intermediate voltage level Lev(gr1) corresponding to the first gray scale value Dgr1, regardless of the initial gray scale value included in the first image data DATA1.

During an (N+1)th horizontal period, a data signal having the voltage level Lev(W) corresponding to the white gray scale Dwhi is supplied to all data lines DL(A), DL(B), and DL(C) of the display region DA. At this time, the voltage level of the data lines DL(B) disposed in the region B may be changed to the voltage level Lev(W) corresponding to the white gray scale value Dwhi from the intermediate voltage level Lev(gr1) corresponding to the first gray scale value Dgr1 (e.g., an intermediated level or average level of the voltage level Lev(B) corresponding to the black gray scale value Dblk and the voltage level Lev(W) corresponding to the white gray scale value Dwhi).

In comparison with the exemplary embodiment illustrated in FIGS. 15A, 15B, and 15C, according to the present exemplary embodiment, the voltage variation value of the data lines DL(B) disposed in the region B is decreased, and thus, the voltage variation of the first power line PL1 is reduced. Accordingly, the present exemplary embodiment may prevent or reduce luminance degradation of the first pixels PXL1 on the (N+1)th horizontal line. According to the exemplary embodiment, a dark line that may be generated at a boundary region between the first pixel region AA1 and the second and third pixel regions AA2 and AA3 may be prevented or reduced.

Thus, according to the exemplary embodiment, in the display device 10' including a plurality of pixel regions disposed adjacent to each other, e.g., the first, second, and third pixel regions AA1, AA2, and AA3, the luminance degradation that may occur at a boundary region between the pixel regions may be prevented or reduced. Accordingly, the display device 10' can exhibit excellent image quality while implementing screens having various shapes.

Figure 19A:
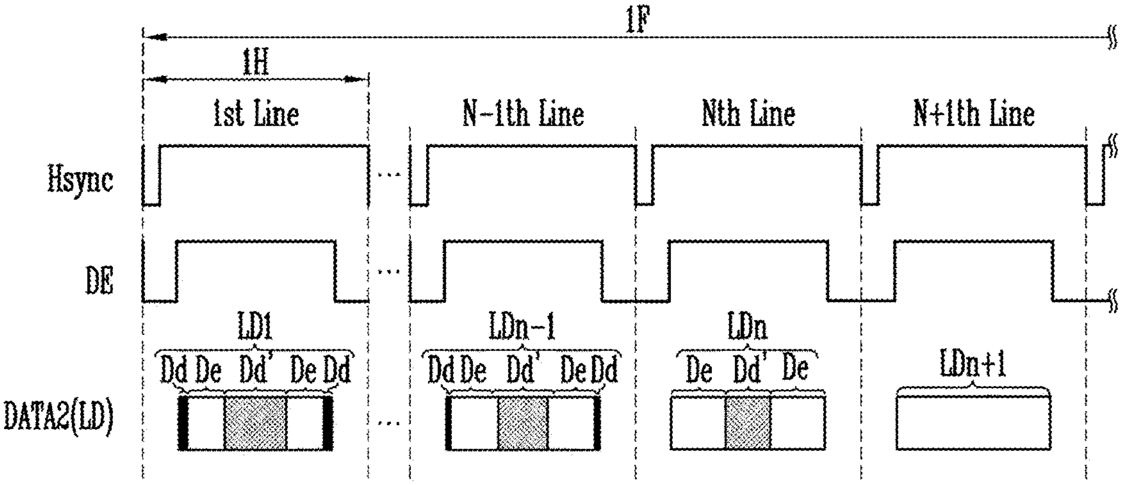
FIGS. 19A and 19B illustrate a driving method of the display device according to an exemplary embodiment.
Figure 19B:
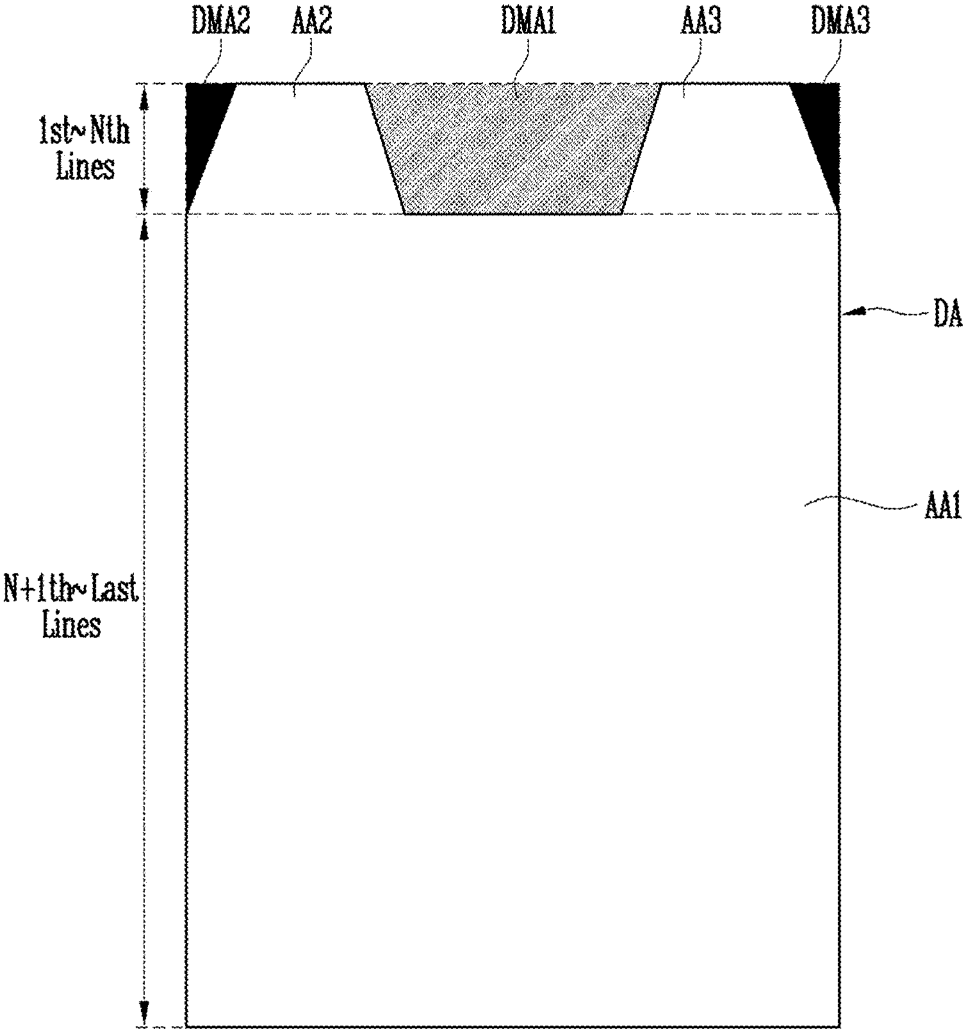

FIGS. 19A and 19B illustrate a driving method of the display device according to an exemplary embodiment. Specifically, FIGS. 19A and 19B illustrate an exemplary embodiment of the driving method of the display device including the data converter according to the exemplary embodiments. In FIGS. 19A and 19B, detailed descriptions of components similar or identical to those of the above-described embodiment will be omitted.

Referring to FIGS. 19A and 19B, the second dummy region DMA2 and/or the third dummy region DMA3 may be further disposed at one side of the display region DA, and the data converter 260 may convert gray scale values of some dummy data Dd corresponding to at least one region of the first dummy region DMA1 in the dummy data Dd included in the first image data DATA1, and maintain, as the original value, a gray scale value of the other dummy data Dd corresponding to the second dummy region DMA2 and/or the third dummy region DMA3. For example, the gray scale value of the dummy data Dd corresponding to the second dummy region DMA2 and/or the third dummy region DMA3 may be maintained as the black gray scale value Dblk.

Additionally, the fourth dummy region DMA4 and/or the fifth dummy region DMA5 may be further disposed as shown in FIG. 5, and the data converter 260 may convert a gray scale value of dummy data Dd corresponding to at least one region of the first dummy region DMA1. For example, a gray scale value of dummy data corresponding to the fourth dummy region DMA4 and/or the fifth dummy region DMA5 in the second image data DATA2 may be maintained as the black gray scale value Dblk.

That is, according to exemplary embodiments, the data converter 260 may convert gray scale values of some dummy data Dd corresponding to at least one region of the first dummy region DMA1 (e.g., the whole of the first dummy region DMA1), and maintain a gray scale value of the other dummy data Dd as the original gray scale value.

Figure 20A:
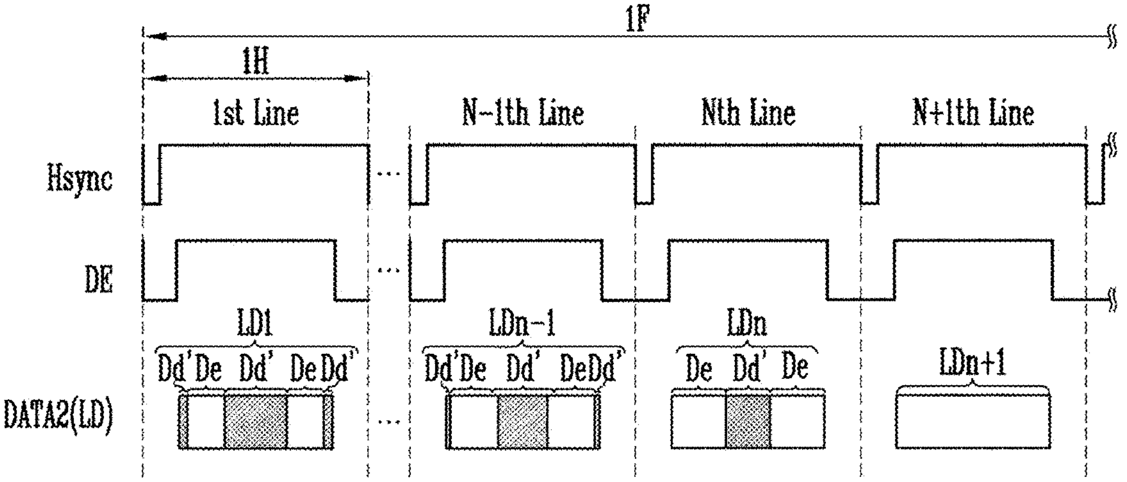
FIGS. 20A and 20B illustrate a driving method of the display device according to an exemplary embodiment.
Figure 20B:
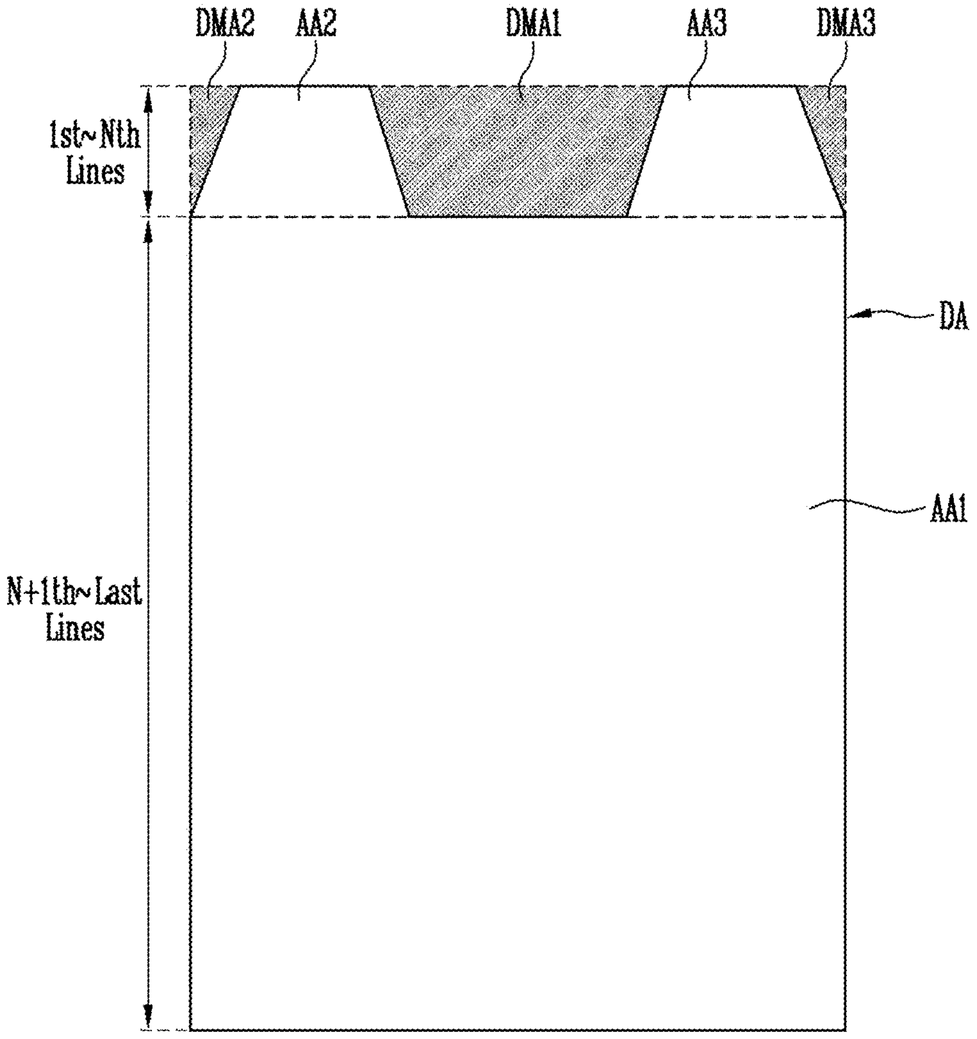

FIGS. 20A and 20B illustrate a driving method of the display device according to an exemplary embodiment. Specifically, FIGS. 20A and 20B illustrate an exemplary embodiment of the driving method of the display device including the data converter according to the exemplary embodiments. In FIGS. 20A and 20B, detailed descriptions of components similar or identical to those of the above-described embodiment will be omitted.

Referring to FIGS. 20A and 20B, the second dummy region DMA2 and/or the third dummy region DMA3 may be further disposed at one side of the display region DA, and the data converter 260 may convert all gray scale values of dummy data Dd included in the first image data DATA1. For example, the data converter 260 may generate the second image data DATA2 by converting all the gray scale values of the dummy data Dd included in the first image data DATA1 into a predetermined first gray scale value (i.e., a predetermined gray scale value between the lowest gray scale value and the highest gray scale value) Dgr1.

Figure 21A:
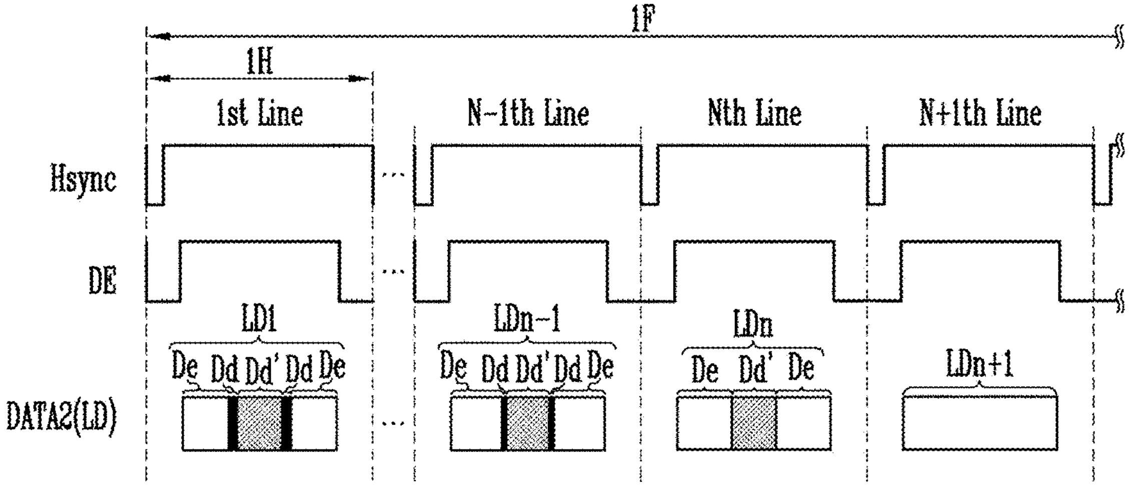
FIGS. 21A and 21B illustrate a driving method of the display device according to an exemplary embodiment.
Figure 21B:
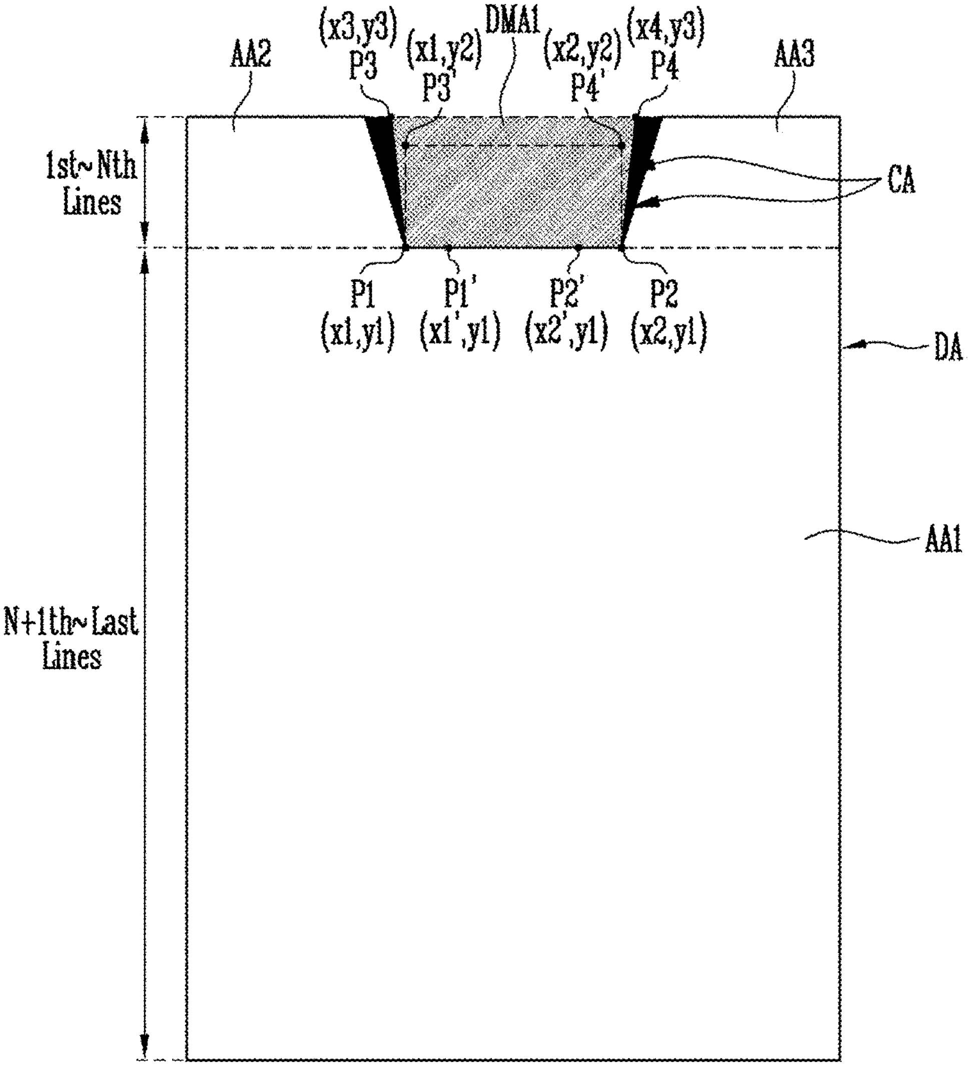

FIGS. 21A and 21B illustrate a driving method of the display device according to an exemplary embodiment. Specifically, FIGS. 21A and 21B illustrate an exemplary embodiment of the driving method of the display device including the data converter according to the exemplary embodiments. In FIGS. 21A and 21B, detailed descriptions of components similar or identical to those of the above-described embodiment will be omitted.

Referring to FIGS. 21A and 21B, according to exemplary embodiments, only a partial region of the first dummy region DMA1 may be set as a conversion region CA. In this case, the data converter 260 may generate a converted dummy data Dd' by converting gray scale values of some dummy data Dd corresponding to the conversion region CA in the dummy data Dd included in the first image data DATA1 into the first gray scale value Dgr1, and maintain a gray scale value of the other dummy data Dd as the original gray scale value included in the first image data DATA1.

According to exemplary embodiments, the conversion region CA may include a region between second and third pixels PXL2 and PXL3 disposed on the last Nth horizontal line of the second and third pixel regions AA2 and AA3. For example, the conversion region CA may be defined by first and second coordinate points P1 or P1' and P2 or P2' located between the second and third pixels PXL2 and PXL3 on the last horizontal line and third and fourth coordinate points P3 or P3' and P4 or P4' located between second and third pixels PXL2 and PXL3 disposed on a Kth (K is a natural number smaller than N) horizontal line of the second and third pixel regions AA2 and AA3.

According to exemplary embodiments, an X coordinate x1 or x1' of the first coordinate point P1 or P1' and an X coordinate x1, x2, x3, or x4 of the third or fourth coordinate point P3 or P3' or P4 or P4' may be equal to or different from each other. The X coordinate x1 or x1' of the first coordinate point P1 or P1' may be an X coordinate of a start point at which the first dummy region DMA1 is started on the Nth horizontal line or an X coordinate between the start point and an end point at which the first dummy region DMA1 is ended on the Nth horizontal line.

In addition, an X coordinate x2 or x2' of the second coordinate point P2 or P2' and an X coordinate x1, x2, x3, or x4 of the third or fourth coordinate point P3 or P3' or P4 or P4' may be equal to or different from each other. The X coordinate x2 or x2' of the second coordinate point P2 or P2' may be an X coordinate at an end point at which the first dummy region DMA1 is ended on the Nth horizontal line or an X coordinate between the end point and a start point at which the first dummy region DMA1 is started on the Nth horizontal line.

According to exemplary embodiments, the third and fourth coordinate points P3 or P3' and P4 or P4' may be located between second and third pixels PXL2 and PXL3 disposed on the first horizontal line, or be located between second and third pixels PXL2 and PXL3 disposed between the first horizontal line and the Nth horizontal line. For example, the positions of the third and fourth coordinate points P3 or P3' and P4 or P4' may be variously changed within a range belonging to the first dummy region DMA1, based on the first to (N−1)th horizontal lines. According to another exemplary embodiment, the third and fourth coordinate points P3 or P3' and P4 or P4' may be disposed on the Nth horizontal line, like the first and second coordinate points P1 or P1' and P2 or P2'. In this case, a gray scale value of dummy data Dd corresponding to the last Nth horizontal line may be changed.

Meanwhile, as for horizontal lines between the Kth horizontal line on which the third and fourth coordinate points P3 or P3' and P4 or P4' are located and the Nth horizontal line on which the first and second coordinate points P1 or P1' and P2 or P2' are located, start and end points of the conversion region CA on each horizontal line may be determined through linear interpolation between the X coordinates and/or the Y coordinates of the first, second, third, and fourth coordinate points P1, P2, P3, and P4. That is, the conversion region CA may be defined by the first, second, third, and fourth coordinate points P1, P2, P3, and P4 disposed in the first dummy region DMA1, and the position, shape, and/or area of the conversion region CA may be variously changed. For example, the conversion region CA may be implemented in various shapes including a rectangular shape, a square shape, a trapezoidal shape, a reversed trapezoidal shape, and the like, and the position and/or area of each shape may be variously changed.

As described in the above-described embodiment, one or more other dummy regions, e.g., at least one of the second, third, fourth, and fifth dummy regions DMA2, DMA3, DMA4, and DMA5 may be further provided, and a gray scale value of dummy data Dd on at least one region among the second, third, fourth, and fifth dummy regions DMA2, DMA3, DMA4, and DMA5 may also be changed. In this case, in the same manner that sets the conversion region CA in the first dummy region DMA1, another conversion region may be set in at least one of the second, third, fourth, and fifth dummy regions DMA2, DMA3, DMA4, and DMA5.

In the exemplary embodiment described above, the data converter 260 converts, as the first gray scale value Dgr1, gray scale values of at least some dummy data Dd corresponding to the first dummy region DMA1 of at least the Nth line data LDn among the line data LD included in the first image data DATA'. For example, the data converter 260 may convert, as the first gray scale value Dgr1, gray scale values of at least some dummy data Dd corresponding to the first dummy region DMA1 of the Kth to Nth line data LDk to LDn. Accordingly, during Kth to Nth horizontal periods, a data signal corresponding to the effective data De (i.e., the gray scale value of the effective data De) is supplied to data lines DL(A) and DL(C) electrically coupled to second and third pixels PXL2 and PXL3 on the Kth to Nth horizontal lines. In addition, during the Kth to Nth horizontal periods, a data signal corresponding to a predetermined first gray scale value Dgr1 is supplied to at least some of the other data lines DL(B).

That is, according to the exemplary embodiment, a data signal corresponding to the predetermined first gray scale value Dgr1 is supplied to at least some of data lines DL(B) at a lower end of the first dummy region DMA1 during at least the Nth horizontal period. Accordingly, although only a partial region of the first dummy region DMA1 is set as the conversion region CA, it is possible to prevent or reduce the above-described dark line, etc. from being generated.

FIGS. 22A, 22B, 22C, and 22D illustrate a driving method of the display device according to an exemplary embodiment. Specifically, FIGS. 22A, 22B, 22C, and 22D illustrate an exemplary embodiment of the driving method of the display device including the data converter according to the exemplary embodiments. In FIGS. 22A, 22B, 22C, and 22D, detailed descriptions of components similar or identical to those of the above-described embodiment will be omitted.

Referring to FIGS. 22A, 22B, 22C, and 22D, the data converter 260 may set the whole of a first dummy region DMA1 in first image data DATA1 as a conversion region, and generate second image data DATA2 by converting the first image data DATA1 such that a gray scale value of dummy data Dd corresponding to the whole of the first dummy region DMA1 is changed gradually (step by step) in the unit of at least one horizontal line.

Figure 22A:
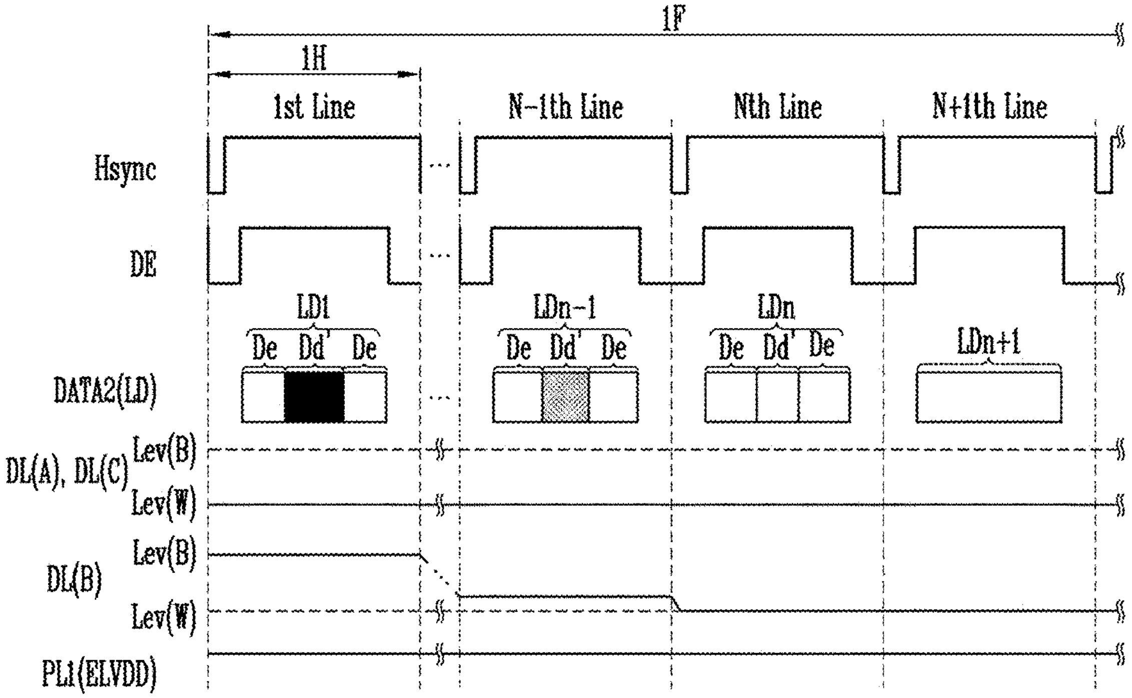
FIGS. 22A, 22B, 22C, and 22D illustrate a driving method of the display device according to an exemplary embodiment.
Figure 22B:
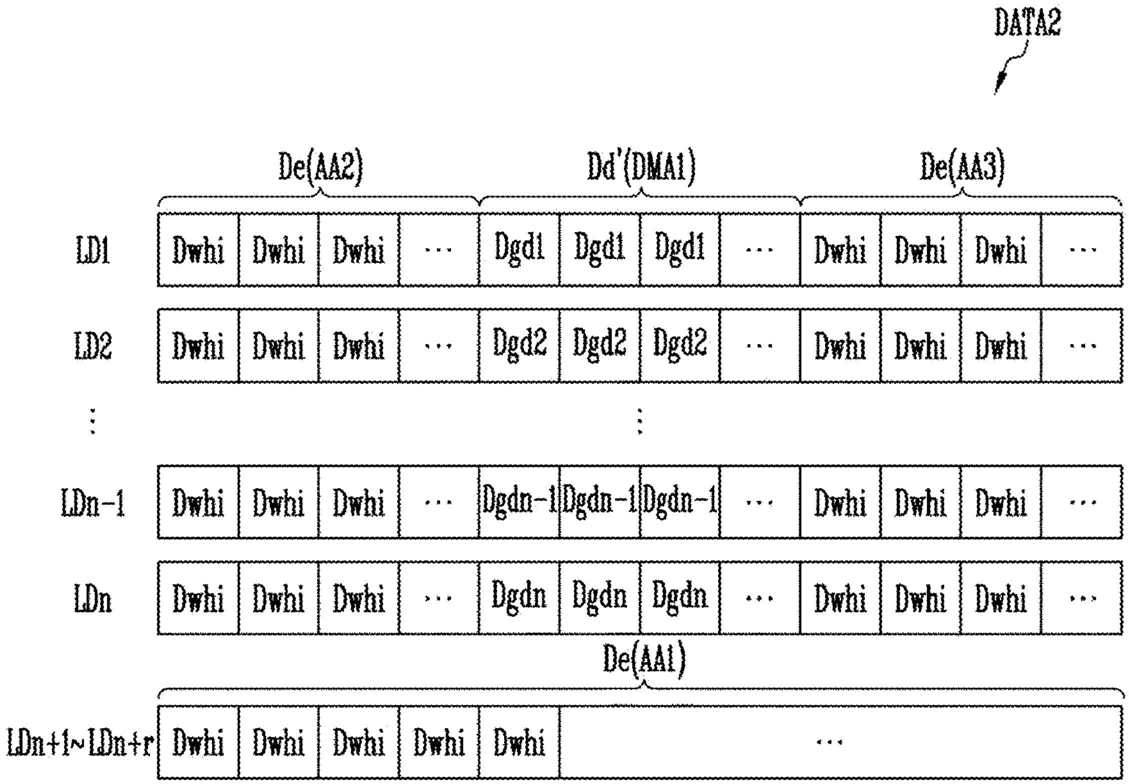
Figure 22C:
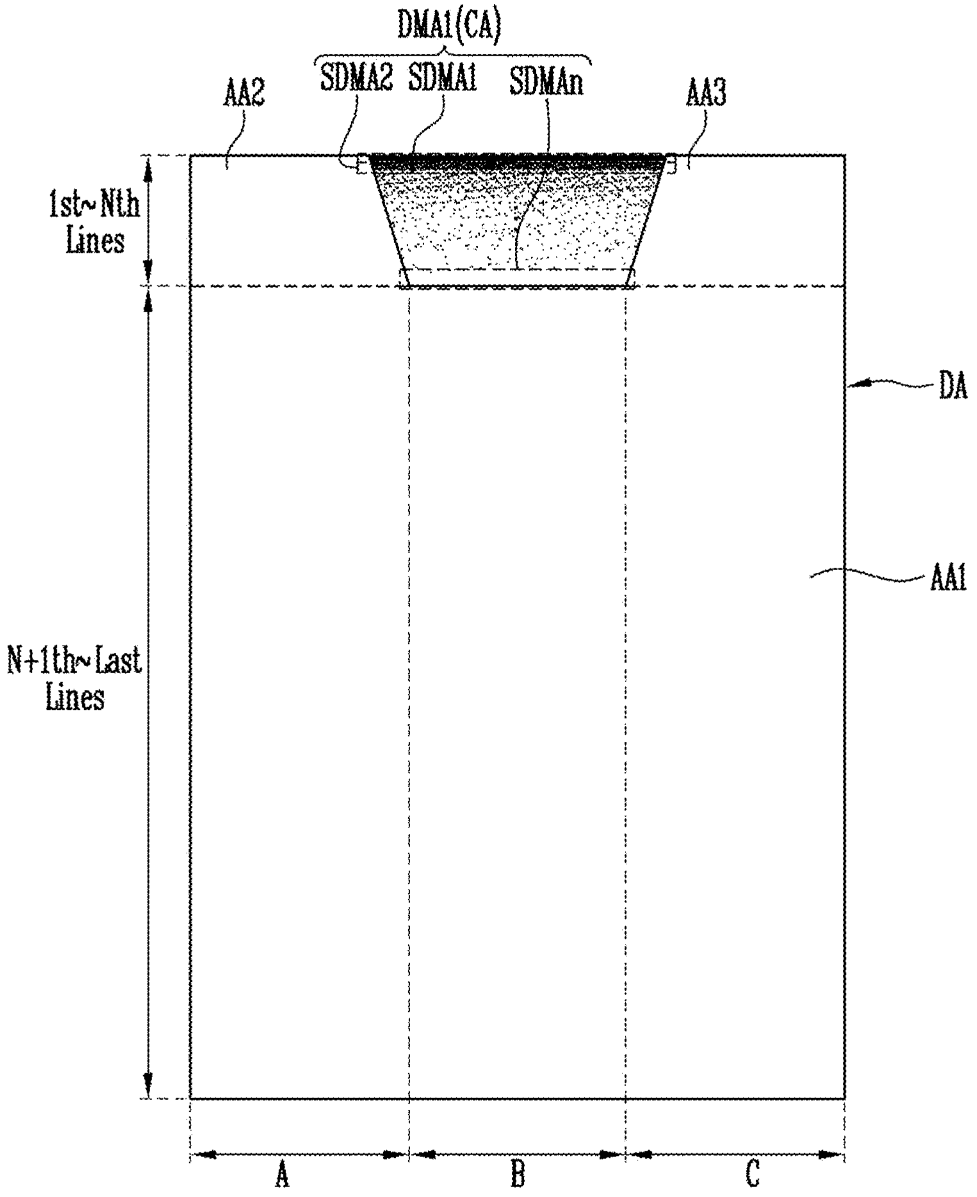
Figure 22D:
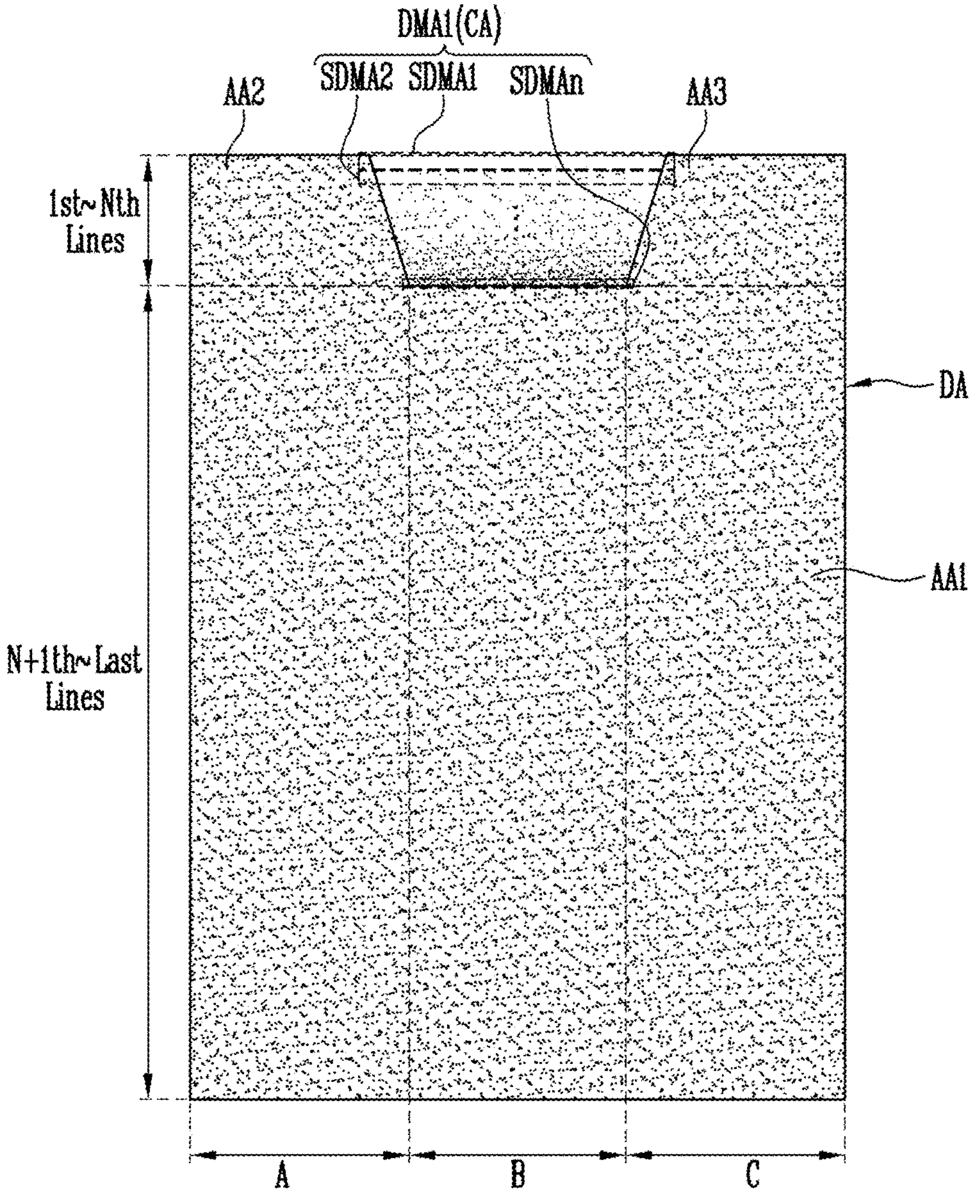

For example, in the exemplary embodiment shown in FIGS. 22C and 22D, the whole of the first dummy region DMA1 may be set as a conversion region CA, and the conversion region CA may include a plurality of sub-regions SDMA1 to SDMAn each including at least one horizontal line. The data converter 260 may set or change the gray scale value of the dummy data Dd for each of the sub-regions SDMA1 to SDMAn. For example, the data converter 260 may set gray scale values of the dummy data Dd, which correspond to two adjacent sub-regions of the sub-regions SDMA1 to SDMAn, to be different from each other.

According to exemplary embodiments, the data converter 260, as shown in FIG. 22C, may convert the first image data DATA1 such that the gray scale value of the dummy data Dd, which correspond to each of the sub-regions SDMA1 to SDMAn, is gradually increased as it becomes closer to the first pixel region AA1. In this case, dummy data Dd corresponding to an intermediate gray scale value between a gray scale value higher than a gray scale value of a low gray scale range (e.g., the black gray scale value Dblk) and the white gray scale value Dwhi, or the white gray scale value Dwhi may be supplied to at least some of data lines (e.g., DLm+1 to DLm+s) disposed at a lower end of the first dummy region DMA1 during the Nth horizontal period.

For example, the data converter 260 may set a gray scale value of dummy data Dd included in a first line data LD1 as a gray scale value Dgd1 of a first level, and set a gray scale value of dummy data Dd included in a second line data DL2 as a gray scale value Dgd2 of a second level, which is higher than the gray scale value Dgd1 of the first level. In this manner, the data converter 260 may generate a converted dummy data Dd' while gradually increasing the gray scale values of dummy data Dd included in the first to Nth line data LD1 to LDn.

For example, a gray scale value of dummy data Dd' (DMA1) included in a first line data LD1 of the second image data DATA2 may be set (or maintained) as a gray scale value of a low gray scale range that is relatively dark, and a gray scale value of dummy data Dd' (DMA1) included in the last Nth line data LDn of the second image data DATA2 may be set (or maintained) as a gray scale value of a high gray scale range that is relatively brighter. As an example, the gray scale value of the dummy data Dd' (DMA1) included in the first line data LD1 of the second image data DATA2 may be set (or maintained) as the black gray scale value Dblk corresponding to the black gray scale (or a low gray scale close to the black gray scale), and the gray scale value of the dummy data Dd' (DMA1) included in the last Nth line data LDn of the second image data DATA2 may be changed to the white gray scale value Dwhi corresponding to the white gray scale (or a high gray scale close to the white gray scale). In addition, gray scale values of dummy data Dd' (DMA1) included in second to (N−1)th line data LD2 to LDn−1 of the second image data DATA2 may be gradually changed to gray scale values Dgd2 to Dgdn−1 of second to (N−1)th levels, which correspond to any one of intermediate gray scale values (e.g., gray scale values between the gray scale value of the dummy data Dd' (DMA1) included in the first line data LD1 and the gray scale value of the dummy data Dd' (DMA1) included in the Nth line data LDn) that are gradually increased in the unit of one horizontal line.

Meanwhile, the gray scale values of effective data De(AA1), De(AA2), and De(AA3) respectively corresponding to the first, second, and third pixel regions AA1, AA2, and AA3 in the second image data DATA2 may be maintained equally to that in the first image data DATA1. Thus, the display region DA can display an image corresponding to the first image data DATA1, regardless of a change in gray scale value of the dummy data Dd included in the first image data DATA1.

According to exemplary embodiments, when gray scales of at least some of the dummy data Dd included in the first image data DATA1 are converted, the data converter 260 may gradually change the gray scale value of the dummy data Dd for each sub-pixel data. For example, the data converter 260 may gradually change the gray scale value of the dummy data Dd of each of red, green, and blue sub-pixel data.

As described in the above embodiment, if the gray scale value of the dummy data Dd is gradually increased throughout the whole of the first dummy region DMA1, during Kth (K is a natural number) to Nth (N is a natural number greater than K) horizontal periods corresponding to Kth to last Nth horizontal lines of the second and third pixel regions AA2 and AA3, a data signal corresponding to effective data De(AA2) and De(AA3) of corresponding line data LD (e.g., a data signal corresponding to the white gray scale value Dwhi) may be supplied to data lines DL(A) and DL(C) electrically coupled to second and third pixels PXL2 and PXL3 on the Kth to Nth horizontal lines. In addition, during the Kth to Nth horizontal periods, a data signal corresponding to the gray scale value gradually changed (e.g., increased) for every at least one horizontal period may be supplied to at least some of the other data lines DL(B). Here, the other data lines DL(B) are data lines corresponding to the first dummy region DMA1. For example, the other data lines DL(B) may be the other data lines that are not electrically coupled to selected pixels (second and third pixels PXL2 and PXL3 on the Kth horizontal line), based on the Kth horizontal line.

That is, during first to Nth horizontal periods in which the second and third pixels PXL2 and PXL3 are selected, the data lines DL(A) and DL(C) disposed in the region A and the region C are charged to a voltage level Lev(W) corresponding to, for example, the white gray scale value Dwhi, like the gray scale value included in the first image data DATA1. During the first to Nth horizontal periods, the data lines DL(B) disposed in the region B are charged to a voltage level corresponding to the gradually increased gray scale value, regardless of the initial gray scale value included in the first image data DATA1. For example, during the Nth horizontal period, the data lines DL(B) disposed in the region B may be charged to a voltage level Lev(W) corresponding to the white gray scale value Dwhi (or a voltage level corresponding to a predetermined gray scale value belonging to a high gray scale range).

After this, during an (N+1)th horizontal period, a data signal of a voltage level Lev(W) corresponding to the white gray scale value Dwhi (or a gray scale value corresponding to an image to be displayed) is supplied to all the data lines DL(A), DL(B), and DL(C) of the display region DA. At this time, during the Nth horizontal period, the data lines DL(B) are charged to a voltage level corresponding to a high gray scale value, e.g., a voltage level Lev(W) corresponding to the white gray scale value Dwhi, and hence the data lines DL(B) of the region B may have no or reduced voltage variation. During the Nth horizontal period, the data lines DL(B) disposed in the region B are charged to a voltage level corresponding to a high gray scale value similar to the white gray scale value Dwhi, and hence the voltage variation of the data lines DL(B) of the region B is decreased as compared with the exemplary embodiment described in FIGS. 15A, 15B, and 15C. Accordingly, it is possible to prevent or reduce a dark line from being generated in a boundary region between the first pixel region AA1 and the second and third pixel regions AA2 and AA3.

Meanwhile, in FIG. 22C, it is illustrated that the gray scale value of the dummy data Dd is gradually increased as approaching from the first to Nth horizontal lines of the first dummy region DMA1 (particularly, the conversion region CA), but the present disclosure is not limited thereto. For example, in another exemplary embodiment, as shown in FIGS. 22D, the gray scale value of the dummy data Dd may be gradually decreased as approaching from the first to Nth horizontal lines of the first dummy region DMA1 (particularly, the conversion region CA). As an example, when a data signal corresponding to a gray scale value of a low gray scale range is supplied to at least some first pixels PXL1 adjacent to the first dummy region DMA1 (e.g., first pixels PXL1 at a lower end of the first dummy region DMA1) among the first pixels PXL1 of the (N+1)th horizontal line, the data converter 260 may set the gray scale value of dummy data Dd included in the Nth line data LDn as a predetermined gray scale value of a low gray scale range (e.g., the black gray scale value Dblk).

According to another exemplary embodiment, the gray scale value of the dummy data Dd may be gradually changed in at least two directions (e.g., an upper direction and a lower direction), based on an arbitrary horizontal line included in the first dummy region DMA1 (particularly, the conversion region CA). According to another exemplary embodiment, the gray scale value of the dummy data Dd may be independently set or changed for each of the sub-regions SDMA1 to SDMAn.

According to the exemplary embodiment, in the display device 10' including a plurality of pixel regions disposed adjacent to each other, e.g., the first, second, and third pixel regions AA1, AA2, and AA3, it is possible to prevent or reduce degradation of image quality, which may occur in a boundary region between the pixel regions. Accordingly, screens having various shapes can be implemented, and the image quality can be improved.

Figure 23A:
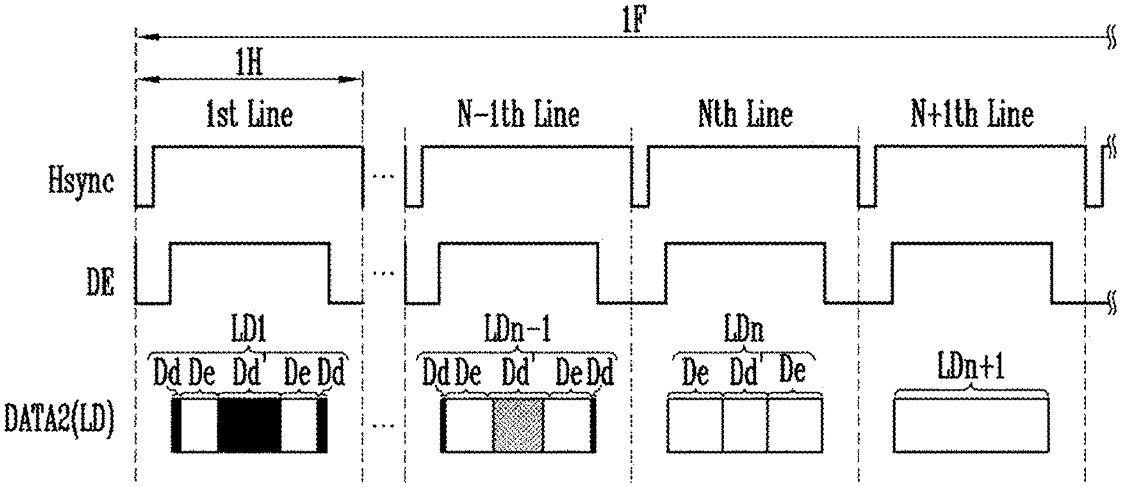
FIGS. 23A and 23B illustrate a driving method of the display device according to an exemplary embodiment.
Figure 23B:
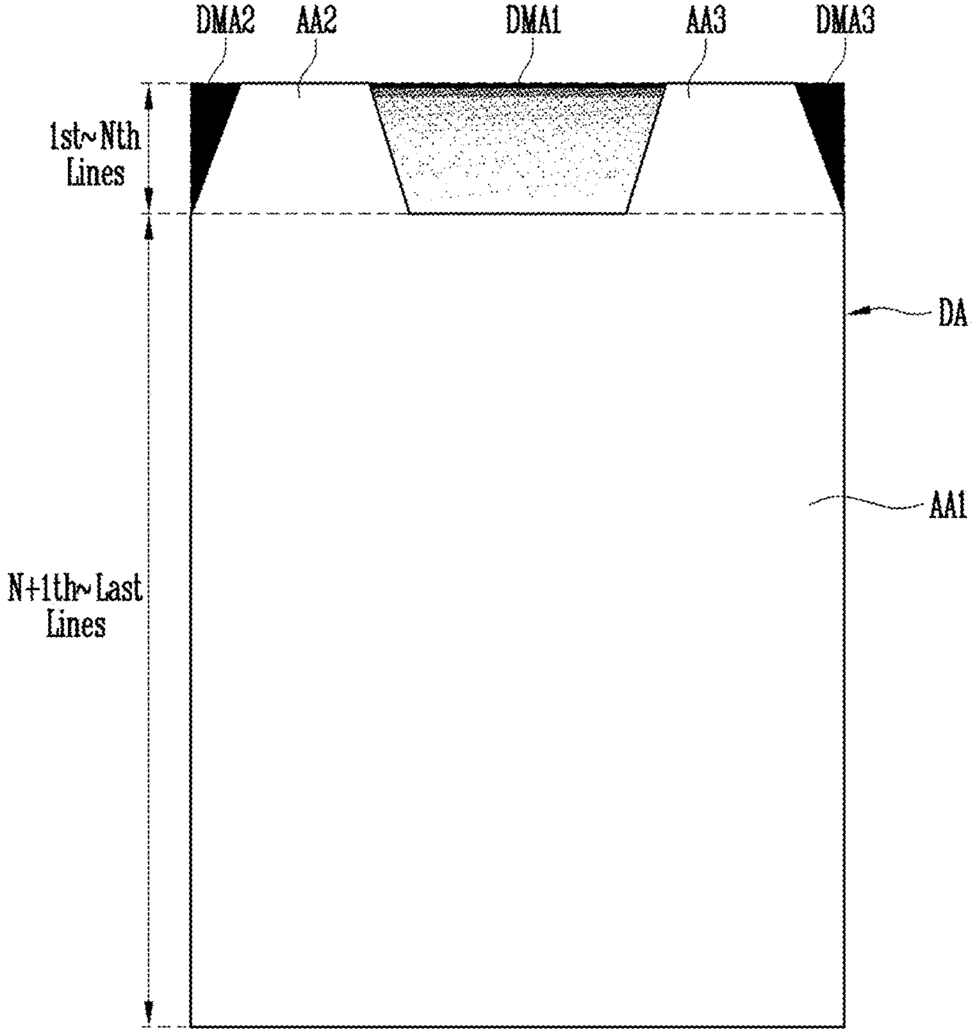

FIGS. 23A and 23B illustrate a driving method of the display device according to an exemplary embodiment. Specifically, FIGS. 23A and 23B illustrate an exemplary embodiment of the driving method of the display device including the data converter according to the exemplary embodiments. In FIGS. 23A and 23B, detailed descriptions of components similar or identical to those of the above-described embodiment will be omitted.

Referring to FIGS. 23A and 23B, the second dummy region DMA2 and/or the third dummy region DMA3 may be further disposed at one side of the display region DA, and the data converter 260 may gradually change only gray scale values of some dummy data Dd corresponding to at least one region (conversion region) of the first dummy region DMA1 among the dummy data Dd included in the first image data DATA1, and maintain, as the original value, a gray scale of the other dummy data Dd corresponding to the second dummy region DMA2 and/or the third dummy region DMA3. For example, a gray scale value of dummy data Dd corresponding to the second dummy region DMA2 and/or the third dummy region DMA3 may be maintained as the black gray scale value Dblk.

Additionally, according to exemplary embodiments, the fourth dummy region DMA4 and/or the fifth dummy region DMA5 may be further disposed as shown in FIG. 5, and the data converter 260 may gradually change only a gray scale value of dummy data Dd corresponding to at least one region of the first dummy region DMA1. For example, a gray scale value of dummy data corresponding to the fourth dummy region DMA4 and/or the fifth dummy region DMA5 among the second image data DATA2 may be maintained as the black gray scale value Dblk.

That is, according to exemplary embodiments, the data converter 260 may change the gray scales of some dummy data Dd corresponding to at least one region of the first dummy region DMA1 (e.g., the whole of the first dummy region DMA1) among the dummy data Dd included in the first image data DATA1, and maintain a gray scale value of the other dummy data Dd as the original gray scale value.

Figure 24A:
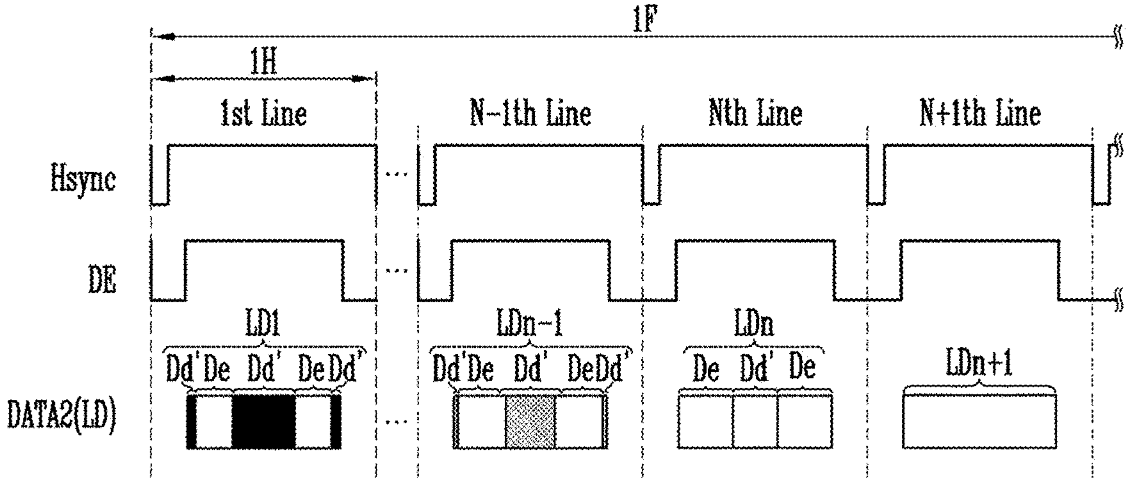
FIGS. 24A and 24B illustrate a driving method of the display device according to an exemplary embodiment.
Figure 24B:
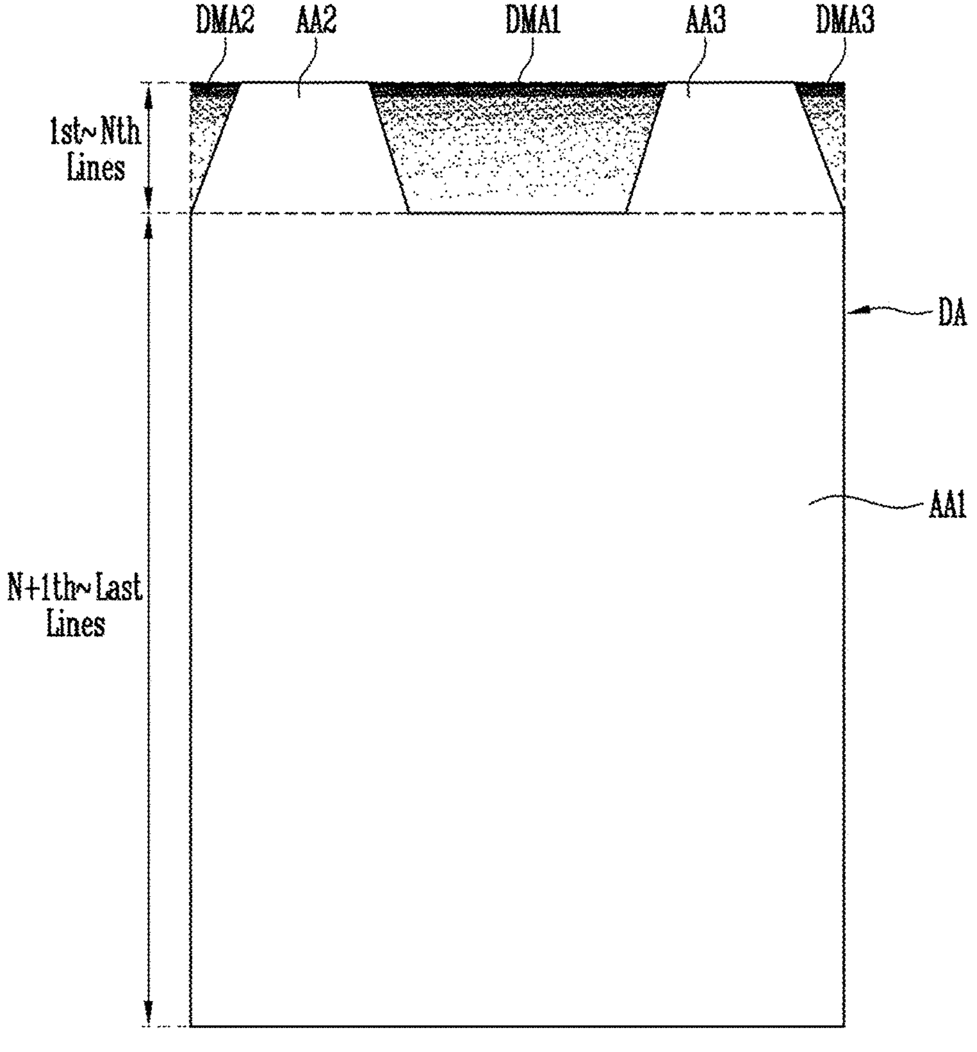

FIGS. 24A and 24B illustrate a driving method of the display device according to an exemplary embodiment. Specifically, FIGS. 24A and 24B illustrate an exemplary embodiment of the driving method of the display device including the data converter according to the exemplary embodiments. In FIGS. 24A and 24B, detailed descriptions of components similar or identical to those of the above-described embodiment will be omitted.

Referring to FIGS. 24A and 24B, the second dummy region DMA2 and/or the third dummy region DMA3 may be further disposed at one side of the display region DA, the data converter 260 may change all gray scale values of the dummy data Dd included in the first image data DATA1. For example, the data converter 260 may generate the second image data DATA2 by gradually changing all the gray scale values of the dummy data Dd included in the first image data DATA1 in the unit of at least one horizontal line. For example, the data converter 260 may gradually change a gray scale of dummy data Dd corresponding to at least one region of the second and third dummy regions DMA2 and DMA3 to be suitable for a gray scale change of a predetermined conversion region set in the first dummy region DMA1.

Figure 25A:
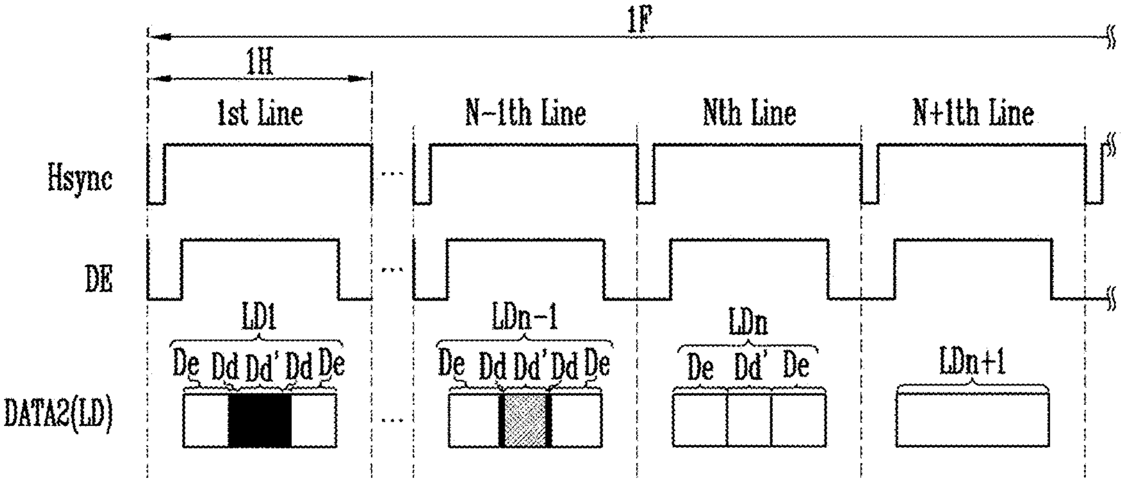
FIGS. 25A and 25B illustrate a driving method of the display device according to an exemplary embodiment.
Figure 25B:
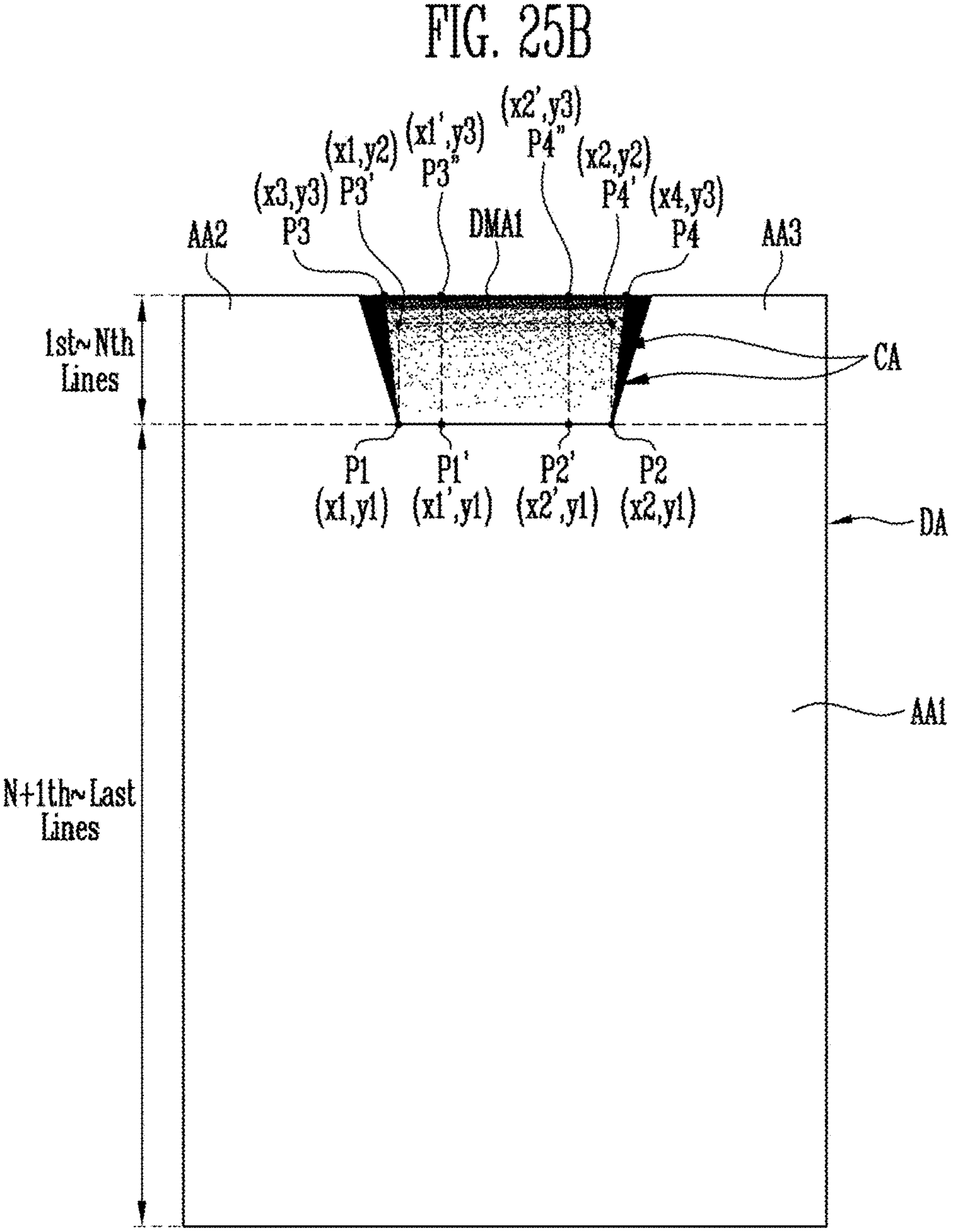

FIGS. 25A and 25B illustrate a driving method of the display device according to an exemplary embodiment. Specifically, FIGS. 25A and 25B illustrate an exemplary embodiment of the driving method of the display device including the data converter according to the exemplary embodiments. In FIGS. 25A and 25B, detailed descriptions of components similar or identical to those of the above-described embodiment will be omitted.

Referring to FIGS. 25A and 25B, according to exemplary embodiments, only a partial region of the first dummy region DMA1 may be set as a conversion region CA. In this case, the data converter 260 may generate a converted dummy data Dd' while gradually changing gray scale values of only some dummy data Dd corresponding to the conversion region CA in the dummy data Dd included in the first image data DATA1.

According to exemplary embodiments, the conversion region CA may include a region between second and third pixels PXL2 and PXL3 disposed on the last Nth horizontal line of the second and third pixel regions AA2 and AA3. For example, the conversion region CA may be defined by first and second coordinate points P1 or P1' and P2 or P2' of the Nth horizontal line and third and fourth coordinate points P3, P3', or P3" and P4, P4', or P4" of a Kth horizontal line.

According to exemplary embodiments, X coordinates x1 or x1' and x2 or x2' of the first coordinate point P1 or P1' and the second coordinate point P2 or P2' may be variously changed. For example, as described in the exemplary embodiment of FIGS. 21A and 21B, the positions of the first coordinate point P1 or P1' and the second coordinate point P2 or P2' may be variously changed. Also, according to exemplary embodiments, X coordinates of the third and fourth coordinate points P3, P3', or P3" and P4, P4', or P4" may also be variously changed. For example, as described in the exemplary embodiment of FIGS. 21A and 21B, the positions of the third and fourth coordinate points P3, P3', or P3" and P4, P4', or P4" may be variously changed. That is, in this embodiment, the conversion region CA may be defined by the first, second, third, and fourth coordinate points P1, P2, P3, and P4 disposed in the first dummy region DMA1, and the position, shape, and/or area of the conversion region CA may be variously changed.

In addition, as described in the above-described embodiment, one or more other dummy regions, e.g., at least one of the second, third, fourth, and fifth dummy regions DMA2, DMA3, DMA4, and DMA5 may be further provided, and a gray scale value of dummy data Dd on at least one region among the second, third, fourth, and fifth dummy regions DMA2, DMA3, DMA4, and DMA5 may also be changed. In this case, in the same manner that sets the conversion region CA in the first dummy region DMA1, another conversion region may be set in at least one of the second, third, fourth, and fifth dummy regions DMA2, DMA3, DMA4, and DMA5.

In the exemplary embodiment described above, the data converter 260 gradually changes gray scale values of at least some dummy data Dd corresponding to the first dummy region DMA1 of Kth to Nth line data LDk to LDn. In this case, during Kth to Nth horizontal periods, a data signal corresponding to effective data De (i.e., a gray scale value of the effective data De) is supplied to data lines DL(A) and DL(C) electrically coupled to the second and third pixels PXL2 and PXL3 of the Kth to Nth horizontal lines. In addition, during the Kth to Nth horizontal periods, a data signal having a gray scale value gradually changed (e.g., increased) for every at least one horizontal period is supplied to at least some of the other data lines DL(B).

That is, according to the exemplary embodiment, during at least the Nth horizontal period, the gray scale value of a data signal supplied to at least some of data lines DL(B) at a lower end of the first dummy region DMA1 is changed. For example, during the Nth horizontal period and an (N+1)th horizontal period subsequent thereto, a gray scale value of dummy data Dd included in the Nth line data LDn may be changed such that data signals having gray scale values similar or equal to each other are supplied to at least some of the data lines DL(B) at the lower end of the first dummy region DMA1. Accordingly, although only a partial region of the first dummy region DMA1 is set as the conversion region, a rapid variation in voltage of the first power line PL1 can be prevented or reduced. Thus, it is possible to prevent or reduce a dark line, etc. from being generated.

Figure 26A:
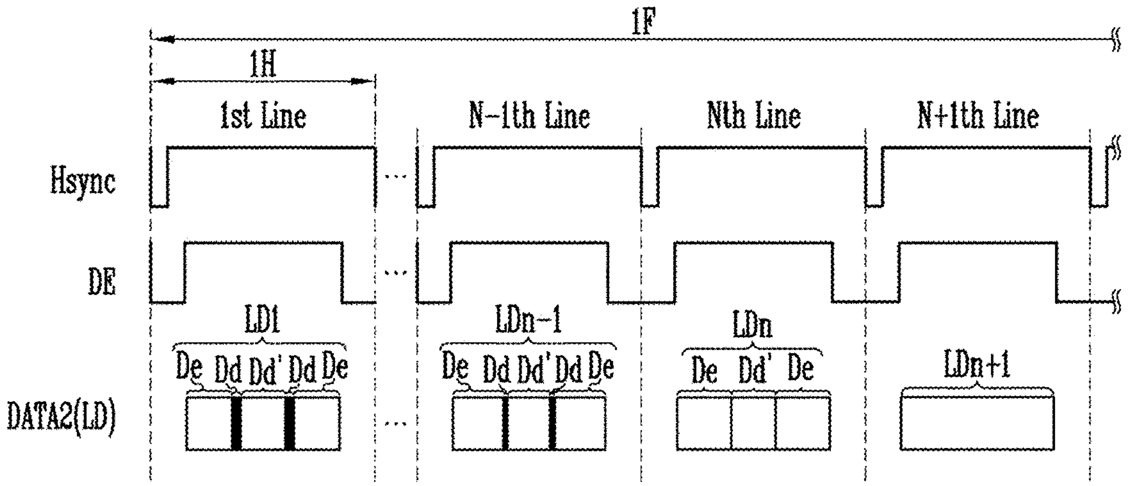
FIGS. 26A, 26B, and 26C illustrate a driving method of the display device according to an exemplary embodiment.
Figure 26B:
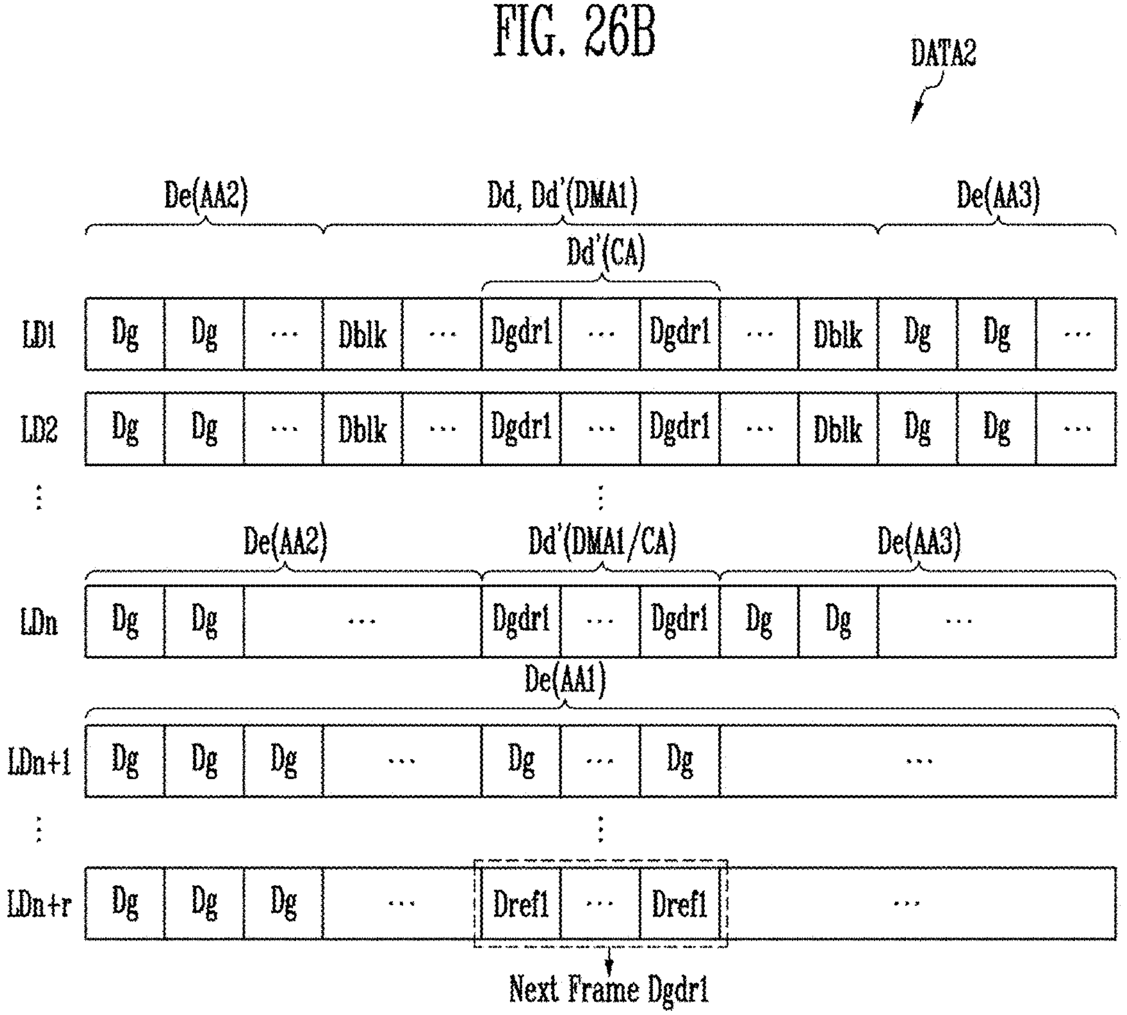
Figure 26C:
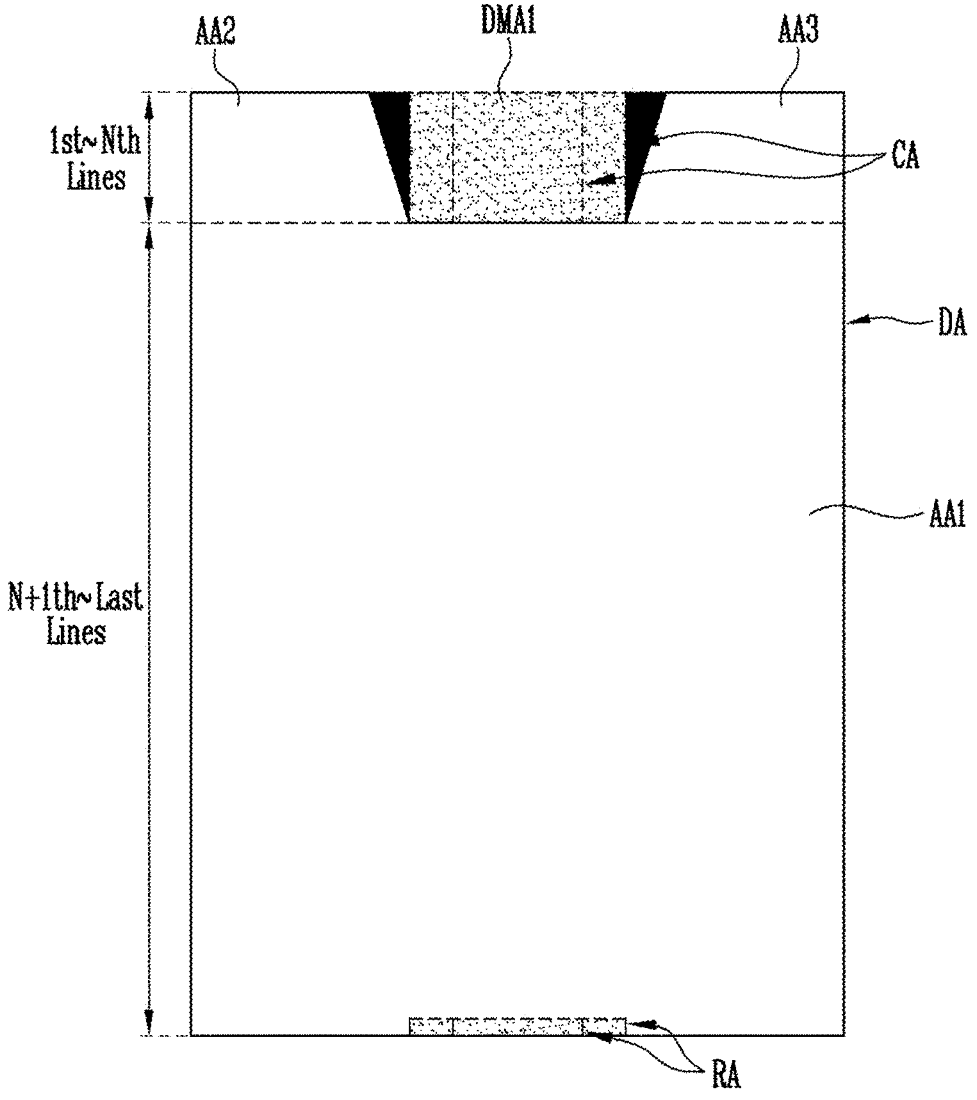

FIGS. 26A, 26B, and 26C illustrate a driving method of the display device according to an exemplary embodiment. Specifically, FIGS. 26A, 26B, and 26C illustrate an exemplary embodiment of the driving method of the display device including the data converter according to the exemplary embodiments. In FIGS. 26A, 26B, and 26C, detailed descriptions of components similar or identical to those of the above-described embodiment will be omitted.

Referring to FIGS. 26A, 26B, and 26C, one region of the display region DA may be set as a predetermined reference region RA. Information on the reference region RA may be stored together with information on a conversion region CA in a memory.

According to exemplary embodiments, the reference region RA may be set as one region of the first pixel region AA1 disposed at a lower end of the first dummy region DMA1. For example, the reference region RA may be set as a region corresponding to the conversion region CA on any one horizontal line included in the first pixel region AA1.

For example, the reference region RA may be set as a region corresponding to the conversion region CA on the last (N+R)th horizontal line of the first pixel region AA1 (e.g., a region having the same X coordinate range as the conversion region CA on the (N+R)th horizontal line). According to another exemplary embodiment, the reference region RA may be set as a region corresponding to the conversion region CA on a first horizontal line (i.e., an (N+1)th horizontal line) of the first pixel region AA1, or be set as a region corresponding to the conversion region CA on any one horizontal line between the first horizontal line (i.e., the (N+1)th horizontal line) and the last horizontal line (i.e., the (N+R)th horizontal line) of the first pixel region AA1.

In the exemplary embodiment described above, the data converter 260 may generate second image data DATA2 by setting a gray scale value of dummy data Dd corresponding to the conversion region CA in first image data DATA1 as a gray scale value of effective data De corresponding to the reference region RA. For example, the data converter 260 may set a gray scale value Dref1 of the reference region RA in the last (N+R)th line data LDn+r included in second image data DATA2 (or first image data DATA1) of a just previous frame (e.g., a frame immediately previous to the current frame) as a gray scale value Dgdr1 of the conversion region CA. As described above, the data converter 260 may change a gray scale value of dummy data Dd corresponding to a predetermined conversion region CA in the line data LD included in the first image data DATA1 as a gray scale value corresponding to one region of the display region DA.

Meanwhile, the data converter 260 may allow effective data De corresponding to the first, second, and third pixel regions AA1, AA2, and AA3 in the first image data DATA1 to maintain as the original gray scale values Dg and Dref1. Accordingly, the gray scale values of the effective data De can be maintained as the same gray scale values as that in the first image data DATA1. That is, according to exemplary embodiments, the data converter 260 may generate the second image data DATA2 by maintaining the gray scale values of the effective data De in the first image data DATA1 and changing only the gray scale value of the dummy data Dd corresponding to the conversion region CA.

According to exemplary embodiments, the conversion region CA may include a region between the second and third pixels PXL2 and PXL3 disposed on the first to last horizontal lines of the second and third pixel regions AA2 and AA3. In this case, during first to Nth horizontal periods corresponding to first to Nth horizontal lines of the second and third pixel regions AA2 and AA3, a data signal corresponding to effective data De(AA2) and De(AA3) of the first to Nth line data may be sequentially supplied to data lines DL(A) and DL(C) electrically coupled to second and third pixels PXL2 and PXL3 of the first to Nth horizontal lines. In addition, at least some of the other data lines DL(B) (e.g., data lines at a lower end of the conversion region CA) may maintain the voltage of a data signal applied during the last (N+R)th horizontal period of the just previous frame (e.g., the frame immediately previous to the current frame).

According to the exemplary embodiment, during at least the Nth horizontal period, a gray scale value of a data signal supplied to at least some of the data lines DL(B) at a lower end of the first dummy region DMA1 is changed to a gray scale value of some effective data De. Accordingly, a rapid variation in voltage of the first power line PL1 can be prevented or reduced. Thus, it is possible to prevent or reduce a dark line, etc. from being generated.

Figure 27A:
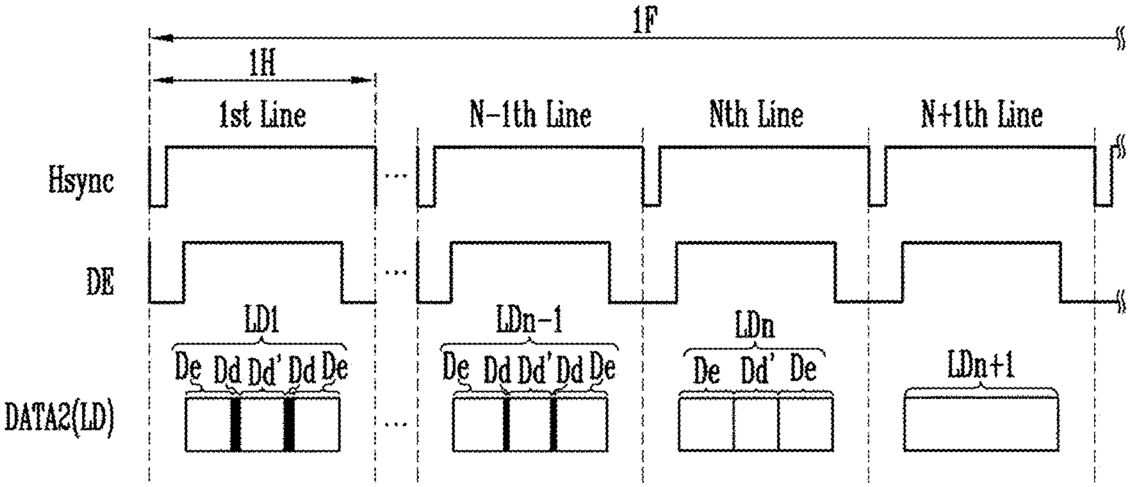
FIGS. 27A, 27B, and 27C illustrate a driving method of the display device according to an exemplary embodiment.
Figure 27B:
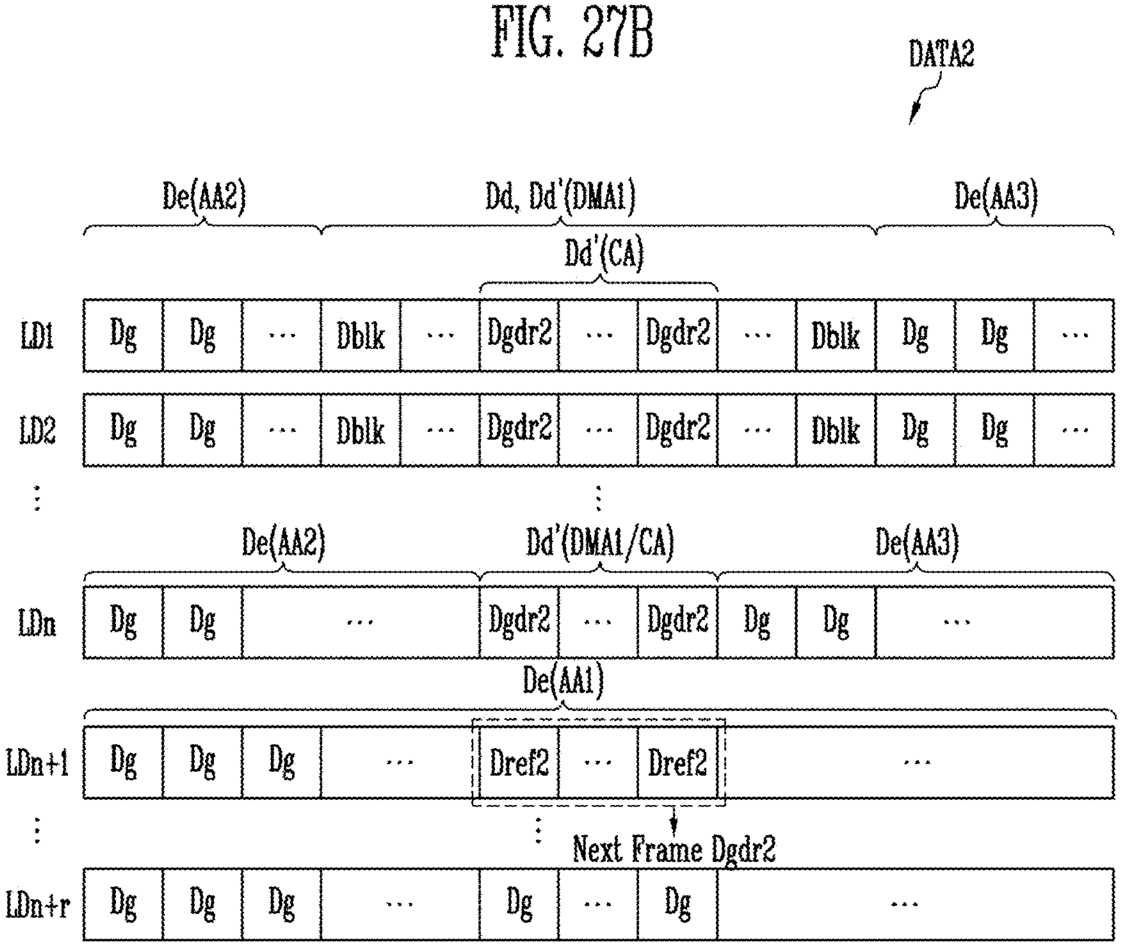
Figure 27C:
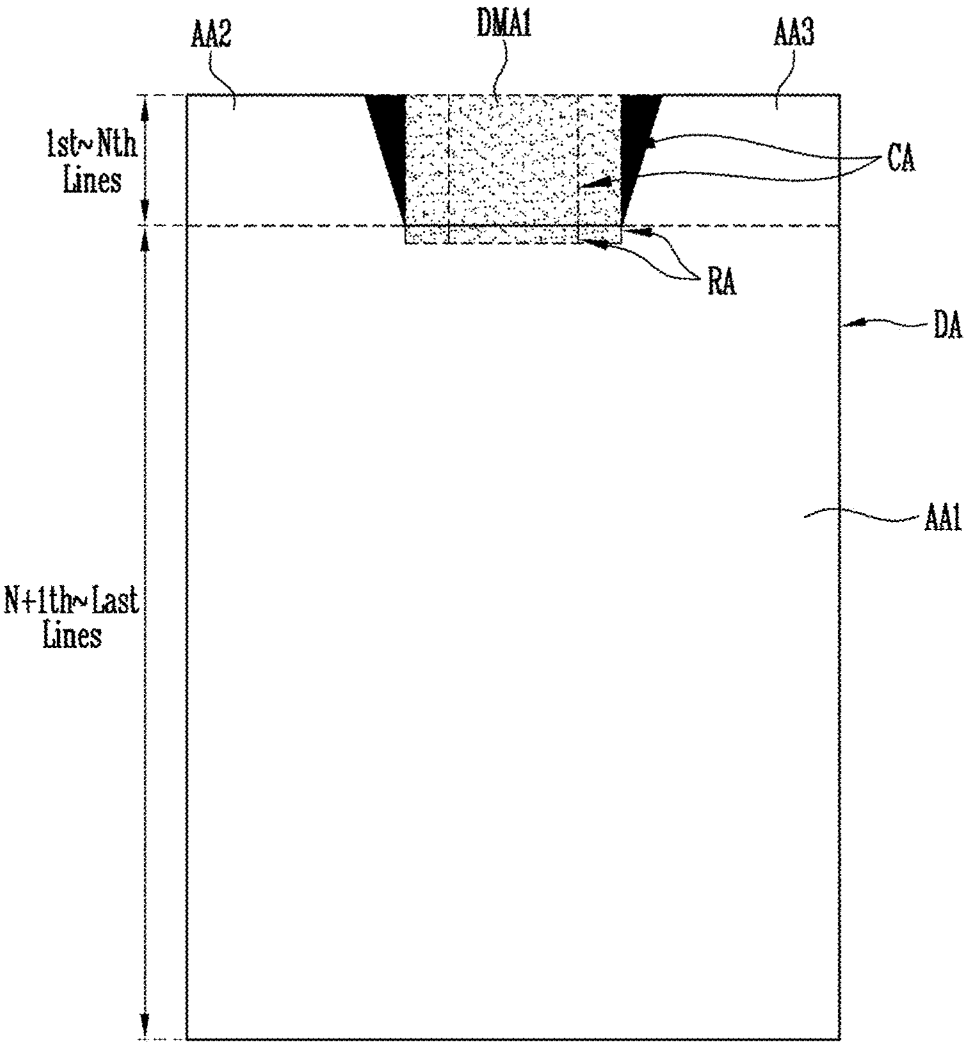

FIGS. 27A, 27B, and 27C illustrate a driving method of the display device according to an exemplary embodiment. Specifically, FIGS. 27A, 27B, and 27C illustrate an exemplary embodiment of the driving method of the display device including the data converter according to the exemplary embodiments. In FIGS. 27A, 27B, and 27C, detailed descriptions of components similar or identical to those of the above-described embodiment will be omitted.

Referring to FIGS. 27A, 27B, and 27C, a reference region RA may be set as a region corresponding to a conversion region CA on a first horizontal line (i.e., an (N+1)th horizontal line) of the first pixel region AA1 (e.g., a region having the same X coordinate range as the conversion region CA on the (N+1)th horizontal line). In addition, the conversion region CA may include a region between second and third pixels PXL2 and PXL3 disposed on the last Nth horizontal line of at least the second and third pixel regions AA2 and AA3.

According to exemplary embodiments, the data converter 260 may generate a gray scale value Dgdr2 of the conversion region CA, using gray scale values Dref2 of the reference region RA in effective data De of a just previous frame (e.g., a frame immediately previous to the current frame). For example, the data converter 260 may calculate an average gray scale value of the gray scale values Dref2 of the reference region RA in (N+1)th line data LDn+1 included in second image data DATA2 (or first image data DATA1) of the just previous frame (e.g., the frame immediately previous to the current frame), and set the average gray scale value as the gray scale value Dgdr2 of the conversion region CA.

In this case, during an Nth horizontal period corresponding to an Nth horizontal line of the second and third pixel regions AA2 and AA3, a data signal corresponding to effective data De(AA2) and De(AA3) of first to Nth line data may be supplied to data lines DL(A) and DL(C) electrically coupled to second and third pixels PXL2 and PXL3 of the Nth horizontal line. In addition, during an (N+1)th horizontal period of the just previous frame (e.g., the frame immediately previous to the current frame), a data signal corresponding to the average gray scale value of a data signal applied to the reference region RA may be supplied to at least some of the other data lines DL(B) (e.g., data lines at a lower end of the conversion region CA).

According to the exemplary embodiment, during at least the Nth horizontal period, a gray scale value of a data signal supplied to at least some of the data lines DL(B) at a lower end of the first dummy region DMA1 is changed to a gray scale value corresponding to some effective data De. Accordingly, a rapid variation in voltage of the first power line PL1 can be prevented or reduced. Thus, it is possible to prevent or reduce a dark line, etc. from being generated.

Figure 28A:
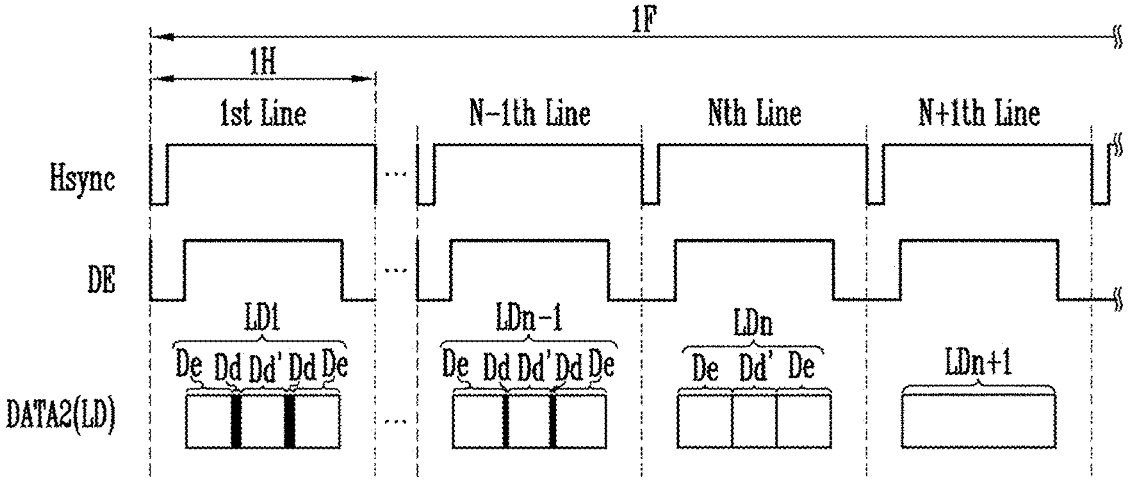
FIGS. 28A, 28B, and 28C illustrate a driving method of the display device according to an exemplary embodiment.
Figure 28B:
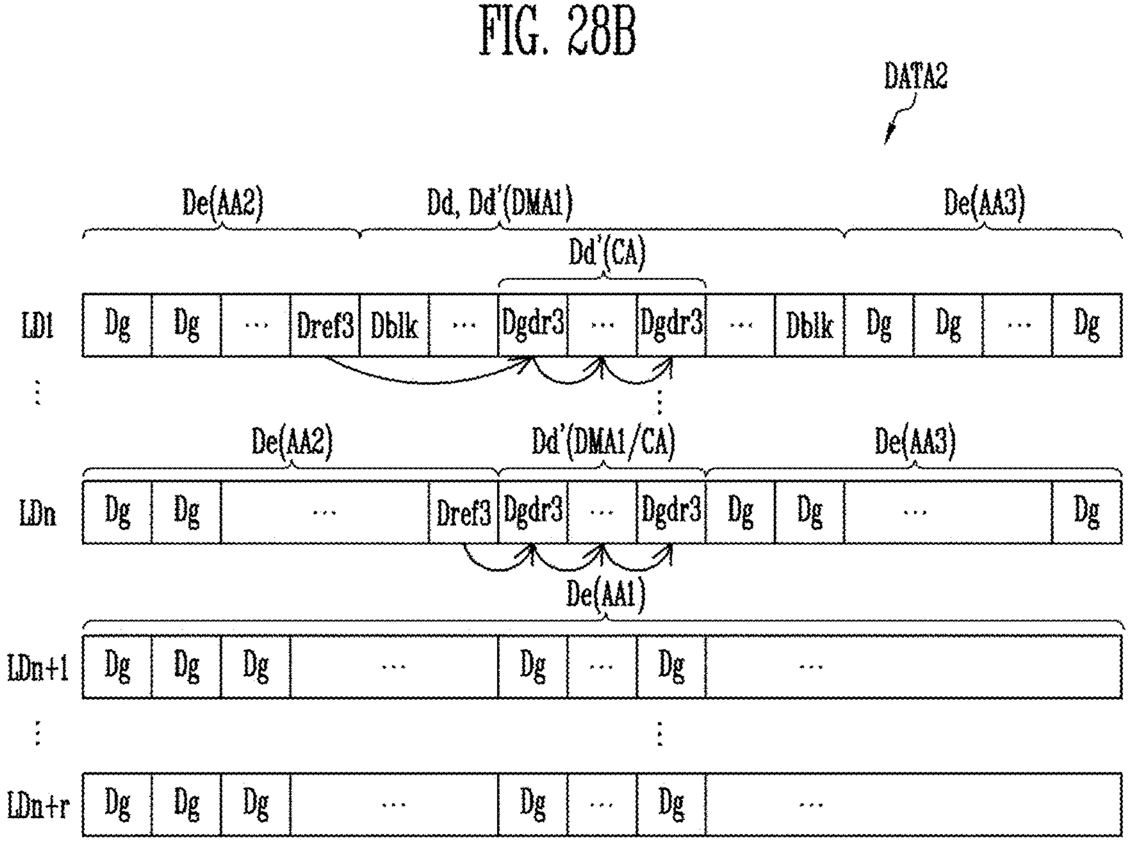
Figure 28C:
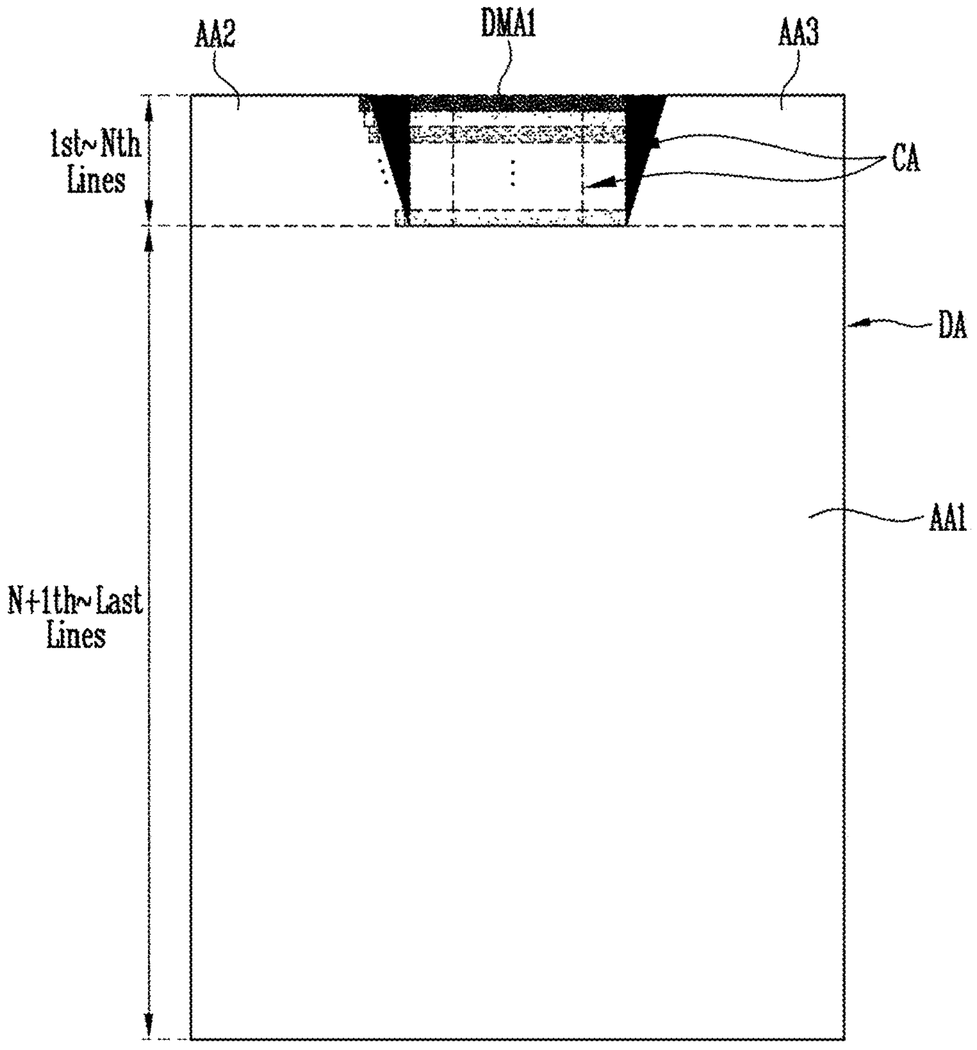

FIGS. 28A, 28B, and 28C illustrate a driving method of the display device according to an exemplary embodiment. Specifically, FIGS. 28A, 28B, and 28C illustrate an exemplary embodiment of the driving method of the display device including the data converter according to the exemplary embodiments. In FIGS. 28A, 28B, and 28C, detailed descriptions of components similar or identical to those of the above-described embodiment will be omitted.

Referring to FIGS. 28A, 28B, and 28C, a conversion region CA may include a region between second and third pixels PXL2 and PXL3 disposed on the last Nth horizontal line of at least the second and third pixel regions AA2 and AA3.

According to exemplary embodiments, the data converter 260 may convert a gray scale value of dummy data Dd of a conversion region CA, which is included in Nth line data LDn of first image data DATA1, into a value equal to any one gray scale value in effective data De(AA2) of the second pixel region AA2 included in the Nth line data LDn. For example, the data converter 260 may copy a gray scale value Dref3 of the last effective data in the effective data De(AA2) of the second pixel region AA2, which is included in the Nth line data LDn, and set the gray scale value Dref3 as a gray scale value Dgdr3 of the conversion region CA. As described above, the data converter 260 may convert a gray scale value of dummy data Dd corresponding to a predetermined conversion region CA for each line data LD included in the first image data DATA1, into a gray scale value corresponding to one region of the display region DA.

Meanwhile, the data converter 260 may allow effective data De corresponding to the first, second, and third pixel regions AA1, AA2, and AA3 in the first image data DATA1 to maintain the original gray scale values Dg and Dref3. Accordingly, a gray scale value of the effective data De can be maintained as the same gray scale value as the first image data DATA1. That is, according to exemplary embodiments, the data converter 260 may generate second image data DATA2 by maintaining the gray scale values of the effective data De in the first image data DATA1 and changing only the gray scale value of the dummy data Dd corresponding to the conversion region CA.

According to exemplary embodiments, the conversion region CA may include a region between the second and third pixels PXL2 and PXL3 disposed on the first to last horizontal lines of the second and third pixel regions AA2 and AA3. In this case, the data converter 260 may set gray scale values Dgdr3 of dummy data Dd of the conversion region CA, which is included in first to Nth line data LD1 to LDn in the first image data DATA1, respectively as values equal to gray scale values Dref3 of the last effective data in the effective data De(AA2) of the second pixel region AA2, which is included in the first to Nth line data LD1 to LDn.

In the exemplary embodiment described above, during first to Nth horizontal periods corresponding to first to Nth horizontal line of the second and third pixel regions AA2 and AA3, a data signal corresponding to effective data De(AA2) and De(AA3) of the first to Nth line data LD1 to LDn may be sequentially supplied to data lines DL(A) and DL(C) electrically coupled to second and third pixels PXL2 and PXL3 of the first to Nth horizontal lines. In addition, a data signal equal to that applied to any one second pixel PXL2 (e.g., the last second pixel PXL2) among the second pixels PXL2 of each of the first to Nth horizontal lines may be supplied to at least some of the other data lines DL(B) (e.g., data lines at a lower end of the conversion region CA).

According to the exemplary embodiment, during at least the Nth horizontal period, a gray scale value of a data signal supplied to at least some of the data lines DL(B) at a lower end of the first dummy region DMA1 is changed to a gray scale value of some effective data De. Accordingly, it is possible to prevent or reduce a dark line, etc. from being generated.

Figure 29A:
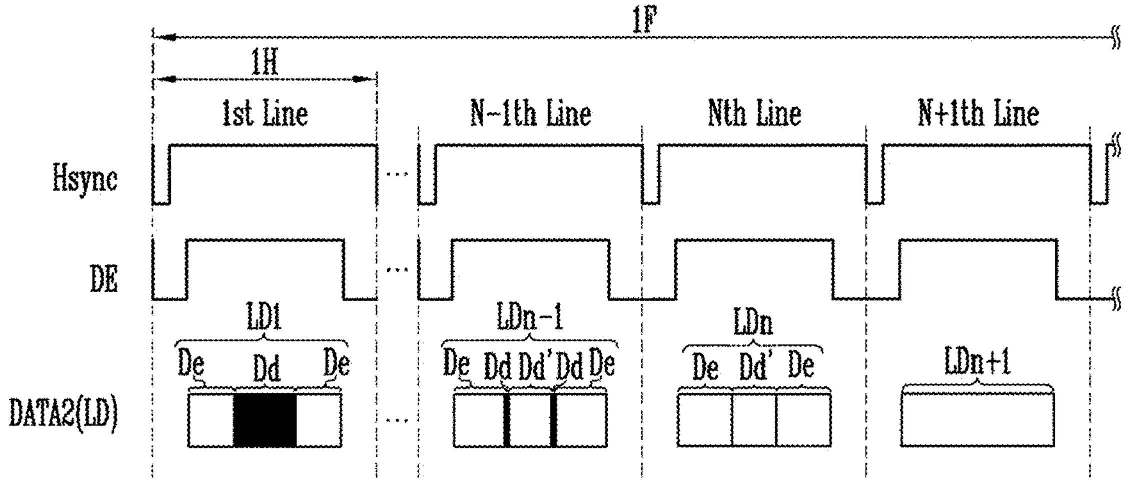
FIGS. 29A, 29B, and 29C illustrate a driving method of the display device according to an exemplary embodiment.
Figure 29B:
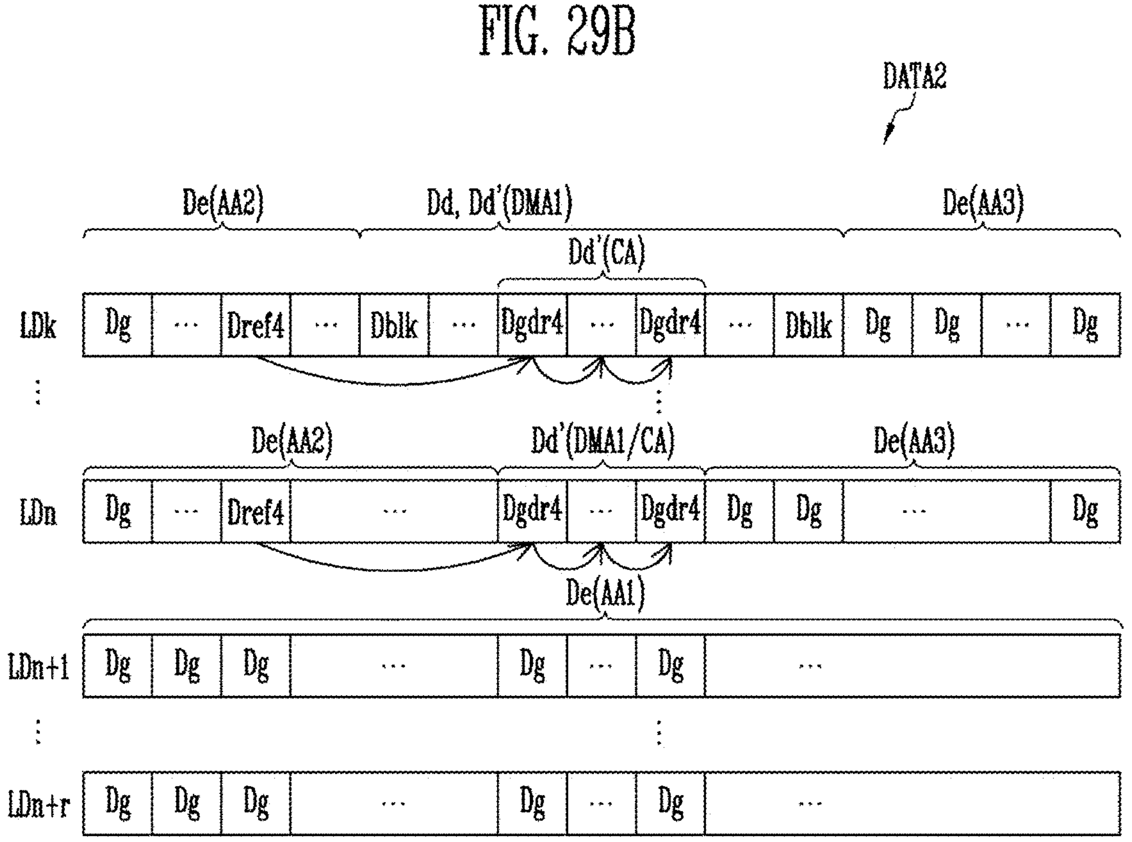
Figure 29C:
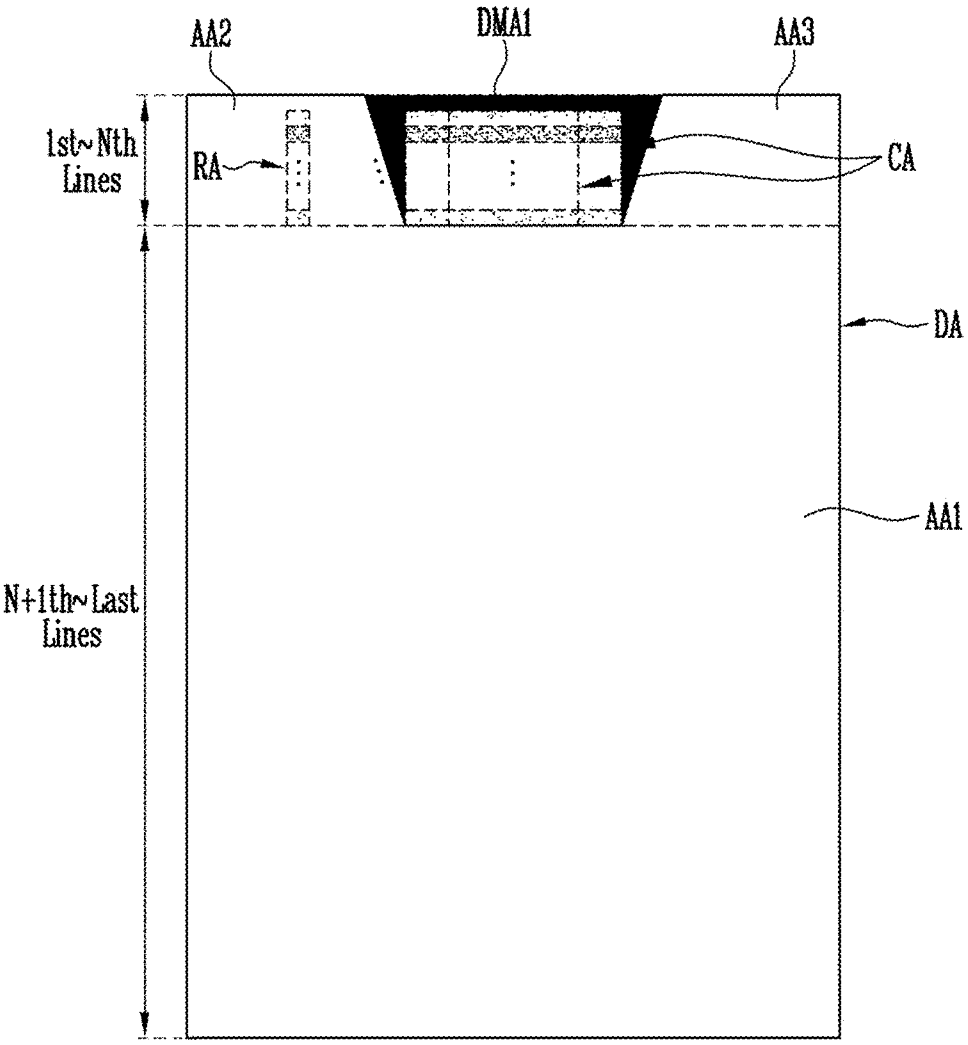

FIGS. 29A, 29B, and 29C illustrate a driving method of the display device according to an exemplary embodiment. Specifically, FIGS. 29A, 29B, and 29C illustrate an exemplary embodiment of the driving method of the display device including the data converter according to the exemplary embodiments. In FIGS. 29A, 29B, and 29C, detailed descriptions of components similar or identical to those of the above-described embodiment will be omitted.

Referring to FIGS. 29A, 29B, and 29C, a conversion region CA may include a region between second and third pixels PXL2 and PXL3 disposed on the last Nth horizontal line of at least the second and third pixel regions AA2 and AA3. For example, the conversion region CA may include a region between second and third pixels PXL2 and PXL3 disposed on a Kth (K is a natural number) to Nth horizontal lines of the second and third pixel regions AA2 and AA3.

In this case, the data converter 260 may convert a gray scale value of dummy data Dd of the conversion region CA, which is included in Kth to Nth line data LDk to LDn of first image data DATA1 into a value equal to any one gray scale value in effective data De(AA2) of the second pixel region AA2, which is included in the Kth to Nth line data LDk to LDn. For example, a region corresponding to predetermined Lth (L is a natural number) second pixels PXL2 disposed on the Kth to Nth horizontal lines of the second pixel region AA2 may be set as a reference region RA. In addition, the data converter 260 may copy a gray scale value Dref4 of Lth effective data in the effective data De(AA2) of the second pixel region AA2, which is included in the Kth to Nth line data LDk to LDn, and set the gray scale value Dref4 as a gray scale value Dgdr4 of the conversion region CA. As described above, the data converter 260 may convert a gray scale value of dummy data Dd corresponding to a predetermined conversion region CA for each line data LD included in the first image data DATA1, into a gray scale value corresponding to one region of the display region DA.

In the exemplary embodiment described above, the data converter 260 may allow effective data De corresponding to the first, second, and third pixel regions AA1, AA2, and AA3 in the first image data DATA1 to maintain the original gray scale values Dg and Dref4. Accordingly, a gray scale value of the effective data De in the first image data DATA1 is maintained, and only a gray scale value of dummy data Dd corresponding to the conversion region CA is changed.

In the exemplary embodiment described above, during Kth to Nth horizontal periods corresponding to Kth to Nth horizontal lines of the second and third pixel regions AA2 and AA3, a data signal corresponding to effective data De(AA2) and De(AA3) of the Kth to Nth line data LDk to LDn may be sequentially supplied to data lines DL(A) and DL(C) electrically coupled to second and third pixels PXL2 and PXL3 on the Kth to Nth horizontal lines. In addition, a data signal equal to that applied to any one second pixel PXL2 among the second pixels PXL2 on each of the Kth to Nth horizontal lines (e.g., an Lth second pixel PXL2 on the corresponding horizontal line) may be supplied to at least some of the other data lines DL(B) (e.g., data lines at a lower end of the conversion region CA).

According to the exemplary embodiment, during at least the Nth horizontal period, a gray scale value of a data signal supplied to at least some of the data lines DL(B) at a lower end of the first dummy region DMA1 is changed, so that it is possible to prevent or reduce a dark line, etc. from being generated.

Figure 30:
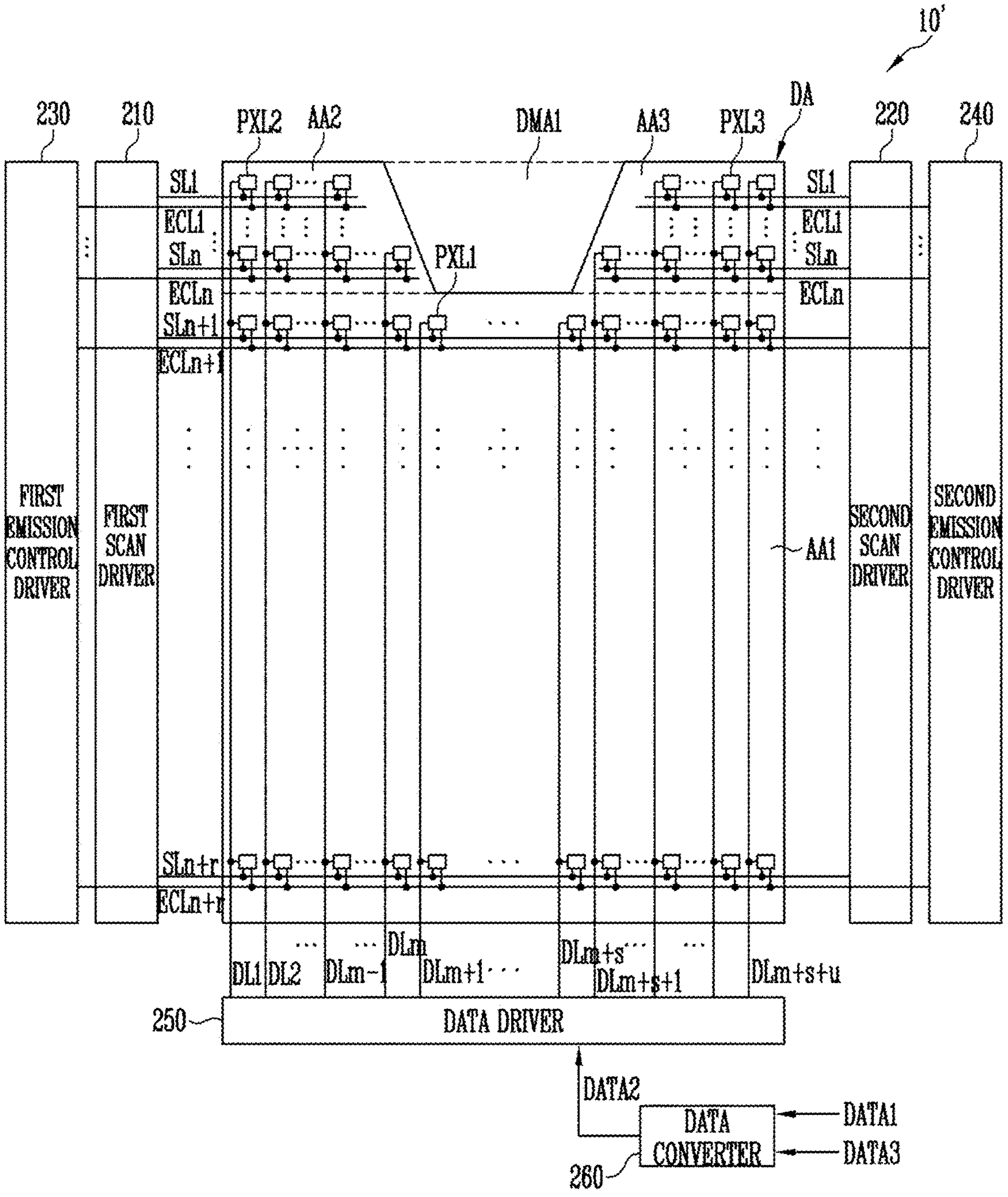
FIG. 30 illustrates a display device according to an exemplary embodiment.

FIG. 30 illustrates a display device according to an exemplary embodiment. In FIG. 30, components similar or identical to those of the above-described embodiment (e.g., the exemplary embodiment of FIG. 17) are designated by like reference numerals, and their detailed descriptions will be omitted.

Referring to FIG. 30, in the display device 10' according to the exemplary embodiment, the data converter 260 may further receive third image data DATA3 in addition to first image data DATA1, and generate second image data DATA2, using the first image data DATA1 and the third image data DATA3.

According to exemplary embodiments, the third image data DATA3 may include image pickup information of an image displayed in the display region DA. For example, the third image data DATA3 may be data obtained by digitizing luminance measurement values of the first, second, and third pixels PXL1, PXL2, and PXL3 as an image actually displayed in the display region DA is picked up when a predetermined image (e.g., a test image) is displayed in the display region DA.

According to exemplary embodiments, the data converter 260 may correct image quality of the display region DA, using the third image data DATA3. For example, the data converter 260 corrects a gray scale value of effective data De included in the first image data DATA1 by applying a first offset value corresponding to the third image data DATA3, so that an image having uniform image quality can be displayed in the display region. Accordingly, the data converter 260 may include a lookup table in which a first offset value corresponding to characteristic information (luminance information, etc.) included in the third image data DATA3, is stored, or calculate a first offset value according to a predetermined rule or mathematical expression.

Also, in an exemplary embodiment, the data converter 260 may convert a gray scale value of dummy data Dd corresponding to at least a conversion region CA in the first dummy region DMA1, using a second offset value. According to exemplary embodiments, the second offset value may be a predetermined correction value (or compensation value) set to comprehensively change gray scale values of dummy data Dd corresponding to the conversion region CA in the dummy data Dd included in the first image data DATA1. For example, the second offset value may be a value previously set to comprehensively increase or decrease the gray scale values of the dummy data Dd corresponding to the conversion region CA. According to another exemplary embodiment, the second offset value may be set changeable. The second offset value may be stored in the data converter 260 or be supplied to the data converter 260 by the host processor and/or the timing controller.

In the exemplary embodiment described above, the data converter 260 may generate the second image data DATA2 by correcting a gray scale value of effective data De, using a first offset value, and converting a gray scale value of dummy data Dd corresponding to the conversion region CA, using a second offset value. That is, the data converter 260 may correct the gray scale value of the effective data De by applying a first offset value corresponding to the third image data DATA3 to effective data De included in the first image data DATA1. Also, the data converter 260 may change the gray scale value of the dummy data Dd by applying a predetermined second offset value to dummy data Dd included in the first image data DATA1, particularly, dummy data Dd corresponding to a predetermined conversion region CA.

The second image data DATA2 generated by the data converter 260 is input to the data driver 250. Then, the data driver 250 generates a data signal corresponding to the second image data DATA2, and supplies the data signal to the display region DA through the data lines DL1 to DLm+s+u.

Accordingly, during an Nth (N is a natural number) horizontal period corresponding to an Nth horizontal line of the second and third pixel regions AA2 and AA3, a data signal corresponding to the effective data De and the first offset value can be supplied to data lines DL(A) and DL(C) electrically coupled to second and third pixels PXL2 and PXL3 on the Nth horizontal line. In addition, during the Nth horizontal period, a data signal corresponding to the second offset value can be supplied to at least some of data lines DL(B) at a lower end of the first dummy region DMA1.

Figure 31A:
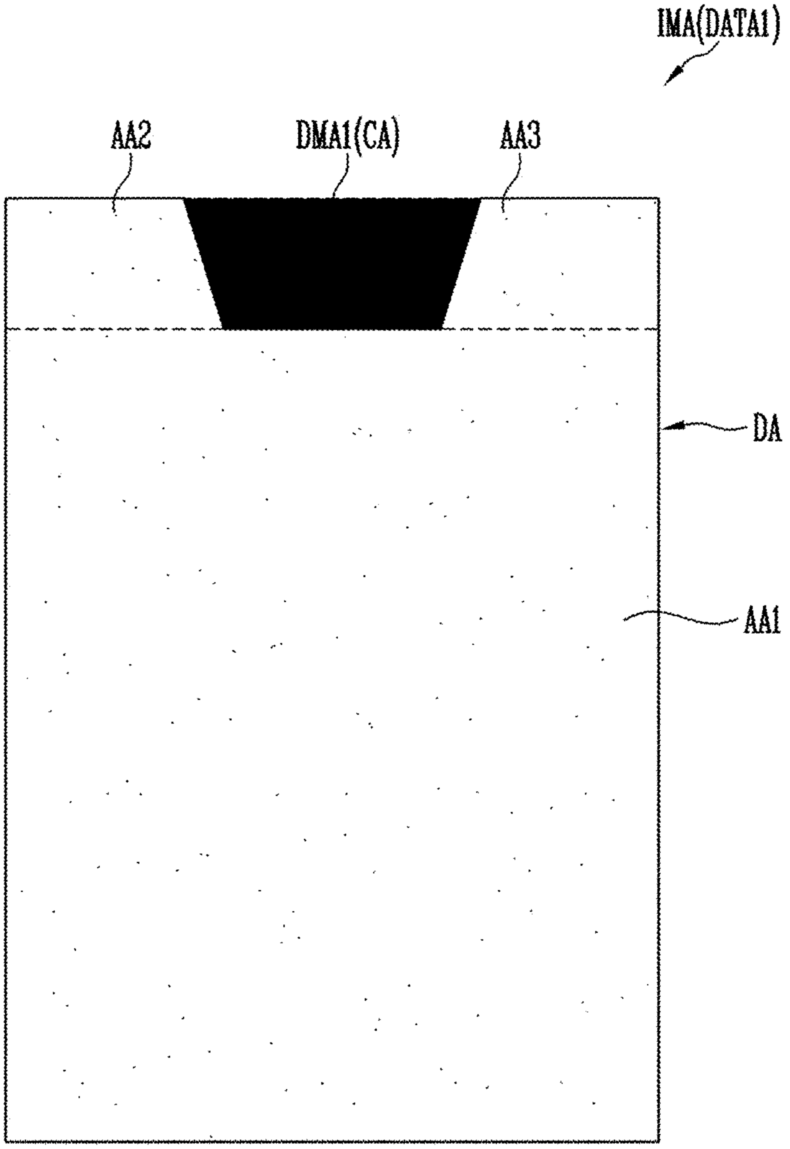
FIGS. 31A, 31B, and 31C illustrate a driving method of the display device according to an exemplary embodiment.
Figure 31B:
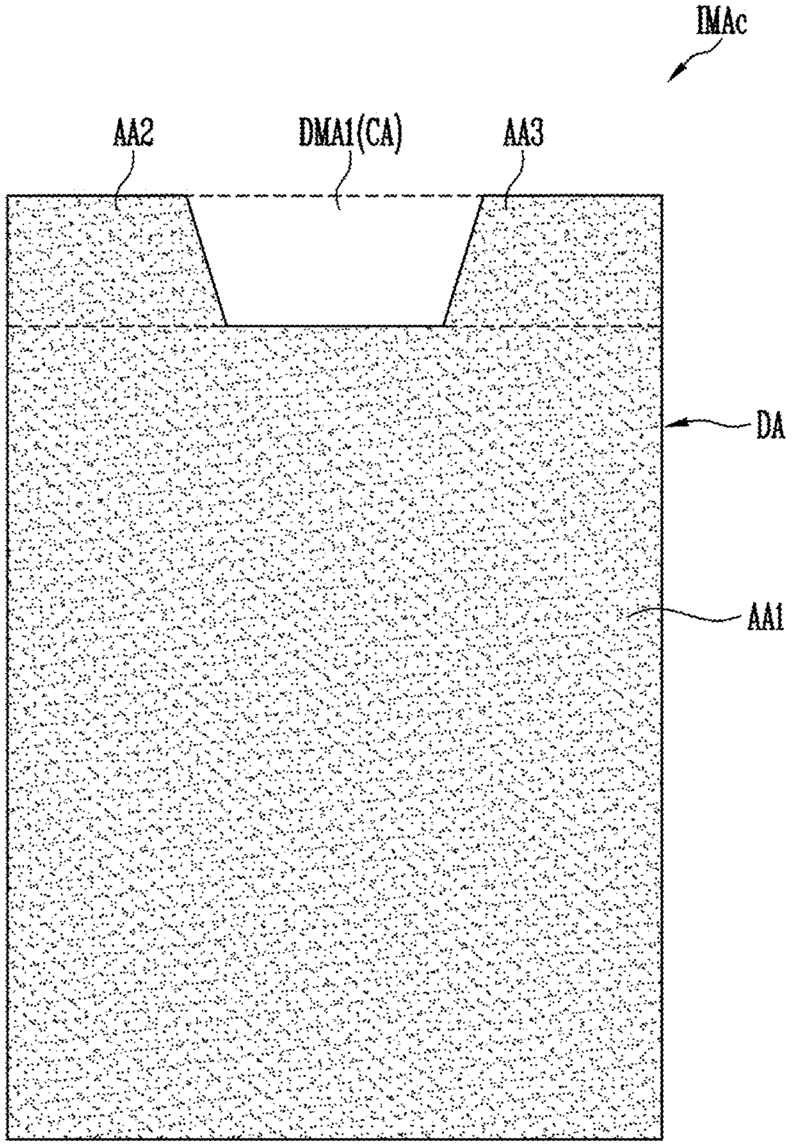
Figure 31C:
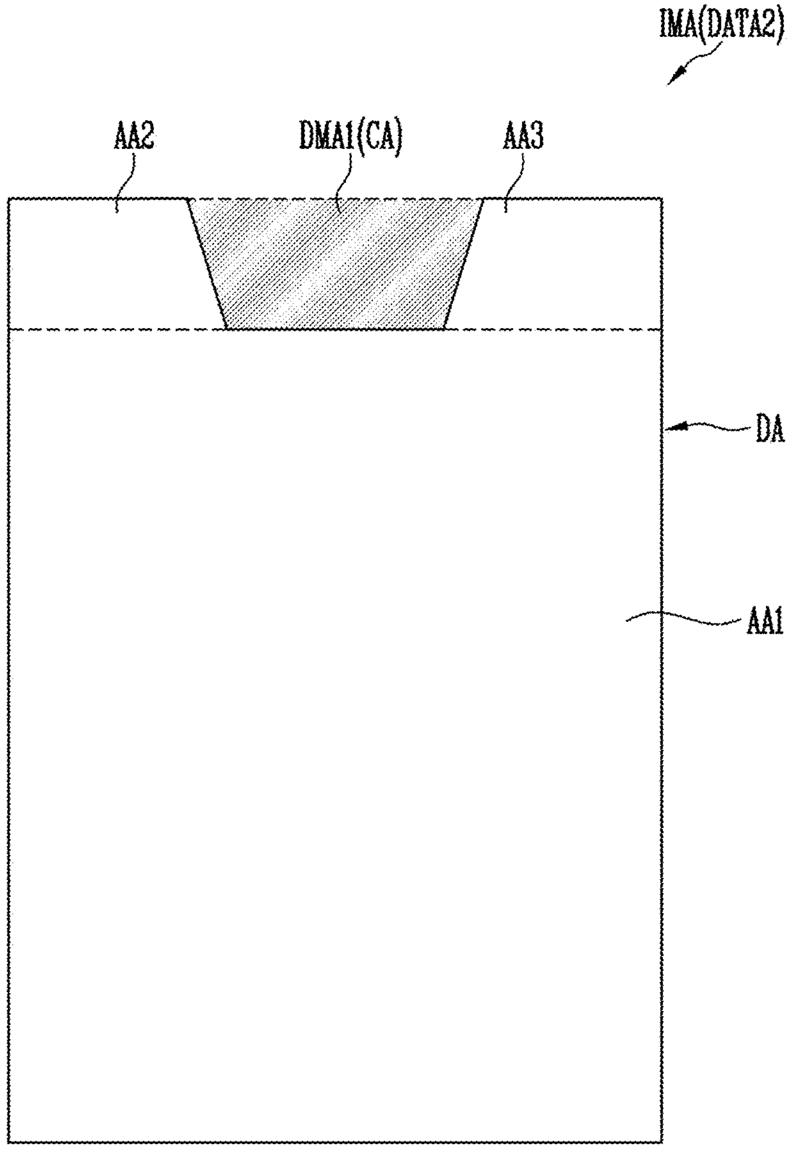

FIGS. 31A, 31B, and 31C illustrate a driving method of the display device according to an exemplary embodiment. Specifically, FIGS. 31A, 31B, and 31C illustrate an exemplary embodiment of the driving method of the display device including the data converter 260 shown in FIG. 30. In order to express a gray scale correction value including the first and second offset values and a gray scale value (or an image corresponding thereto) corresponding to each of the first and second image data, a virtual image corresponding to each of the first image data, the gray scale correction value, and the second image data is illustrated in FIGS. 31A, 31B, and 31C.

Referring to FIGS. 31A, 31B, and 31C, as described above, the first image data DATA1 may include effective data De corresponding to an image to be actually displayed and dummy data Dd corresponding to the first dummy region DMA1. According to exemplary embodiments, the dummy data Dd included in the first image data DATA1 may be all black gray scale data Dblk. Meanwhile, when an image corresponding to the first image data DATA1 is displayed, a spot such as a dark spot (or bright spot), as shown in FIG. 31A, may be displayed on a screen due to a difference in characteristic between the first, second, and third pixels PXL1, PXL2, and PXL3 in the first display region DA. In this case, the data converter 260, as shown in FIG. 31B, may generate (or set) a gray scale correction value corresponding to a correction image IMAc, using the third image data DATA3 obtained by digitizing luminance measurement values as an image corresponding to the first image data DATA1 is picked up, and generate the second image data DATA2 by applying the gray scale correction value.

According to exemplary embodiments, the gray scale correction value may include a first offset value corresponding to the display region DA and a second offset value corresponding to the first dummy region DMA1 (particularly, a conversion region CA). In the display device 10', the image quality of an actually displayed image can be uniformly corrected by the first offset value. Meanwhile, the second offset value may be set to prevent or reduce a dark line generated in a boundary region between the pixel regions (e.g., a boundary region between the first pixel region AA1 and the second and third pixel regions AA2 and AA3) by changing a gray scale value of dummy data Dd corresponding to the conversion region CA. Thus, according to the exemplary embodiment, the image quality of the display device 10' can be improved.

Figure 32:
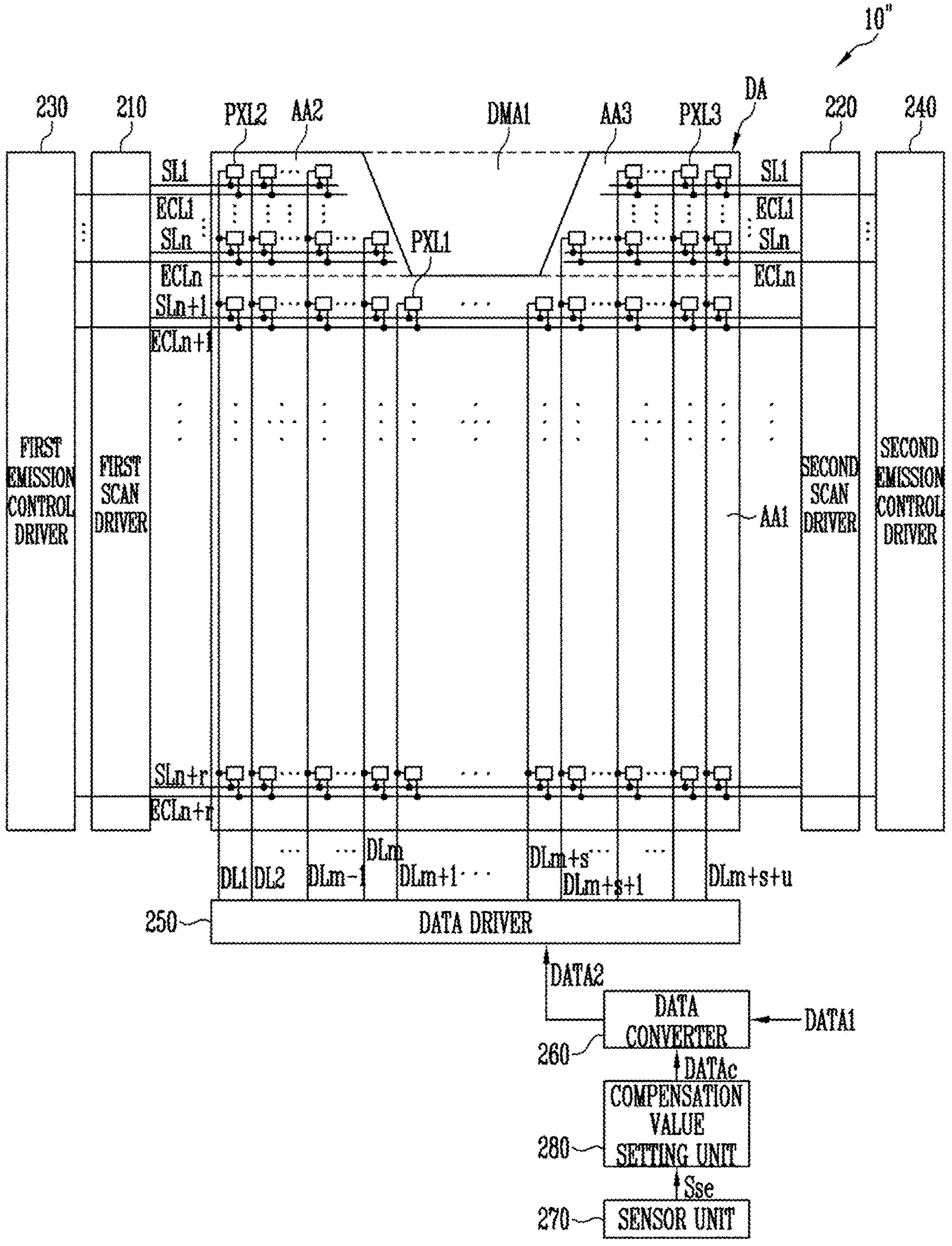
FIG. 32 illustrates a display device according to an exemplary embodiment.

FIG. 32 illustrates a display device according to an exemplary embodiment. In FIG. 32, components similar or identical to those of the above-described embodiments (e.g., the exemplary embodiments of FIGS. 17 and 30) are designated by like reference numerals, and their detailed descriptions will be omitted.

Referring to FIG. 32, the display device 10" according to the exemplary embodiment may further include a sensor unit 270 and a compensation value setting unit 280. Meanwhile, a case where the compensation value setting unit 280 is separated from the data converter 260 is illustrated in FIG. 32, but the present disclosure is not limited thereto. For example, the data converter 260 and the compensation value setting unit 280 may be individually provided or integrally provided.

The sensor unit 270 may be at least one kind of sensor for compensating for a use environment, degradation, and/or characteristic difference of the display device 10". To this end, the sensor unit 270 may be disposed in the vicinity of the display region DA. For example, the sensor unit 270 may be disposed together with the first, second, and third pixels PXL1, PXL2, and PXL3 on the display panel 100, or be disposed in the vicinity of the display panel 100.

According to exemplary embodiments, the sensor unit 270 may include at least one of a temperature sensor, an optical sensor (e.g., an illumination sensor), and a degradation sensor (e.g., a current sensor). In this case, the sensor unit 270 may output a sensing signal Sse corresponding to a temperature, an illumination, and/or a degradation degree of the display panel 100 (e.g., the first, second, and third pixels PXL1, PXL2, and PXL3). According to exemplary embodiments, the sensor unit 270 may include a degradation sensor for sensing a characteristic difference and/or degradation of the first, second, and third pixels PXL1, PXL2, and PXL3, and the sensor unit 270 may be electrically coupled to at least some of the first, second, and third pixels PXL1, PXL2, and PXL3 through at least one sensing line. During a predetermined degradation sensing period, the sensor unit 270 may sense a current flowing in at least some of the first, second, and third pixels PXL1, PXL2, and PXL3, and output a sensing signal Sse corresponding to the current.

The compensation value setting unit 280 sets a data compensation value DATAc, corresponding to the sensing signal Sse output from the sensor unit 270. For example, the compensation value setting unit 280 may output data compensation value DATAc for entirely adjusting luminance of the display region DA, corresponding to temperature, illumination, and/or degradation information (or characteristic information of the first, second, and third pixels PXL1, PXL2, and PXL3) included in the sensing signal Sse. The data compensation value DATAc may be supplied to the data converter 260.

According to exemplary embodiments, the data converter 260 may receive first image data DATA1 including effective data De corresponding to the display region DA and dummy data Dd corresponding to the first dummy region DMA1, and a data compensation value DATAc output from the compensation value setting unit 280. The data converter 260 generates second image data DATA2 by applying the data compensation value DATAc and converting the first image data DATA1.

The second image data DATA2 is input to the data driver 250. Then, the data driver 250 generates a data signal corresponding to the second image data DATA2, and supplies the data signal to the display region DA through the data lines DL1 to DLm+s+u.

In the exemplary embodiment described above, the data converter 260 may generate the second image data DATA2 by comprehensively converting gray scale values of dummy data Dd corresponding to a predetermined conversion region CA in the dummy data Dd included in the first image data DATA1. For example, the data converter 260 may comprehensively increase or decrease the gray scale values of the dummy data Dd corresponding to the conversion region CA so as to prevent or reduce a dark line, etc., which may be generated in a plurality of pixel regions disposed adjacent to each other, e.g., a boundary region between the first, second, and third pixel regions AA1, AA2, and AA3.

As described above, according to various embodiments of the present disclosure, in the display device 10' and 10" including a plurality of pixel regions disposed adjacent to each other, e.g., the first, second, and third pixel regions AA1, AA2, and AA3, it is possible to prevent or reduce degradation of image quality, which may occur in a boundary region between the pixel regions. Accordingly, it is possible to provide a display device that exhibits excellent or improved image quality while having a screen of various shapes.

In addition, the position and/or area (size) of a conversion region CA set as at least one region of the first dummy region DMA1, a gray scale value (Dgr1, Dgd1 to Dgdn, or Dgdr1 to Dgdr4) of dummy data Dd corresponding to the conversion region CA (or a luminance value corresponding to the dummy data Dd), or a voltage value of a data signal corresponding to the gray scale value is controlled. Accordingly, the degradation of image quality due to crosstalk due to the coupling effect between the data lines DL(B) in the region B and the first power line PL1 can be prevented or reduced, and power consumption can be easily controlled.

In exemplary embodiments, the first scan driver 210, the second scan driver 220, the first emission control driver 230, the second emission control driver 240, the data driver 250, the data converter 260, the sensor unit 270, and the compensation value setting unit 280, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the first scan driver 210, the second scan driver 220, the first emission control driver 230, the second emission control driver 240, the data driver 250, the data converter 260, the sensor unit 270, and the compensation value setting unit 280, and/or one or more components thereof may include or otherwise be associated with one or more memories including code (e.g., instructions) configured to cause the first scan driver 210, the second scan driver 220, the first emission control driver 230, the second emission control driver 240, the data driver 250, the data converter 260, the sensor unit 270, and the compensation value setting unit 280, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor. Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display region comprising:
a first pixel region; and
a second pixel region and a third pixel region disposed at one side of the first pixel region to be spaced apart from each other;
a dummy region comprising a first dummy region disposed between the second pixel region and the third pixel region;
a predetermined conversion region set as at least one region of the first dummy region;
first pixels, second pixels, and third pixels respectively arranged in the first pixel region, the second pixel region, and the third pixel region;
a data converter configured to:
receive first image data comprising effective data corresponding to the display region and dummy data corresponding to the dummy region; and
generate second image data by converting the first image data; and
a data driver configured to:
generate a data signal corresponding to the second image data; and
supply the data signal to the first pixels, the second pixels, and the third pixels,
wherein the data converter is configured to comprehensively convert gray scale values of the dummy data corresponding to the predetermined conversion region in the dummy data included in the first image data.

2. The display device of claim 1, wherein the display device further comprises:
a sensor unit including at least one of a temperature sensor, an optical sensor, and a degradation sensor, the sensor unit outputting a sensing signal corresponding to a temperature, an illumination, or a degradation degree of the display device; and
a compensation value setting unit setting a data compensation value corresponding to the sensing signal.

3. The display device of claim 2, wherein the data compensation value is supplied to the data converter.

4. The display device of claim 3, wherein the data converter receives the first image data including the effective data corresponding to the display region, the dummy data corresponding to the first dummy region, and the data compensation value output from the compensation value setting unit.

5. The display device of claim 2, wherein the data converter generates the second image data by applying the data compensation value and converting the first image data.

6. The display device of claim 5, wherein the second image data is input to the data driver, and the data driver generates the data signal corresponding to the second image data.

7. The display device of claim 1, wherein the data converter comprehensively increases or decreases the gray scale values of the dummy data corresponding to the predetermined conversion region.

* * * * *